US010394049B2

(12) United States Patent
 Canales et al.

(10) Patent No.: US 10,394,049 B2
(45) Date of Patent: Aug. 27, 2019

(54) EYEGLASSES WITH INTERCHANGEABLE LENSES

(71) Applicant: Roka Sports, Inc., Austin, TX (US)

(72) Inventors: Robert Allen Canales, Austin, TX (US); Kurt Robert Spenser, Burbank, CA (US); Tobin Rohrbach, Trabuco Canyon, CA (US); James Donald Oman, Austin, TX (US); David S. Ginther, Ladera Ranch, CA (US); John Brandon Currie, Orange, CA (US); Steven Oldham, Corona, CA (US); Eric Baptiste Suburu, Tustin, CA (US); Mark Niiro, Dallas, TX (US); Jonathan McCann, Van Alstyne, TX (US); Mark Stephens, Austin, TX (US)

(73) Assignee: Roka Sports, Inc., Austin, TX (US)

( * ) Notice: Subject to any disclaimer, the term of this patent is extended or adjusted under 35 U.S.C. 154(b) by 0 days.

(21) Appl. No.: 16/157,972

(22) Filed: Oct. 11, 2018

(65) Prior Publication Data

US 2019/0107732 A1    Apr. 11, 2019

Related U.S. Application Data

(60) Provisional application No. 62/642,200, filed on Mar. 13, 2018, provisional application No. 62/570,996, filed on Oct. 11, 2017.

(51) Int. Cl.
*G02C 1/02* (2006.01)
*G02C 5/12* (2006.01)
(Continued)

(52) U.S. Cl.
CPC ............... *G02C 5/126* (2013.01); *G02C 1/02* (2013.01); *G02C 1/06* (2013.01); *G02C 5/143* (2013.01); *G02C 7/02* (2013.01); *G02C 2200/08* (2013.01)

(58) Field of Classification Search
CPC .......... G02C 5/12; G02C 5/122; G02C 1/023; G02C 1/10; G02C 2200/22; G02C 5/06; G02C 5/16; G02C 1/02; G02C 2200/18
(Continued)

(56) References Cited

U.S. PATENT DOCUMENTS 4,732,464 A   3/1988 Bononi
4,802,754 A   2/1989 Neef
(Continued)

FOREIGN PATENT DOCUMENTS

DE   3707297 A1   9/1988
DE   4019085 A1   5/1991
(Continued)

OTHER PUBLICATIONS

Co-pending U.S. Appl. No. 29/616,066, filed Sep. 1, 2017.
(Continued)

*Primary Examiner* — Hung X Dang
(74) *Attorney, Agent, or Firm* — Clearpat Services, LLC

(57) ABSTRACT

An eyeglass assembly with a bridge frame having temple tab thru-holes and lens retention receivers; a nose bridge insert; at least one lens in a single lens configuration with tabs configured to insert into the lens retention receivers of the bridge frame such that the lens tabs, or a portion thereof, protrude through temple tab thru-holes. In some embodiments, the eyeglasses are frameless, having first and second temple lugs with temple tab thru-holes and lens locking features; at least one lens in a single lens configuration having lens tabs, lens retention steps, lug locking notches;
(Continued)

and a nose bridge insert. In some embodiments, the eyeglass assembly has a bridge frame with an integral nose bridge, two lenses, each lens having a lens tab, and a lens retention step, further having a lens hook. In still further embodiments, the eyeglass assembly comprises lens receiving portions with unique capture features to retain lenses having lens tabs, lens retention steps and/or hooks and capture features configured to removably capture and retain the lens in the assembly. Other embodiments further comprise a rocker frame.

30 Claims, 37 Drawing Sheets

(51) Int. Cl.
    *G02C 7/02*     (2006.01)
    *G02C 1/06*     (2006.01)
    *G02C 5/14*     (2006.01)

(58) Field of Classification Search
    USPC .......................................... 351/103–111, 41
    See application file for complete search history.

(56) References Cited

U.S. PATENT DOCUMENTS

| | | |
|---|---|---|
| 4,924,245 A | 5/1990 | Dianitsch |
| 4,964,716 A | 10/1990 | Combs |
| D330,035 S | 10/1992 | Jannard |
| D330,903 S | 11/1992 | Jannard |
| D342,959 S | 1/1994 | Jannard |
| D344,742 S | 3/1994 | Jannard |
| D350,759 S | 9/1994 | Lanna et al. |
| 5,457,506 A | 10/1995 | Winkler |
| D366,056 S | 1/1996 | Wolfe |
| 5,646,707 A | 7/1997 | Arnette |
| D385,897 S | 11/1997 | Lin |
| D386,777 S | 11/1997 | Hall et al. |
| D399,519 S | 10/1998 | Yee |
| D416,276 S | 11/1999 | Chiu |
| 6,056,399 A | 5/2000 | Jannard et al. |
| 6,059,408 A | 5/2000 | Bonacci |
| 6,283,594 B1 | 9/2001 | Hamano |
| D462,081 S | 8/2002 | Wolfe |
| 6,513,925 B1 | 2/2003 | Bonacci |
| 6,554,422 B2 | 4/2003 | Bell et al. |
| D475,733 S | 6/2003 | Lee |
| 6,644,806 B2 | 11/2003 | Wu |
| D485,856 S | 1/2004 | Wolfe |
| D502,494 S | 3/2005 | Yang |
| 6,929,364 B1 | 8/2005 | Jannard |
| D516,111 S | 2/2006 | Teng |
| D518,083 S | 3/2006 | Teng |
| D518,084 S | 3/2006 | Teng |
| D540,368 S | 4/2007 | Yang |
| D549,763 S | 8/2007 | Daems et al. |
| 7,261,410 B1 * | 8/2007 | Chen .................. G02C 1/02 351/110 |
| D550,755 S | 9/2007 | Fuchs |
| D550,758 S | 9/2007 | Cheng |
| D552,663 S | 10/2007 | Cheng |
| D555,707 S | 11/2007 | Hou |
| D555,708 S | 11/2007 | Cheng |
| D559,888 S | 1/2008 | Yang |
| 7,347,545 B1 | 3/2008 | Jannard et al. |
| D565,639 S | 4/2008 | Estrem |
| D569,412 S | 5/2008 | Jannard et al. |
| D575,325 S | 8/2008 | Wu |
| 7,452,068 B2 | 11/2008 | Collier et al. |
| D583,852 S | 12/2008 | Chen |
| 7,484,843 B1 | 2/2009 | Lin |
| D591,329 S | 4/2009 | Wang |
| D595,757 S | 7/2009 | Yang |
| D609,736 S | 2/2010 | Wang |
| D611,980 S | 3/2010 | Chen |
| D614,226 S | 4/2010 | Fulton et al. |
| D614,359 S | 4/2010 | Gleason et al. |
| D615,578 S | 5/2010 | Pulito et al. |
| D617,364 S | 6/2010 | Chou |
| D623,218 S | 9/2010 | Wong et al. |
| D625,351 S | 10/2010 | Wong et al. |
| D637,643 S | 5/2011 | Lebel |
| D640,314 S | 6/2011 | Yang |
| D641,391 S | 7/2011 | Sheldon |
| D651,641 S | 1/2012 | Fulton |
| D651,642 S | 1/2012 | Fuchs |
| D652,858 S | 1/2012 | Lamontagne |
| D659,180 S | 5/2012 | Moritz |
| D659,746 S | 5/2012 | Chen |
| 8,403,477 B2 | 3/2013 | Ogren |
| D679,313 S | 4/2013 | Bachelder |
| D683,784 S | 6/2013 | Miera |
| D690,762 S | 10/2013 | Yang |
| D694,312 S | 11/2013 | Mage |
| D695,336 S | 12/2013 | Wang |
| D727,399 S | 4/2015 | Markovitz et al. |
| D730,434 S | 5/2015 | Chen |
| D735,794 S | 8/2015 | Markovitz et al. |
| D740,347 S | 10/2015 | Corcoran |
| 9,170,431 B2 * | 10/2015 | Betournay ............... G02C 1/00 |
| D757,156 S | 5/2016 | Wu |
| D765,765 S | 9/2016 | Clegg |
| D770,560 S | 11/2016 | Shin |
| D775,685 S | 1/2017 | Rouayroux et al. |
| D777,827 S | 1/2017 | Chen |
| D783,080 S | 4/2017 | Garfias |
| D797,183 S | 9/2017 | Flake et al. |
| D798,375 S | 9/2017 | Flake et al. |
| D809,056 S | 1/2018 | Flake et al. |
| 2007/0236649 A1 | 10/2007 | Lin |
| 2008/0074610 A1 | 3/2008 | Tackles |
| 2008/0170200 A1 | 7/2008 | Chen |
| 2012/0293765 A1 * | 11/2012 | Kang .................. B22D 25/02 351/41 |
| 2014/0340628 A1 | 11/2014 | Huang |
| 2015/0314167 A1 | 11/2015 | Shiue |
| 2017/0100287 A1 | 4/2017 | Calilung et al. |
| 2018/0008467 A1 | 1/2018 | Cater et al. |
| 2018/0031862 A1 | 2/2018 | Li |

FOREIGN PATENT DOCUMENTS

| | | |
|---|---|---|
| EP | 0239659 B1 | 1/1992 |
| FR | 2631464 A1 | 11/1989 |
| FR | 2770309 A1 | 4/1999 |
| JP | S61126225 U | 8/1986 |
| JP | S63122322 U | 8/1988 |
| JP | H0192627 U | 6/1989 |
| JP | H03329629 U | 3/1991 |
| JP | 4944087 B2 | 5/2012 |
| WO | WO-03062904 A1 | 7/2003 |
| WO | WO-2012033691 A1 | 3/2012 |

OTHER PUBLICATIONS

Co-pending U.S. Appl. No. 29/640,311, filed Mar. 13, 2018.
Co-pending U.S. Appl. No. 29/640,312, filed Mar. 13, 2018.
Co-pending U.S. Appl. No. 29/642,302, filed Mar. 28, 2018.
Co-pending U.S. Appl. No. 29/643,339, filed Apr. 6, 2018.
Co-pending U.S. Appl. No. 29/643,342, filed Apr. 6, 2018.
U.S. Appl. No. 29/562,636 Office Action dated Jun. 30, 2017.
U.S. Appl. No. 29/562,638 Ex Parte Quayle dated Apr. 6, 2017.
U.S. Appl. No. 29/562,643 Office Action dated Apr. 20, 2017.
U.S. Appl. No. 29/616,066 Ex Parte Quayle dated Jul. 11, 2018.

\* cited by examiner (Section D-D)

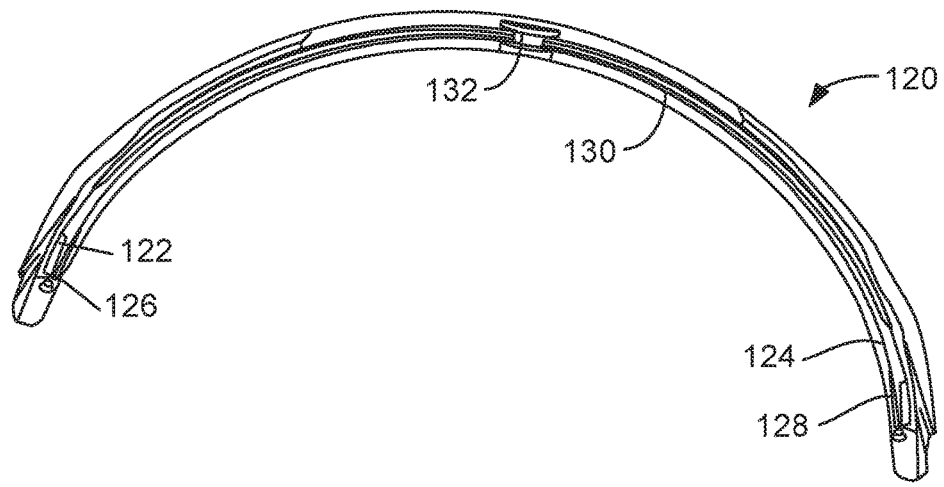
FIG. 29B
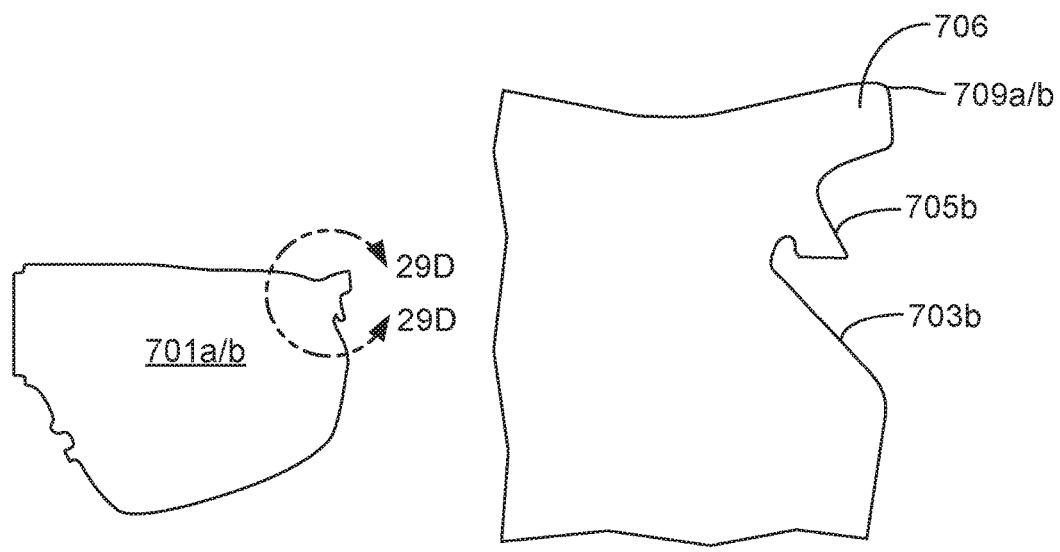
FIG. 29C
FIG. 29D

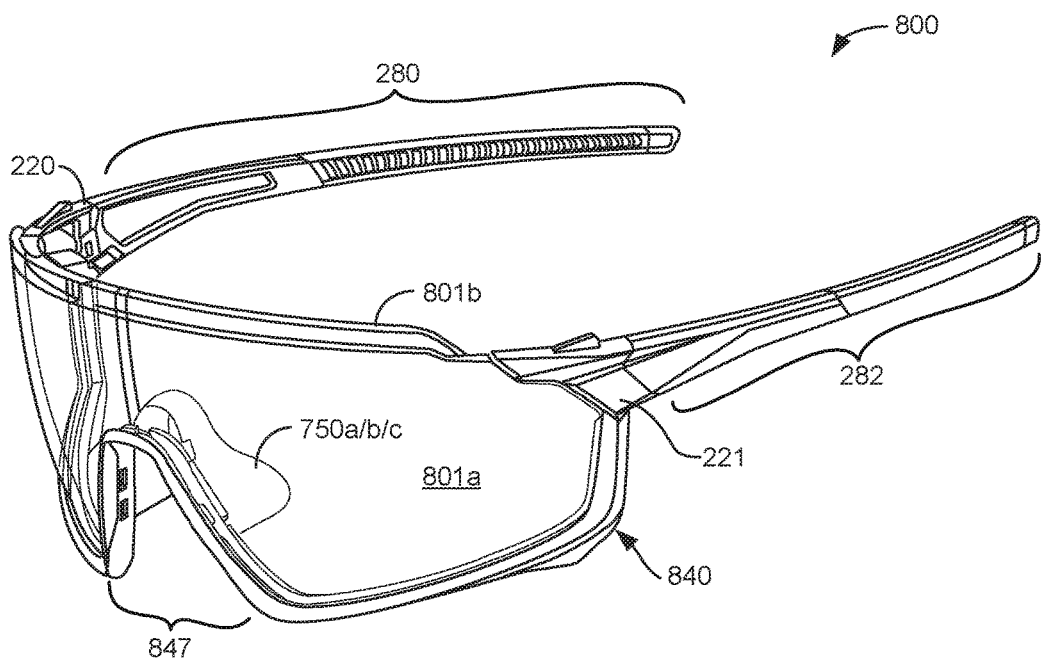
FIG. 30A
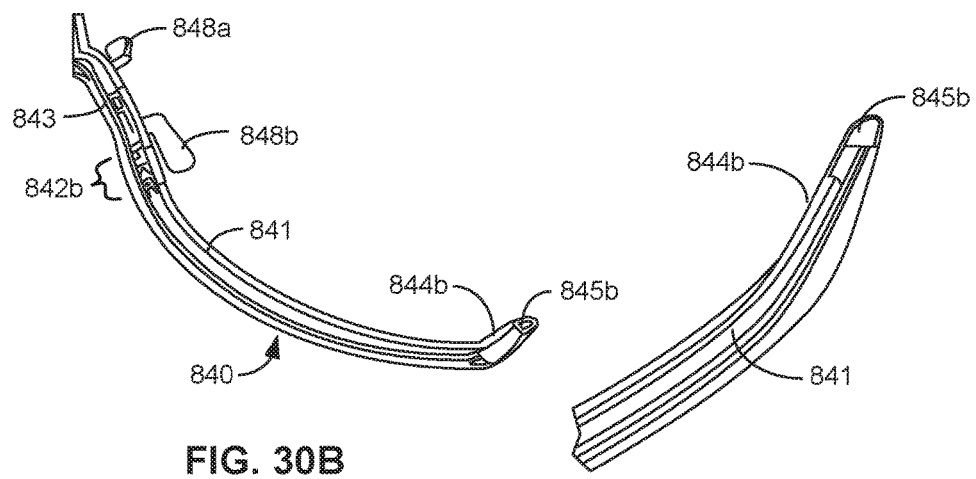
FIG. 30B
FIG. 30C

EYEGLASSES WITH INTERCHANGEABLE LENSES

CROSS-REFERENCE

This application claims the benefit of U.S. Provisional Application No. 62/642,200, filed Mar. 13, 2018, and also claims the benefit of U.S. Provisional Application No. 62/570,996, filed Oct. 11, 2017, which applications are each incorporated herein by reference.

BACKGROUND OF THE INVENTION

Eyeglasses come in a variety of shapes, colors, configurations, and sizes, with and without special eye lenses. Frequently, the lenses become damaged or are otherwise in need of replacement. It is rarely convenient or easy for wearers to change the lenses themselves, thus there remains a need for wearers to easily replace their lenses in their eyeglasses.

SUMMARY OF THE INVENTION

Described herein are eyeglass assemblies comprising bridge frames, temple lugs or lens receiving portions with unique capture features to retain lenses having lens tabs configured to insert and become removably captured in the bridge frames, temple lugs or lens receiving portions. The lens tabs protrude through the lens tab thru-holes of the bridge frames, temple lugs or lens receiving portions to provide a visual and tactile confirmation of lens capture. The assemblies provide a simpler way for wearers to independently replace or switch lenses in their eyeglasses when in need of repair, or to exchange the lenses to accommodate another need.

Provided herein is an eyeglass assembly comprising: at least one lens comprising: a first lens tab and a first lens retention step; and a first lens receiving portion comprising: a first lens tab thru-hole and a first lens retention step receiver; wherein the first lens tab and the first lens retention step are configured to releasably insert into the first lens tab thru-hole and the first lens retention step receiver of the first lens receiving portion such that the first lens tab or a portion thereof protrudes through the first lens tab thru-hole. In some embodiments of the eyeglass assembly, the at least one lens further comprises: a second lens tab and a second lens retention step; wherein the first lens receiving portion further comprises: a second lens tab thru-hole and a second lens retention step receiver; wherein the second lens tab and the second lens retention step are configured to releasably insert into the second lens tab thru-hole and the second lens retention step receiver of the first lens receiving portion such that the second lens tab or a portion thereof protrudes through the second lens tab thru-hole. In some embodiments of the eyeglass assembly, the at least one lens further comprises: a second lens tab; and a second lens retention step; wherein the eyeglass assembly further comprises: a second lens receiving portion comprising: a second lens tab thru-hole and a second lens retention step receiver; wherein the second lens tab and the second lens retention step are configured to releasably insert into the second lens tab thru-hole and the second lens retention step receiver of the second lens receiving portion such that the second lens tab or a portion thereof protrudes through the second lens tab thru-hole. In some embodiments, the eyeglass assembly further comprises: a second lens comprising: a second lens tab and a second lens retention step; wherein the first lens receiving portion further comprises: a second lens receiving portion comprising; a second lens tab thru-hole and a second lens retention step receiver; wherein the second lens tab and the second lens retention step are configured to releasably insert into the second lens tab thru-hole and the second lens retention step receiver of the second lens receiving portion such that the second lens tab or a portion thereof protrudes through the second lens tab thru-hole. In some embodiments of the eyeglass assembly, the at least one lens further comprises: a first receiving portion locking feature and a second receiving portion locking feature; wherein the first lens receiving portion further comprises: a first lens locking feature; and wherein the second lens receiving portion further comprises: a second lens locking feature; wherein the first receiving portion locking feature is configured to insert into the first lens locking feature and releasably secure the first lens receiving portion to a first side of the at least one lens, and wherein the second receiving portion locking feature is configured to insert into the second lens locking feature and releasably secure the second lens receiving portion to a second side of the at least one lens. In some embodiments, the eyeglass assembly further comprises; a first lens hook on the first lens, on or about a first proximal edge and in proximity to a first medial edge; a second lens hook on the second lens, or about a second proximal edge and in proximity to a second medial edge; an integral nose bridge with a first lateral side and a second lateral side between the first and second lens receiving portions, a first medial side and a second medial side, forming a frame bridge; wherein the first medial side and the second medial side are configured to straddle a bridge of a wearer's nose; wherein the integral nose bridge further comprises; a first nose pad arm with a first lateral side and a first medial side; and a second nose pad arm with a second medial side and a second lateral side; wherein the first lateral side of the first nose pad arm comprises a first lens hook receptacle configured to receive the first lens hook on the first lens, and wherein the second lateral side of the second nose pad arm comprises a second lens hook receptacle configured to receive the second lens hook on the second lens. In some embodiments of the eyeglass assembly, the at least one lens comprises: variable shapes; variable widths configured to fit between the ends of the frame bridge; variable widths configured to fit below the frame bridge; variable radii of curvature; or variable lens heights.

In some embodiments of the eyeglass assembly, the at least one lens further comprises a central notched configured to accommodate the general shape of a nose of a wearer.

In some embodiments, the eyeglass assembly further comprises: a nose bridge insert configured to releasably attach to the central notched region of the single lens, wherein the nose bridge insert comprises at least one attachment feature configured to releasably attach to at least a portion of the central notched region of the single lens; wherein the at least one attachment feature comprises at least one of; an indent, a groove, a slot, a bump or a protrusion, or any combination thereof. In some embodiments of the eyeglass assembly, the nose bridge insert comprises a split nose bridge configuration such that a coupler portion of the split nose bridge insert is configured to releasably attach to at least a portion of the central notched region of the single lens. In some embodiments of the eyeglass assembly, the split nose bridge configuration of the split nose bridge insert further comprises: a pad linker arch configured to be posteriorly offset from the coupler portion wherein the pad linker arch is configured to straddle the bridge of the nose of the wearer, and the pad linker arch further comprises a first nose pad with a first lateral side and a first medial side, and a second nose pad with a second medial side and second lateral side extending therefrom; wherein the first medial side of the first nose pad and the second medial side of the second nose pad are configured to rest on lateral cartilages, lesser alar cartilages, supra alar creases, dense connective tissue above the nostrils of the wearer, or a combination thereof; and wherein the first medial side of the first nose pad and the second medial side of the second nose pad further comprise a textured gripping surface. In some embodiments, the eyeglass assembly further comprises: a first temple arm having a first temple leaf and a first temple extension; a second temple arm, with a second temple leaf and a second temple extension; wherein the first temple leaf is configured for attachment to a first end of the at least one lens receiving portion with a first hinge pin, wherein the first temple extension is configurable to generally conform to a lateral shape of a wearer's head, extending over the proximal portion of a wearer's first ear between a first auricle of the first ear and a wearer's skull, wherein the second temple leaf is configured for attachment to a second end of the at least one lens receiving portion with a second hinge pin, and wherein the second temple extension is configurable to generally conform to a lateral shape of a wearer's head, extending over the proximal portion of a wearer's second ear between a second auricle of the second ear and the wearer's skull. In some embodiments, the assembly further comprises: a first temple arm having a first temple leaf and a first temple extension; a second temple arm, with a second temple leaf and a second temple extension; wherein the first temple leaf is configured for attachment to a first end of the first lens receiving portion with a first hinge pin, wherein the first temple extension is configurable to generally conform to a lateral shape of a wearer's head, extending over the proximal portion of a wearer's first ear between a first auricle of the first ear and a wearer's skull, wherein the second temple leaf is configured for attachment to a second end of the second lens receiving portion with a second hinge pin, and wherein the second temple extension is configurable to generally conform to a lateral shape of a wearer's head, extending over the proximal portion of a wearer's second ear between a second auricle of the second ear and the wearer's skull. In some embodiments of the eyeglass assembly, the first temple extension and the second temple extension each comprise a textured gripping surface. In some embodiments of the eyeglass assembly, the temple arm or the temple extension comprises: titanium; stainless steel; aluminum; copper; nickel; Beta Ti; nitinol (NiTi) or alloys thereof. In some embodiments of the eyeglass assembly, the at least first lens is configurable to accommodate at least one of: an anti-reflective treatment; a photochromic treatment; a polarized treatment; a tinting treatment; a scratch resistant treatment; a mirror coating treatment; an anti-fog coating treatment; a hydro-phobic coating treatment; an oleo-phobic coating treatment or a combination thereof. In some embodiments, the eyeglass assembly further comprises; a first nose pad comprising a first nose pad attachment feature configured to mate with the first nose pad arm and a second nose pad comprising a second nose pad attachment feature configured to mate with the second nose pad arm; wherein at least a first medial side of the first nose pad and a second medial side of the second nose pad further comprise a textured gripping surface.

Provided herein is an eyeglass assembly with a bridge frame having first and second temple tab thru-holes and first and second temple lens retention step receivers; a nose bridge insert; at least one lens with lens tabs and lens retention steps configured to insert into the temple tab thru-holes and the temple lens retention step receivers of the bridge frame such that the lens tabs, or a portion thereof, protrude through the temple tab thru-holes. In some embodiments, the eyeglass assembly is frameless, having first and second temple lugs with temple tab thru-holes and lens locking features; a single lens configuration having lens tabs, lens retention steps, lug locking notches; and a nose bridge insert. In some embodiments, the eyeglass assembly has a bridge frame with an integral nose bridge, two lenses, each lens having a lens tab, lens retention step, further having a lens hook. In some embodiments, the eyeglass assembly has temple lugs with temple tab thru-holes and lens locking features, a single lens configuration having lens tabs, lens retention steps and a rocker frame configured for attachment to the temple lugs. In still other embodiments, the eyeglass assembly has combinations of frame bridges, rocker frames, temple lugs, one or more lenses, and multiple sizes of lenses, each assembly comprising a combination of lens tabs, lens retention steps and/or hooks and capture features. In still further embodiments, the eyeglass assembly comprises lens receiving portions with unique capture features to retain lenses having lens tabs, lens retention steps and/or hooks and capture features configured to removably capture and retain the lens in the assembly. In any of the embodiments of the eyeglass assembly, the assembly is further configured with adjustable temple arms and extensions attachable to the frame bridges, rocker frames, temple lugs or lens receiving portions. In any of the embodiments of the eyeglass assembly, the assembly is further configured with either nose pads or nose bridge assemblies configurable for a plurality of wearer's different nose sizes.

Provided herein is an eyeglass assembly comprising: a frame bridge comprising a first lens tab thru-hole, a first lens retention step receiver, a second lens tab thru-hole and a second lens retention step receiver; a single lens configuration comprising; a central notched region configured to accommodate the shape of a nose of a wearer; a first lens tab and a first lens retention step; a second lens tab and a second lens retention step; wherein the first lens tab and the first lens retention step are configured to releasably insert into the first lens tab thru-hole and the first lens retention step receiver, respectively, of the frame bridge such that the first lens tab or a portion thereof protrudes through the first lens tab thru-hole, and wherein the second lens tab and the second lens retention step are configured to releasably insert into the second lens tab thru-hole and the second lens retention step receiver of the frame bridge, respectively, such that the second lens tab or a portion thereof protrudes through the second lens tab thru-hole. In some embodiments, the frame bridge further comprises a groove correspondingly sized and shaped to match and to receive a proximal edge of the single lens or a portion thereof. In some embodiments, the frame bridge further comprises a protrusion in the groove. In some embodiments, the single lens further comprises an indent along the proximal edge configured to align with the protrusion in the groove of the frame bridge to centralize the lens within the frame bridge. In some embodiments, the eyeglass assembly further comprises: a nose bridge insert configured to releasably attach to the central notched region of the single lens, wherein the nose bridge insert comprises at least one attachment feature configured to releasably attach to at least a portion of the central notched region of the single lens; wherein the at least one attachment feature comprises; an indent, a groove, a slit, a slot, a bump, or a protrusion. In some embodiments, the central notched region of the single lens comprises at least one attachment feature configured to releasably attach to at least a portion of the nose bridge insert wherein the at least one attachment feature comprises an indent. In some embodiments, the central notched region of the single lens comprises a first lateral attachment feature and a second lateral attachment feature configured to releasably attach to at least a portion of the nose bridge insert. In some embodiments, the central notched region of the single lens further comprises a proximal attachment feature configured to releasably attach to at least a portion of the nose bridge insert. In some embodiments, the nose bridge insert comprises a split nose bridge configuration such that a first portion of the split nose bridge is configured to releasably attach to at least a portion of the central notched region of the single lens. In some embodiments, the nose bridge insert comprises a split nose bridge configuration such that a coupler portion of the split nose bridge is configured to releasably attach to the at least one attachment feature of the central notched region of the single lens. In some embodiments, the nose bridge insert comprises a split nose bridge configuration such that a coupler portion of the split nose bridge is configured to releasably attach to at least the first lateral attachment feature and the second lateral attachment feature in the central notched region of the single lens. In some embodiments, the split nose bridge configuration of the nose bridge insert further comprises: a pad linker arch configured to be posteriorly offset from the coupler portion wherein the pad linker arch is configured to straddle a bridge of the nose of the wearer, and the pad linker arch further comprising a first nose pad with a first lateral side and a first medial side, and a second nose pad with a second medial side and second lateral side extending therefrom; wherein the first medial side of the first nose pad and the second medial side of the second nose pad are configured to rest on lateral cartilages, lesser alar cartilages, supra alar creases, dense connective tissue above the nostrils of the wearer, or a combination thereof. In some embodiments, the split nose bridge configuration of the nose bridge insert is a single component. In some embodiments, the split nose bridge configuration of the nose bridge insert is an assembly comprising two or more components. In some embodiments, the first medial side of the first nose pad and the second medial side of the second nose pad extending from the pad linker arch further comprise a textured gripping surface. In some embodiments, the eyeglass assembly further comprises: a first temple arm having a first temple leaf and a first temple extension; a second temple arm, with a second temple leaf and a second temple extension; wherein the first temple leaf is configured for attachment to a first end of the frame bridge at or about a frame bridge knuckle feature through a first temple arm knuckle with a first hinge pin, wherein the first temple extension is configurable to generally conform to a lateral shape of a wearer's head, extending over the proximal portion of a wearer's first ear between a first auricle of the first ear and a wearer's skull, wherein the second temple leaf is configured for attachment to a second end of the frame bridge at or about a frame bridge knuckle feature through a second temple arm knuckle with a second hinge pin, and wherein the second temple extension is configurable to generally conform to a lateral shape of a wearer's head, extending over the proximal portion of a wearer's second ear between a second auricle of the second ear and the wearer's skull. In some embodiments, the first temple extension and the second temple extension comprise a core metal substrate. In some embodiments, the first temple extension and the second temple extension core metal substrate comprises titanium. In some embodiments, the first temple extension and the second temple extension comprising the core metal substrate are molded sub-assemblies. In some embodiments, the first temple extension, and the second temple extension each further comprise a textured gripping surface. In some embodiments, the eyeglass assembly further comprises: a first temple extension textured gripping surface, and a second temple extension textured gripping surface; wherein the first temple extension textured gripping surface is configured for insertion onto, over, or surrounding the first temple extension, and wherein the second temple extension textured gripping surface is configured for insertion onto, over, or surrounding the second temple extension. In some embodiments, any of the eyeglass assemblies further comprises: a first temple extension end cap; and a second temple extension end cap. In some embodiments, the frame bridge, the first temple arm, and the second temple arm are a multi-part assembly. In some embodiments, the multi-part assembly comprises: a first knuckle and a second knuckle; wherein the first knuckle and the second knuckle are further assembled to the frame bridge with mating compressing joint assemblies, hinge pins, or a combination thereof. In some embodiments, the eyeglass assembly further comprises: a first temple extension textured gripping surface, and a second temple extension textured gripping surface; wherein the first temple extension textured gripping surface is configured for insertion onto, over, or surrounding the first temple extension, and wherein the second temple extension textured gripping surface is configured for insertion onto, over, or surrounding the second temple extension. In some embodiments, the eyeglass assembly further comprises a first temple extension end cap and a second temple extension end cap. In some embodiments, the single lens is provided in more than one size. In some embodiments, the single lens is provided in two or more heights. In some embodiments, the single lens is configurable to extend approximately 2 mm to approximately 10 mm higher above the eyebrows of the wearer than a standard height lens. In some embodiments, this vertical extension above the eyebrows is accomplished in combination with an interchangeable nose bridge configured to raise the entire eyeglass assembly from the bridge of the wearer's nose. In some embodiments, the single lens is configurable to extend approximately 2 mm to approximately 10 mm lower below the eyes of the wearer than a standard height lens, to approximately the cheekbone. In some embodiments, the single lens is configured to extend both higher above the eyebrows of the wearer than a standard height lens and extend lower below the eyes of the wearer than a standard height lens within an overall range of approximately 2 mm to approximately 10 mm. As noted above, in some embodiments, this vertical extension above the eyebrows is accomplished in combination with an interchangeable nose bridge configured to raise the entire eyeglass assembly from the bridge of the wearer's nose, whereas the extension below the eyes toward the cheekbone is configurable with a longer vertical height of the lens. In some embodiments, the single lens is configurable to accommodate a corrective lens prescription for a left eye, a right eye, or both left and right eye. In some embodiments, the single lens is configurable to accommodate an anti-reflective treatment. In some embodiments, the single lens is configurable to accommodate a photochromic treatment. In some embodiments, the single lens is configurable to accommodate a polarized treatment. In some embodiments, the single lens is configurable to accommodate a tinting treatment. In some embodiments, the single lens is configurable to accommodate a scratch resistant treatment. In some embodiments, the single lens is configurable to accommodate a mirror coating treatment. In some embodiments, the single lens is configurable to accommodate an anti-fogging treatment. In some embodiments, the single lens is configurable to accommodate a hydro-phobic treatment. In some embodiments, the single lens is configurable to accommodate an oleo-phobic treatment.

In some embodiments, the eyeglass assembly comprises: a frame bridge comprising a first lens tab thru-hole, a first lens retention step receiver, a second lens tab thru-hole and a second lens retention step receiver wherein the temple arms are modified such that the temple leaf thickness of the temple arm is tapered such that approximately ½ of the overall length, or a posterior portion of the temple leaf is between ¼ and ½ of the thickness of an anterior portion of the temple leaf. In some embodiments, the temple leaf extension and the end cap comprise a substrate formed as a single piece. In some embodiments, the formed single piece temple substrate further comprises a flexible metal or wire core. In some embodiments, the posterior end of the formed single piece temple leaf extension substrate comprises a thru-hole configurable for a head strap attachment feature. In some embodiments, the formed single piece temple leaf extension substrate further comprises a textured surface on the medial side. In some embodiments, the textured surface is a molded inlay. In some embodiments, the temple arm or the temple extension comprises: titanium; stainless steel; aluminum; copper; nickel; Beta Titanium; nitinol (NiTi) or alloys thereof. In some embodiments, the temple arm or the temple extension comprises: a malleable plastic; a flexible plastic or a pliant plastic.

Provided herein is an eyeglass assembly comprising: a first temple lug comprising a first temple tab thru-hole, a first temple lens retention step receiver, and a first lens locking feature; a second temple lug comprising a second temple tab thru-hole, a second temple lens retention step receiver, and a second lens locking feature; a single lens configuration comprising; a central notched region configured to accommodate the shape of a nose of a wearer; a first lens tab, a first lens retention step and a first lug locking notch; a second lens tab, a second lens retention step and a second lug locking notch; wherein the first lens tab and the first lens retention step are configured to releasably insert into the first temple tab thru-hole and the first temple lens retention step receiver of the first temple lug respectively, such that the first lens tab or a portion thereof, protrudes through the first temple tab thru-hole, wherein first lens locking feature is configured to insert into the first lug locking notch and releasably secure the temple lug to the first side of the lens; wherein the second lens tab and the second lens retention step are configured to releasably insert into the second temple tab thru-hole and the second temple lens retention step receiver of the second temple lug respectively, such that the second lens tab or a portion thereof, protrudes through the second temple tab thru-hole, and wherein second lens locking feature is configured to insert into the second lug locking notch and releasably secure the temple lug to the second side of the lens. In some embodiments, the eyeglass assembly further comprises: a nose bridge insert configured to releasably attach to the central notched region of the single lens, wherein the nose bridge insert comprises at least one attachment feature configured to releasably attach to at least a portion of the central notched region of the single lens; wherein the at least one attachment feature comprises; an indent, a groove, a slot, a bump, or a protrusion. In some embodiments, the central notched region of the single lens comprises at least one attachment feature configured to releasably attach to a nose bridge insert wherein the at least one attachment feature comprises an indent. In some embodiments, the central notched region of the single lens comprises a first lateral attachment feature and a second lateral attachment feature configured to releasably attach to the nose bridge insert. In some embodiments, the central notched region of the single lens further comprises a proximal attachment feature configured to releasably attach to the nose bridge insert. In some embodiments, the nose bridge insert comprises a split nose bridge configuration such that a coupler portion of the split bridge is configured to releasably attach to at least a portion of the central notched region of the single lens. In some embodiments, the nose bridge insert comprises a split nose bridge configuration such that a coupler portion of the split nose bridge is configured to releasably attach to the at least one attachment feature of the central notched region of the single lens. In some embodiments, the nose bridge insert comprises a split nose bridge configuration such that a coupler portion of the split nose bridge is configured to releasably attach to at least the first lateral attachment feature and the second lateral attachment feature in the central notched region of the single lens. In some embodiments, the split nose bridge configuration of the nose bridge insert further comprises: a pad linker arch configured to be posteriorly offset from the coupler portion wherein the pad linker arch is configured to straddle a bridge of the nose of the wearer, and the pad linker arch further comprising a first nose pad with a first lateral side and a first medial side, and a second nose pad with a second medial side and second lateral side extending therefrom; wherein the first medial side of the first nose pad and the second medial side of the second nose pad are configured to rest on lateral cartilages, lesser alar cartilages, supra alar creases, dense connective tissue above the nostrils of the wearer, or a combination thereof. In some embodiments, the split nose bridge configuration of the nose bridge insert is a single component. In some embodiments, the split nose bridge configuration of the nose bridge insert is an assembly comprising two or more components. In some embodiments, the first medial side of the first nose pad and the second medial side of the second nose pad extending from the second nose bridge portion further comprise a textured gripping surface. In some embodiments, the eyeglass assembly further comprises: a first temple arm having a first temple leaf and a first temple extension; a second temple arm, with a second temple leaf and a second temple extension; wherein the first temple leaf is configured for attachment to the first temple lug at the knuckle feature through a first temple arm knuckle with a first hinge pin, wherein the first temple extension is configurable to generally conform to a lateral shape of a wearer's head, extending over the proximal portion of a wearer's first ear between a first auricle of the first ear and a wearer's skull, wherein the second temple leaf is configured for attachment to a second temple lug at the knuckle feature through a second temple arm knuckle with a second hinge pin, and wherein the second temple extension is configurable to generally conform to a lateral shape of a wearer's head, extending over the proximal portion of a wearer's second ear between a second auricle of the second ear and the wearer's skull. In some embodiments, the first temple extension, and the second temple extension each further comprise a textured gripping surface. In some embodiments, the eyeglass assembly further comprises: a first temple extension textured gripping surface, and a second temple extension textured gripping surface; wherein the first temple extension textured gripping surface is configured for attachment to, or over the first temple extension, and wherein the second temple extension textured gripping surface is configured for attachment to, or over the second temple extension. In some embodiments, the eyeglass assembly further comprises: a first temple extension end cap and a second temple extension end cap. In some embodiments, the first temple lug and the first temple arm are components of a multi-part assembly and the second temple lug and the second temple arm are components of a multi-part assembly. In some embodiments, the first temple lug and the first temple arm are a single component and the second temple lug and the second temple arm are a single component. In some embodiments, the first temple extension and the second temple extension comprise a core metal substrate. In some embodiments, the first temple extension and the second temple extension core metal substrate comprises titanium. In some embodiments, the first temple extension and the second temple extension comprising the core metal substrate are molded sub-assemblies. In some embodiments, the first temple extension and the second temple extension further comprise a textured gripping surface. In some embodiments, the first temple extension and the second temple extension further comprise a textured gripping surface. In some embodiments, the single lens is provided in more than one size. In some embodiments, the single lens is provided in two or more heights. Further still, in some embodiments, the single lens is configurable to extend approximately 2 mm to approximately 10 mm higher above the eyebrows of the wearer than a standard height lens. In some embodiments, the single lens is configurable to accommodate a corrective lens prescription for a left eye, a right eye, or both left and right eye. In some embodiments, the single lens is configurable to accommodate an anti-reflective treatment. In some embodiments, the single lens is configurable to accommodate a photochromic treatment. In some embodiments, the single lens is configurable to accommodate a polarized treatment. In some embodiments, the single lens is configurable to accommodate a tinting treatment. In some embodiments, the single lens is configurable to accommodate a scratch resistant treatment. In some embodiments, the single lens is configurable to accommodate a mirror coating treatment. In some embodiments, the single lens is configurable to accommodate an anti-fogging treatment. In some embodiments, the single lens is configurable to accommodate a hydro-phobic treatment. In some embodiments, the single lens is configurable to accommodate an oleo-phobic treatment. In some embodiments, the eyeglass assembly comprises: a first temple lug comprising a first temple tab thru-hole, a first temple lens retention step receiver, and a first lens locking feature; a second temple lug comprising a second temple tab thru-hole, a second temple lens retention step receiver, and a second lens locking feature; wherein the temple arms are modified such that the temple leaf thickness is tapered such that approximately ½ of the overall length, or a posterior portion of the temple leaf is between ¼ and ½ of the thickness of an anterior portion of the temple leaf. In some embodiments, the temple leaf extension and the end cap comprise a substrate formed as a single piece. In some embodiments, the formed single piece temple substrate further comprises a flexible metal or wire core. In some embodiments, the posterior end of the formed single piece temple leaf extension substrate comprises a thru-hole configurable for a head strap attachment feature. In some embodiments, the formed single piece temple leaf extension substrate further comprises a textured surface on the medial side. In some embodiments, the textured surface is a molded inlay. In some embodiments, the temple arm or the temple extension comprises: titanium; stainless steel; aluminum; copper; nickel; Beta Titanium; nitinol (NiTi) or alloys thereof. In some embodiments, the temple arm or the temple extension comprises: a malleable plastic; a flexible plastic or a pliant plastic.

Provided herein is an eyeglass assembly comprising: a frame bridge comprising; a first lens receiving portion; a second lens receiving portion; an integral nose bridge with a first lateral side and a second lateral side between the first and second lens receiving portions, and a first medial side and a second medial side; wherein the first medial side and the second medial side are configured to straddle the bridge of a wearer's nose, wherein the integral nose bridge further comprises; a first nose pad arm with a first lateral side and a first medial side; and a second nose pad arm with a second medial side and a second lateral side; wherein the first lateral side of the first nose pad arm comprises a first lens hook receptacle, and wherein the second lateral side of the second nose pad arm comprises a second lens hook receptacle, a first temple tab thru-hole; a first temple lens retention step receiver in a lateral side of the first lens receiving portion, a second temple tab thru-hole; and a second temple lens retention step receiver in a lateral side of the second lens receiving portion; a first lens comprising; a first proximal edge, a first medial edge, a first lateral edge and a first inferior edge; a first lens tab on or about the first proximal edge and in proximity to the first lateral edge, a first lens retention step on the first lateral edge below the first lens tab, and a first lens hook on or about the first proximal edge and in proximity to the first medial edge; a second lens comprising; a second proximal edge, a second medial edge, a second lateral edge and a second inferior edge; a second lens tab on or about the second proximal edge and in proximity to the second lateral edge, a second lens retention step on the second lateral edge below the second lens tab, and a second lens hook on or about the second proximal edge and in proximity to the second medial edge; wherein the first lens tab and the first lens retention step are configured to releasably insert into the first temple tab thru-hole and the first temple lens retention step receiver of the frame bridge respectively, such that the first lens tab or a portion thereof, protrudes through the top of the first temple tab thru-hole, and the first lens hook is configured to releasably insert into the first lens hook receptacle of the nose bridge, wherein the second lens tab and the second lens retention step are configured to releasably insert into the second temple tab thru-hole and the second temple lens retention step receiver of the frame bridge respectively, such that the second lens tab or a portion thereof, protrudes through the top of the second temple tab thru-hole, and the second lens hook is configured to releasably insert into the second lens hook receptacle of the nose bridge. In some embodiments, the frame bridge is further configured to releasably capture: a portion of the first lateral edge, the first proximal edge and a portion of the first medial edge of the first lens between the first temple lens retention step receiver, an inferior edge of the first lens receiving portion, and the first lateral side of the first nose pad arm, and a portion of the second lateral edge, the second proximal edge and a portion of the second medial edge of the second lens between the second temple lens retention step receiver, an inferior edge of the second lens receiving portion, and the second lateral side of the second nose pad arm, wherein the inferior edge of the first lens receiving portion, the second lens receiving portion, the first lateral side of the first nose pad arm, and the second lateral side of the second nose pad arm, at least, comprise a retaining feature. In some embodiments, the eyeglass assembly further comprises: a first temple arm having a first temple leaf and a first temple extension; a second temple arm, with a second temple leaf and a second temple extension; wherein the first temple leaf is configured for attachment to a first end of the frame bridge at or about a frame bridge hinge feature through a first temple arm hinge with a hinge pin, wherein the first temple extension is configurable to generally conform to a lateral shape of a wearer's head, extending over the proximal portion of a wearer's first ear between a first auricle of the first ear and a wearer's skull, wherein the second temple leaf is configured for attachment to a second end of the frame bridge at or about a frame bridge hinge feature through a second temple arm hinge with a hinge pin, and wherein the second temple extension is configurable to generally conform to a lateral shape of a wearer's head, extending over the proximal portion of a wearer's second ear between a second auricle of the second ear and the wearer's skull. In some embodiments, the first temple extension, and the second temple extension each further comprise a textured gripping surface. In some embodiments, the eyeglass assembly further comprises: a first temple extension textured gripping surface, and a second temple extension textured gripping surface; wherein the first temple extension textured gripping surface is configured for insertion onto, over, or surrounding the first temple extension, and wherein the second temple extension textured gripping surface is configured for insertion onto, over, or surrounding the second temple extension. In some embodiments, the eyeglass assembly further comprises: a first temple end cap and a second temple end cap. In some embodiments, the frame bridge, the first temple arm, and the second temple arm are a multi-part assembly. In some embodiments, the multi-part assembly comprises: a first hinge; and a second hinge; wherein the first hinge and the second hinge are further assembled to the frame bridge with mating compressing joint assemblies, hinge pins, or a combination thereof. In some embodiments, the first lens and the second lens are provided in more than one size. In some embodiments the first lens and the second lens are provided in two or more heights. In some embodiments, the first lens and the second lens are configurable to extend approximately 2 mm to approximately 10 mm lower below the eyes of the wearer than a standard height lens, to approximately the cheekbone. In some embodiments, the first lens and the second lens are configurable to accommodate a corrective lens prescription. In some embodiments, the first lens and the second lens are configurable to accommodate an antireflective treatment. In some embodiments, the first lens and the second lens are configurable to accommodate a photochromic treatment. In some embodiments, the first lens and the second lens are configurable to accommodate a polarized treatment. In some embodiments, the first lens and the second lens are configurable to accommodate a tinting treatment. In some embodiments, the first lens and the second lens are configurable to accommodate a scratch resistant treatment. In some embodiments, the first lens and the second lens are configurable to accommodate a mirror coating treatment. In some embodiments, the first lens and the second lens are configurable to accommodate an antifogging treatment. In some embodiments, the first lens and the second lens are configurable to accommodate a hydrophobic treatment. In some embodiments, the first lens and the second lens are configurable to accommodate an oleophobic treatment. In some embodiments, the first lens and the second lens are configurable to accommodate any combination of the treatments described herein.

Provided herein is an eyeglass assembly comprising: a frame bridge having a first end and a second end, the first end comprising a first lens tab thru-hole, a first lens retention step receiver, and the second end comprising a second lens tab thru-hole and a second lens retention step receiver; a single lens configuration comprising; a central notched region configured to generally accommodate the shape of a bridge of a nose of a wearer; a first lens tab, a first lens retention step and a first rocker notch; a second lens tab, a second lens retention step and a second rocker notch; a rocker frame having a third end and a fourth end, the rocker frame comprising a generally rounded "w" shape configured to support inferior edges, side edges and the central notched region of the single lens, a first rocker notch receiver near the third end and a second rocker notch receiver near the fourth end; wherein the first lens tab and the first lens retention step are configured to releasably insert into the first lens tab thru-hole and the first lens retention step receiver, respectively, of the frame bridge such that the first lens tab or a portion thereof protrudes through the first lens tab thru-hole, and wherein the second lens tab and the second lens retention step are configured to releasably insert into the second lens tab thru-hole and the second lens retention step receiver of the frame bridge, respectively, such that the second lens tab or a portion thereof protrudes through the second lens tab thru-hole, the first rocker notch receiver near the third end of the rocker frame is affixed to the first rocker notch of the single lens and the third end of the rocker frame is configured to blendedly align with the inferior edge of the frame bridge near the first end and the first lens retention step, and the second rocker notch receiver near the fourth end of the rocker frame is affixed to the second rocker notch of the single lens and the fourth end of the rocker frame is configured to blendedly align with the inferior edge of the frame bridge near the second end and the second lens retention step. In some embodiments, the frame bridge further comprises a groove correspondingly sized and shaped to match and to receive a proximal edge of the single lens or a portion thereof. In some embodiments, the rocker frame further comprises a groove correspondingly sized and shaped to match and to receive the inferior edges, side edges and central notched region of the single lens or a portion thereof. In some embodiments, the rocker frame further comprises a pair of permanently affixed nose paddles protruding posteriorly from a middle inverted "v" region of the rounded "w" shape, the middle inverted "v" region configured to generally accommodate the shape of the bridge of the nose of the wearer and configured to releasably attach at or about the central notched region of the single lens. In some embodiments, the frame bridge further comprises a protrusion in the groove configured to align with a mating indention along the proximal edge in the lens. In some embodiments, the single lens further comprises an indent along the proximal edge configured to align with the protrusion in the groove of the frame bridge to centralize the lens within the frame bridge. In some embodiments, the middle inverted "v" region further comprises: at least one first lens attachment feature, wherein the at least one first lens attachment feature comprises; an indent, a groove, a slot, a bump, a protrusion or a combination thereof. In some embodiments, the pair of permanently affixed nose paddles is configurable to accept a set of nose pads connected by a flexible pad linker arch also configured to generally accommodate the shape of the bridge of the nose of the wearer, wherein each nose pad in the set of nose pads comprises a pocket configured to receive one of the nose paddles. In some embodiments, the central notched region of the single lens comprises a first lateral attachment feature and a second lateral attachment feature configured to releasably attach to at least a portion of a middle inverted "v" region of the rounded "w" shape of the rocker frame. In some embodiments, the central notched region of the single lens further comprises a proximal attachment feature configured to releasably attach to a proximal portion of a middle inverted "v" region of the rounded "w" shape of the rocker frame. In some embodiments, the set of nose pads connected by the flexible pad linker arch comprises a plurality of sizes or shapes configured to conform to a plurality of nose shapes and sizes of the wearer. In some embodiments, the set of nose pads connected by the flexible pad linker arch are releasably detachable from the pair of permanently affixed nose paddles. In some embodiments, the set of nose pads connected by the flexible pad linker arch comprises a plurality of sizes or shapes configured to conform to a plurality of nose shapes and sizes of the wearer. In some embodiments, the set of nose pads further comprise: a first nose pad with a first lateral side and a first medial side, and a second nose pad with a second medial side and second lateral side extending therefrom; wherein the first medial side of the first nose pad and the second medial side of the second nose pad are configured to rest on lateral cartilages, lesser alar cartilages, supra alar creases, dense connective tissue above the nostrils of the wearer, or a combination thereof. In some embodiments, the set of nose pads connected by the flexible pad linker arch and nose paddles are a single component. In some embodiments, the set of nose pads connected by the flexible pad linker arch and nose paddles are an assembly comprising two or more components. In some embodiments, the first medial side of the first nose pad and the second medial side of the second nose pad further comprise a textured gripping surface. In some embodiments, the eyeglass assembly further comprises: a first temple arm having a first temple leaf and a first temple extension; a second temple arm, with a second temple leaf and a second temple extension; wherein the first temple leaf is configured for attachment to a first end of the frame bridge at or about a frame bridge knuckle feature through a first temple arm knuckle with a first hinge pin, wherein the first temple extension is configurable to generally conform to a lateral shape of a wearer's head, extending over the proximal portion of a wearer's first ear between a first auricle of the first ear and a wearer's skull, wherein the second temple leaf is configured for attachment to a second end of the frame bridge at or about a frame bridge knuckle feature through a second temple arm knuckle with a second hinge pin, and wherein the second temple extension is configurable to generally conform to a lateral shape of a wearer's head, extending over the proximal portion of a wearer's second ear between a second auricle of the second ear and the wearer's skull. In some embodiments, the first temple extension, and the second temple extension each further comprise a textured gripping surface. In some embodiments, the eyeglass assembly further comprises: a first temple extension textured gripping surface, and a second temple extension textured gripping surface; wherein the first temple extension textured gripping surface is configured for insertion onto, over, or surrounding the first temple extension, and wherein the second temple extension textured gripping surface is configured for insertion onto, over, or surrounding the second temple extension. In some embodiments, the eyeglass assembly further comprises: a first temple extension end cap; and a second temple extension end cap. In some embodiments of the eyeglass assembly, the frame bridge, the first temple arm, and the second temple arm are a multi-part assembly. In some embodiments, the multi-part assembly comprises: a first knuckle; and a second knuckle; wherein the first knuckle and the second knuckle are further assembled to the frame bridge with mating compressing joint assemblies, hinge pins, or a combination thereof. In some embodiments, the eyeglass assembly further comprises: a first temple extension textured gripping surface, and a second temple extension textured gripping surface; wherein the first temple extension textured gripping surface is configured for insertion onto, over, or surrounding the first temple extension, and wherein the second temple extension textured gripping surface is configured for insertion onto, over, or surrounding the second temple extension. In some embodiments, the eyeglass assembly further comprises: a first temple extension end cap; and a second temple extension end cap. In some embodiments, the single lens is provided in more than one size. In some embodiments, the single lens is provided in two or more heights. In some embodiments, the single lens is configurable to extend approximately 2 mm to approximately 10 mm higher above the eyebrows of the wearer than a standard height lens. In some embodiments, the single lens is configurable to extend approximately 2 mm to approximately 10 mm lower below the eyes of the wearer than a standard height lens, to approximately the cheekbone. In some embodiments, the single lens is configured to extend both higher above the eyebrows of the wearer than a standard height lens and extend lower below the eyes of the wearer than a standard height lens within an overall range of approximately 2 mm to approximately 10 mm. In some embodiments of the eyeglass assembly comprising a rocker frame, the rocker frame is configured in two or more sizes to accommodate lenses being provided in two or more sizes. In some embodiments, the single lens is configurable to accommodate a corrective lens prescription for a left eye only, a right eye only, or both left and right eye. In some embodiments, the single lens is configurable to accommodate: an anti-reflective treatment; a photochromic treatment; a polarized treatment; a tinting treatment; a scratch resistant treatment; a mirroring treatment; an anti-fogging treatment; a hydrophobic treatment; an oleo-phobic treatment or a combination thereof. In some embodiments, the first temple extension and the second temple extension comprise a core metal substrate. In some embodiments, the core metal substrate comprises titanium. In some embodiments, the first temple extension comprising the core metal substrate and the second temple extension comprising the core metal substrate are molded sub-assemblies. In some embodiments, the core metal substrate of the molded sub-assemblies further comprises a removably replaceable molded polymeric textured surface.

Provided herein is an eyeglass assembly comprising: a first temple lug comprising a first temple tab thru-hole, a first temple lens retention step receiver, and a first lens locking feature; a second temple lug comprising a second temple tab thru-hole, a second temple lens retention step receiver, and a second lens locking feature; a single lens configuration comprising; a central notched region configured to accommodate the shape of a nose of a wearer; a first lens tab, a first lens retention step, a first lug locking notch and a first rocker notch; a second lens tab, a second lens retention step, a second lug locking notch and a second rocker notch; a rocker frame having a first end and a second end, the rocker frame comprising a generally rounded "w" shape configured to support inferior edges, side edges and the central notched region of the single lens, a first rocker notch receiver near the first end and a second rocker notch receiver near the second end; wherein the first lens tab and the first lens retention step are configured to releasably insert into the first temple tab thru-hole and the first temple lens retention step receiver of the first temple lug respectively, such that the first lens tab or a portion thereof, protrudes through the first temple tab thru-hole, the first lens locking feature is configured to insert into the first lug locking notch and releasably secure the temple lug to the first side of the lens; and wherein the second lens tab and the second lens retention step are configured to releasably insert into the second temple tab thru-hole and the second temple lens retention step receiver of the second temple lug respectively, such that the second lens tab or a portion thereof, protrudes through the second temple tab thru-hole, the second lens locking feature is configured to insert into the second lug locking notch and releasably secure the temple lug to the second side of the lens, the first rocker notch receiver near the first end of the rocker frame is affixed to the first rocker notch of the single lens and the first end of the rocker frame is configured to blendedly align with the inferior edge of the first temple lug near the end and the first lens retention step, and the second rocker notch receiver near the second end of the rocker frame is affixed to the second rocker notch of the single lens and the second end of the rocker frame is configured to blendedly align with the inferior edge of the second temple lug near the second end and the second lens retention step. In some embodiments, the rocker frame further comprises a groove correspondingly sized and shaped to match and to receive the inferior edges, side edges and central notched region of the single lens or a portion thereof. In some embodiments, the rocker frame further comprises a pair of permanently affixed nose paddles protruding posteriorly from a middle inverted "v" region of the rounded "w" shape, the middle inverted "v" region configured to generally accommodate the shape of the bridge of the nose of the wearer and configured to releasably attach at or about the central notched region of the single lens. In some embodiments, the middle inverted "v" region further comprises: at least one first lens attachment feature, wherein the at least one first lens attachment feature comprises; an indent, a groove, a slot, a bump, a protrusion or a combination thereof. In some embodiments, the pair of permanently affixed nose paddles is configurable to accept a set of nose pads connected by a flexible pad linker arch also configured to generally accommodate the shape of the bridge of the nose of the wearer, wherein each nose pad in the set of nose pads comprises a pocket configured to receive one of the nose paddles. In some embodiments, the central notched region of the single lens comprises a first lateral attachment feature and a second lateral attachment feature configured to releasably attach to at least a portion of the middle inverted "v" region of the rounded "w" shape of the rocker frame. In some embodiments, the central notched region of the single lens further comprises a proximal attachment feature configured to releasably attach to a proximal portion of the middle inverted "v" region of the rounded "w" shape of the rocker frame. In some embodiments, the set of nose pads connected by a flexible pad linker arch comprises a plurality of sizes or shapes configured to conform to a plurality of nose shapes and sizes of the wearer. In some embodiments, the set of nose pads connected by the flexible pad linker arch are releasably detachable from the pair of permanently affixed nose paddles. In some embodiments, the set of nose pads connected by a flexible pad linker arch comprises a plurality of sizes or shapes configured to conform to a plurality of nose shapes and sizes of the wearer. In some embodiments, the set of nose pads further comprise: a first nose pad with a first lateral side and a first medial side, and a second nose pad with a second medial side and second lateral side extending therefrom; wherein the first medial side of the first nose pad and the second medial side of the second nose pad are configured to rest on lateral cartilages, lesser alar cartilages, supra alar creases, dense connective tissue above the nostrils of the wearer, or a combination thereof. In some embodiments, the set of nose pads connected by the flexible pad linker arch and the nose paddles are a single component. In some embodiments, the set of nose pads connected by the flexible pad linker arch and the nose paddles are an assembly comprising two or more components. In some embodiments, the first medial side of the first nose pad and the second medial side of the second nose pad further comprise a textured gripping surface. In some embodiments, the eyeglass assembly further comprises: a first temple arm having a first temple leaf and a first temple extension; a second temple arm, with a second temple leaf and a second temple extension; wherein the first temple leaf is configured for attachment to the first temple lug at the knuckle feature through a first temple arm knuckle with a first hinge pin, wherein the first temple extension is configurable to generally conform to a lateral shape of a wearer's head, extending over the proximal portion of a wearer's first ear between a first auricle of the first ear and a wearer's skull, wherein the second temple leaf is configured for attachment to a second temple lug at the knuckle feature through a second temple arm knuckle with a second hinge pin, and wherein the second temple extension is configurable to generally conform to a lateral shape of a wearer's head, extending over the proximal portion of a wearer's second ear between a second auricle of the second ear and the wearer's skull. In some embodiments, the first temple extension, and the second temple extension each further comprise a textured gripping surface. In some embodiments, the eyeglass assembly further comprises: a first temple extension textured gripping surface, and a second temple extension textured gripping surface; wherein the first temple extension textured gripping surface is configured for attachment to, or over the first temple extension, and wherein the second temple extension textured gripping surface is configured for attachment to, or over the second temple extension. In some embodiments, the eyeglass assembly further comprises: a first temple extension end cap; and a second temple extension end cap. In some embodiments, the first temple lug and the first temple arm are components of a multi-part assembly and the second temple lug and the second temple arm are components of a multi-part assembly. In some embodiments, the first temple lug and the first temple arm are a single component and the second temple lug and the second temple arm are a single component. In some embodiments, the first temple extension and the second temple extension further comprise a textured gripping surface. In some embodiments, the first temple extension and the second temple extension further comprise a textured gripping surface. In some embodiments, the single lens is provided in more than one size. In some embodiments, the single lens is provided in two or more heights. In some embodiments, the single lens is configurable to extend approximately 2 mm to approximately 10 mm higher above the eyebrows of the wearer than a standard height lens. In some embodiments, the single lens is configurable to extend approximately 2 mm to approximately 10 mm lower below the eyes of the wearer than a standard height lens, to approximately the cheekbone. In some embodiments, the single lens is configured to extend both higher above the eyebrows of the wearer than a standard height lens and extend lower below the eyes of the wearer than a standard height lens within an overall range of approximately 2 mm to approximately 10 mm. In some embodiments of the eyeglass assembly comprising a rocker frame, the rocker frame is configured in two or more sizes or heights to accommodate lenses being provided in two or more sizes or heights. In some embodiments, the single lens is configurable to accommodate a corrective lens prescription for a left eye, a right eye, or both left and right eye. In some embodiments, the single lens is configurable to accommodate: an anti-reflective treatment; a photochromic treatment; a polarized treatment; a tinting treatment; a scratch resistant treatment; a mirror coating treatment; an anti-fog coating treatment; a hydro-phobic coating treatment; an oleo-phobic coating treatment or a combination thereof. In some embodiments, the first temple extension and the second temple extension comprise a core metal substrate. In some embodiments, the core metal substrate comprises titanium. In some embodiments, the first temple extension comprising the core metal substrate and the second temple extension comprising the core metal substrate are molded sub-assemblies. In some embodiments, the core metal substrate sub-assemblies further comprise a removably replaceable molded polymeric textured surface.

Further Embodiments

In some embodiments of any one of the eyeglass assemblies previously described, the split nose bridge configuration of the nose bridge insert is a molded component. In some embodiments, the molded split nose bridge insert comprises: a coupler portion and a pad linker arch; wherein the coupler portion of the molded split nose bridge insert is configured to releasably attach the central notched region of the single lens, and wherein the pad linker arch is configured to be posteriorly offset from the coupler portion and is further configured to straddle the bridge of a nose of the wearer. In some embodiments, the molded split nose bridge insert comprises two or more materials. In some embodiments, a material of the coupler portion and a material of the pad linker arch of the molded split nose bridge insert are the same material. In some embodiments, a material of the coupler portion and a material of the pad linker arch of the molded split nose bridge insert are different materials. In some embodiments, a material of the coupler portion and a material of the pad linker arch of the molded split nose bridge insert comprise the same durometer. In some embodiments, a material of the coupler portion and a material of the pad linker arch of the molded split nose bridge insert comprise different durometers. In some embodiments, the durometer of the coupler portion is harder than the durometer of the pad linker arch. In some embodiments, the coupler portion and the pad linker arch of the molded split nose bridge insert are molded together. In some embodiments, the coupler portion and the pad linker arch of the molded split nose bridge insert are assembled after molding. In some embodiments of the semi-rimmed eyeglass assembly, the single lens comprises: variable shapes; variable widths between the ends of the frame bridge; variable widths below the frame bridge; variable radii of curvature and/or variable lens heights. In some embodiments of the rimless eyeglass assembly, the single lens comprises: variable shapes; variable widths between the first temple lug and the second temple lug; and secondary variable widths below the first temple lug and the second temple lug; variable radii of curvature and/or variable lens heights. In some embodiments of the twin lens eyeglass assembly, the first lens and the second lens comprise: variable shapes; variable widths between the end of the frame bridge and the integral nose bridge; variable widths between the integral nose bridge and below the frame bridge; variable radii of curvature and/or variable lens heights. In some embodiments, the bridge frame, the first temple arm and the second temple extension are a multi-part assembly. In some embodiments, the first temple extension and the second temple extension comprise a core metal substrate. In some embodiments, the first temple extension and the second temple extension core metal substrate comprise titanium. In some embodiments, the first temple extension and the second temple extension comprising the core metal substrate are molded sub-assemblies. In some embodiments, the first temple extension and the second temple extension further comprise textured gripping surfaces. In some embodiments, the textured gripping surface is configured for insertion onto, over, or surrounding the first temple extension and the second temple extension. In some embodiments, the bridge frame, the first temple arm and the second temple arm are a single molded component. In some embodiments, the first temple arm and the second temple arm further comprise textured gripping surfaces. In some embodiments, the textured gripping surface is molded into the first temple arm and the second temple arm. In some embodiments, the eyeglass assembly further comprises a first temple arm and a second temple arm, wherein the bridge frame, the first temple arm and the second temple arm are a single molded component. In some embodiments, a material for manufacturing the lens comprises plastics, comprising: polycarbonate, high-index plastics, polyurethanes, urethane-based monomers, allyl diglycol carbonate, such as; CR-39, CR-424, CR-607, CR-630; thiourethane polymers, nylon, glass, or Crown glass. In some embodiments, the temple arm or the temple extension comprises: titanium; stainless steel; aluminum; copper; nickel; Beta Ti; nitinol (NiTi); or alloys thereof. In some embodiments, the temple arm or the temple extension comprises: malleable plastic; flexible plastic; or pliant plastic. In some embodiments, the first nose pad arm further comprises a first nose pad comprising a first lateral side and a first medial side, and the second nose pad arm further comprises a second nose pad comprising a second lateral side and a second medial side. In some embodiments, at least the first medial side of the first nose pad and the second medial side of the second nose pad further comprise a textured gripping surface. In some embodiments, the first nose pad further comprises a first nose pad attachment feature configured to mate with the first nose pad arm and the second nose pad further comprises a second nose pad attachment feature configured to mate with the second nose pad arm. In some embodiments, the first nose pad is molded integrally to the first nose pad arm and the second nose pad is molded integrally to the second nose pad arm. In some embodiments, the first lens and the second lens each comprise spherical base curves from about 0.50 D to about 12.00 D. In some embodiments, the first lens and the second lens each comprise a vertical base curve and a different horizontal base curve. In some embodiments, the first lens comprises a spherical base curve and the second lens comprises a vertical base curve and a different horizontal base curve. In some embodiments, the second lens comprises a spherical base curve and the first lens comprises a vertical base curve and a different horizontal base curve.

In some embodiments of any one of the eyeglass assemblies previously described, the nose bridge insert comprises a plurality of internal widths configured to straddle different widths of a wearer's nose bridge. In some embodiments, the nose bridge insert comprises a plurality of internal heights configured to straddle different heights of a wearer's nose bridge. In some embodiments, the nose bridge insert comprises a plurality of internal widths and internal heights configured to straddle different widths and heights of a wearer's nose bridge. In some embodiments, the set of nose pads comprises a plurality of internal widths configured to straddle different widths of a wearer's nose bridge. In some embodiments, the set of nose pads comprises a plurality of internal heights configured to straddle different heights of a wearer's nose bridge. In some embodiments, the individual nose pads of each set of nose pads comprises a plurality of lengths or heights configured to adjust the height of the eyeglass assembly on the of a wearer's lateral cartilages, lesser alar cartilages, supra alar creases, dense connective tissue above the nostrils of the wearer, or a combination thereof. In some embodiments of eyeglass assembly, the pad linker arch of the split nose bridge insert comprises a plurality of internal widths configured to straddle different widths of a wearer's nose bridge. In some embodiments, the pad linker arch of the split nose bridge insert comprises a plurality of internal heights configured to straddle different heights of a wearer's nose bridge. In some embodiments, the pad linker arch of the split nose bridge insert comprises a plurality of internal widths and internal heights configured to straddle different widths and heights of a wearer's nose bridge. In some embodiments, the pad linker arch of the nose bridge insert is configurable to raise or lower the eyeglass assembly on the bridge of the wearer's nose such that the inferior edge of the lens or lenses rests approximately on or about the cheekbone(s) of the wearers face. In some embodiments of eyeglass assembly, the nose bridge insert or any component thereof comprises a thermal plastic elastomer. In some embodiments, the set of nose pads or any component thereof comprises a thermal plastic elastomer. In some embodiments, the removably replaceable molded polymeric textured surface comprises a thermal plastic elastomer (TPE).

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 29B is another view of the frame bridge shown in FIG. 1C, used with the rimmed version of eyeglasses with an interchangeable single lens, and interchangeable inferior rocker frame of FIG. 29A.

FIG. 29C is an illustrative section view of the interchangeable single lens of FIG. 29A.

FIG. 29D is an illustrative detail view connecting interface of the interchangeable single lens of FIG. 29D.

FIG. 30A is an illustrative front ISO view of one embodiment of a version of eyeglasses with an interchangeable single lens, and interchangeable inferior rocker frame.

FIG. 30B is a detail view of the inferior rocker frame and central notch lens capture connection features and nose paddles of FIG. 30A.

FIG. 30C is a detail view of the lens capture connection feature of the inferior rocker frame of FIG. 30B.

DETAILED DESCRIPTION OF THE INVENTION

Figure 1A:
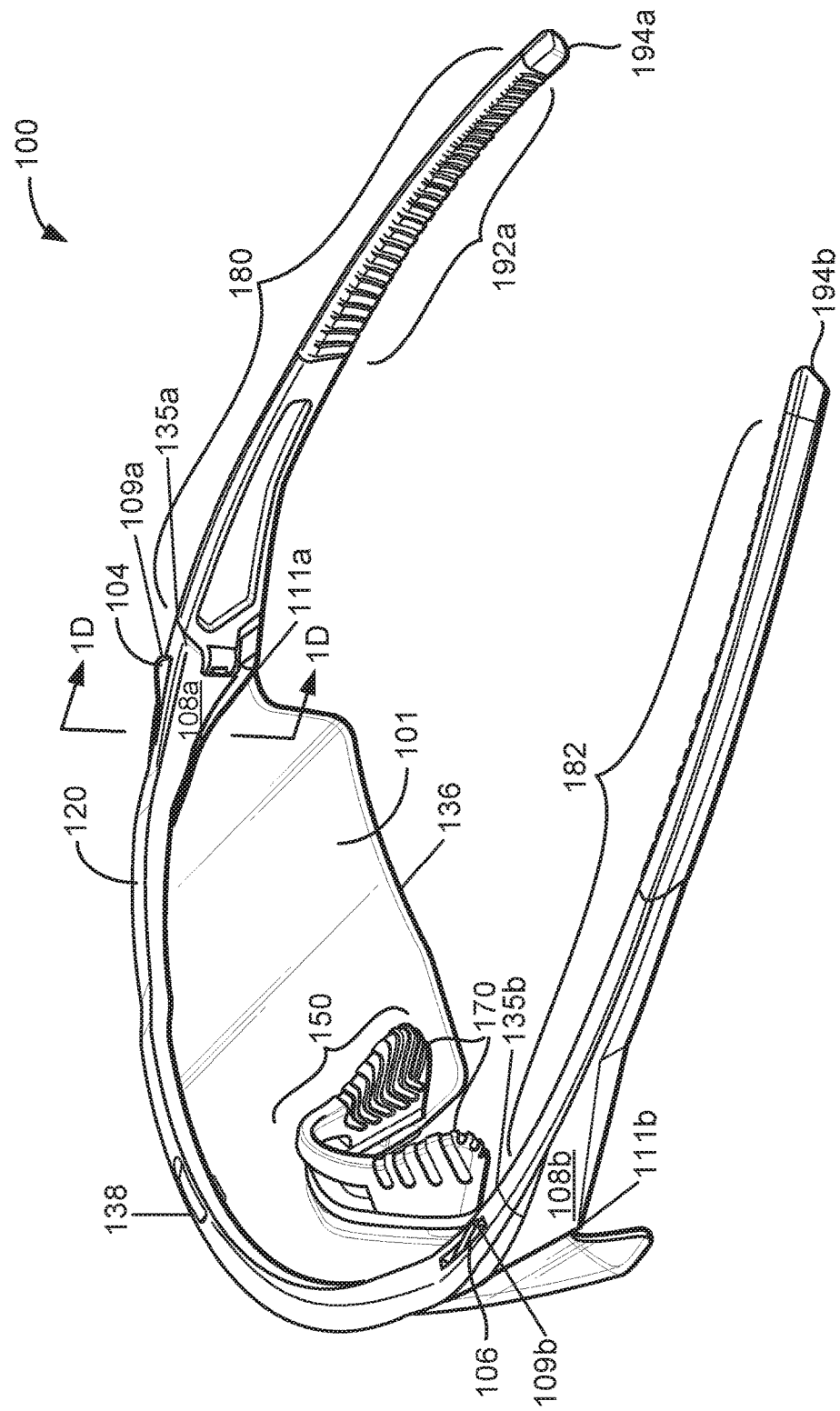
FIG. 1A is a perspective view (top left side) view of one embodiment of a semi-rimmed version of eyeglasses with an interchangeable single lens.

Provided herein are eyeglass assemblies comprising bridge frames, temple lugs or lens receiving portions with unique capture features to retain lenses having lens tabs configured to insert and become removably captured in the bridge frames, temple lugs or lens receiving portions. The lens tabs protrude through the lens tab thru-holes of the bridge frames, temple lugs or lens receiving portions to provide a visual and tactile confirmation of lens capture.

The assemblies provide a simpler way for wearers to independently replace or switch lenses in their eyeglass assemblies when in need of repair, or to exchange the lenses to accommodate another need.

The features described for the eyeglasses disclosed herein are relevant to eyeglasses intended for or designed for athletes, athletic competition and casual sporting wear. Frequently, individuals involved in outdoor activities such as tennis, golf, biking, running or triathlons, will have a need for rugged, yet fashionable eyewear that is customizable for their individual needs. However, as a matter of convenience, individuals do not want to carry around multiple pairs of eyeglasses as spares, or extra glasses with different lenses for things like sunglasses or reading prescriptions.

Prior solutions have included bulky overlay glasses to provide some form of anterior and/or lateral shading that rest over the prescription lenses worn by an individual. These are often looked upon as not being very flattering or fashionable.

Alternatively, others have provided "clip-on" overlay lenses to provide for limited convertibility of prescription lenses to prescription sun glasses. However, those lenses also frequently have a separate frame, with an attachment means for securing to the original frames and lenses. Unfortunately, the attachment means for "clip-on" overlay lenses often involves a clip that attaches over the frame and often onto the lenses of the prescription glasses, oftentimes scratching the prescription lenses over time.

The inventors herein have devised a solution that allows a wearer to conveniently remove and replace just the lens or lenses, when the need to do so arises. The attachment tabs on the lenses and the receiving means in the frames, temple lugs or lens receiving portions provide both a tactile means for assuring the secure attachment (or removal) of the lens from the frame, temple lugs or lens receiving portions, as well as a clear visual indication.

Further still, the replacement lenses are now provided in different lens heights, and in some cases, in different widths to provide the wearer with customizable sizing and added eye protection from wind or flying debris.

Still further, alternative bridge frame and/or rocker frame designs provide the wearer with variable rigidity and strength in each eyewear design.

Replacement lenses and frames can be easily carried in either a thin and secure case for just lenses that need not be as a bulky as the eyeglass case for the glasses themselves. Alternately the eyeglass case can be configured to carry one or more spare lenses and frames. Replacement lenses can include duplicate lenses in the event of scratches, or alternate lenses having different tinting shades for different sun conditions, or with alternate prescription requirements for a left eye, a right eye, or both eyes, or to provide an anti-reflective treatment; a photochromic treatment; a polarized treatment; a tinting treatment; a scratch resistant treatment; a mirror coating treatment; an anti-fog coating treatment; a hydro-phobic coating treatment; an oleo-phobic coating treatment; or any combination of the coatings or treatments described herein.

In an effort to provide both practical and stylish options, the inventors have devised a plurality of variations of frame and lens combinations comprising full-rimmed, semi-rimmed, rimless, and twin or dual semi-rimmed eyeglasses, each having the unique attachment mechanism to be described in further detail below. Further, the full rimmed and semi-rimmed versions have interchangeable frame and lens components and, at a minimum, the multiple eyewear variations comprise interchangeable lenses.

As used herein, a single lens configuration design refers to a streamline design style comprising properties configured to increase the aerodynamic properties of the wearer's face. Styles of this type are commonly referred to as "wrap" style, or alternately are referred to as "shield" style sport glasses.

The "wrap-around" frame styles commonly have lenses that cover a large portion of the area around a wearer's eyes, intended to maximize field of view and minimize or prevent UV rays from penetrating the wearer's eyes through the side. Additionally the "wrap-around" frame style further protects from excessive amounts of wind and provides added protection from flying objects such as dirt, gravel, sand, water, snow and other fragments Athletes participating in running, cycling, golfing, driving, shooting, water, snow and beach activities often prefer this style. Variations of the "wrap" frame style are also provided with adjustable temple arms that are spring-loaded to help them stay on the wearer's face during vigorous activities. A unique version of adjustable spring-loaded temple arms is also provided for each of the eyewear versions described herein.

Alternately, the "shield" frame styles commonly have even larger lenses that cover most or all of the area around a wearer's eyes and additional areas above below and beside the eye sockets. These styles are also intended to maximize field of view and minimize or prevent UV rays from penetrating the wearer's eyes through the side. Athletes participating in running, biking and shooting activities often prefer this style because it offers a greater field of vision and provides added protection from road debris that is often thrown up from tires or shoes used by nearby athletes. Variations of the "shield" frame style are also provided with adjustable temple arms that are spring-loaded to help them stay on the wearer's face during vigorous activities like triathlons and IronMan® athletic competitions, as well as other endurance activities.

In some embodiments, either the "wrap" style, or the "shield" style sport glasses are configurable with or without a frame rim to provide an individually desired amount of support, stiffness and/or amount of protection to the single lens.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

As used herein, the term "left" relative to any portion of the eyeglass assemblies described herein, refer to an as-worn "left" side of the element described relative to the left side of the body of the wearer. For example, a nose pad that is referred to as a left nose pad is one that when worn, is referred to by the wearer, as the wearer's left nose pad from the wearer's perspective as they look forward through the eyeglass assembly. Likewise, as used herein, the term "right" relative to any portion of the eyeglass assemblies described herein, refers to an as-worn "right" side of the element described relative to the right side of the body of the wearer. For example, a nose pad that is referred to as a right nose pad is one that, when worn, is referred to by the wearer, as the wearer's right nose pad from the wearer's perspective as they look forward through the eyeglass assembly.

As used herein, and unless otherwise specified, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 30%, 25%, 20%, 15%, 10%, 9%, 8%, 7%, 6%, 5%, 4%, 3%, 2%, 1%, 0.5%, 0.1%, or 0.05% of a given value or range. In certain embodiments, the term "about" or "approximately" means within 40.0 mm, 30.0 mm, 20.0 mm, 10.0 mm 5.0 mm 1.0 mm, 0.9 mm, 0.8 mm, 0.7 mm, 0.6 mm, 0.5 mm, 0.4 mm, 0.3 mm, 0.2 mm or 0.1 mm of a given value or range. In certain embodiments, the term "about" or "approximately" means within 1 hour, within 45 minutes, within 30 minutes, within 25 minutes, within 20 minutes, within 15 minutes, within 10 minutes, within 5 minutes, within 4 minutes, within 3 minutes within 2 minutes, or within 1 minute. In certain embodiments, the term "about" or "approximately" means within 20.0 degrees, 15.0 degrees, 10.0 degrees, 9.0 degrees, 8.0 degrees, 7.0 degrees, 6.0 degrees, 5.0 degrees, 4.0 degrees, 3.0 degrees, 2.0 degrees, 1.0 degrees, 0.9 degrees, 0.8 degrees, 0.7 degrees, 0.6 degrees, 0.5 degrees, 0.4 degrees, 0.3 degrees, 0.2 degrees, 0.1 degrees, 0.09 degrees. 0.08 degrees, 0.07 degrees, 0.06 degrees, 0.05 degrees, 0.04 degrees, 0.03 degrees, 0.02 degrees or 0.01 degrees of a given value or range.

As used herein, the terms "connected", "operationally connected", "coupled", "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the term indicates that the actual linkage or coupling may take a variety of forms, which in certain instances will be readily apparent to a person of ordinary skill in the relevant technology.

As used herein, the terms "comprises", "comprising", or any other variation thereof, are intended to cover a nonexclusive inclusion, such that a process, method, article, or apparatus that comprises a list of elements does not include only those elements but may include other elements not expressly listed or inherent to such process, method, article, or apparatus.

As used herein, the terms "user", "subject" or "wearer" are used interchangeably. As used herein, the terms "wearer", "user", "subject" and plural forms thereof refers to an animal (e.g., birds, reptiles, and mammals), preferably a mammal including a primate (e.g., a monkey, chimpanzee, and a human). In certain embodiments, the mammal is 0 to 6 months old, 6 to 12 months old, 1 to 5 years old, 5 to 10 years old, 10 to 15 years old, 15 to 20 years old, 20 to 25 years old, 25 to 30 years old, 30 to 35 years old, 35 to 40 years old, 40 to 45 years old, 45 to 50 years old, 50 to 55 years old, 55 to 60 years old, 60 to 65 years old, 65 to 70 years old, 70 to 75 years old, 75 to 80 years old, 80 to 85 years old, 85 to 90 years old, 90 to 95 years old or 95 to 100. In a further embodiment, the subject, user or wearer is a human.

As used herein, and unless otherwise specified, the term "anterior" refers to human anatomy and means the front surface of the body; often used to indicate the position of one structure relative to another, that is, situated nearer the front part of the body. Alternately, it may also refer in a similar fashion to an apparatus or structure.

As used herein, and unless otherwise specified, the term "posterior" refers to human anatomy and means the back surface of the body; Often used to indicate the position of one structure relative to another, that is, nearer the back of the body. Alternately, it may also refer in a similar fashion to an apparatus or structure.

As used herein, and unless otherwise specified, the term "superior" refers to human anatomy and means situated nearer the vertex of the head in relation to a specific reference point; opposite of inferior. It may also mean situated above or directed upward. Alternately, it may also refer in a similar fashion to an apparatus or structure.

As used herein, and unless otherwise specified, the term "inferior" refers to human anatomy and means situated nearer the soles of the feet in relation to a specific reference point; opposite of superior. It may also mean situated below or directed downward. Alternately, it may also refer in a similar fashion to an apparatus or structure.

As used herein and unless otherwise specified, the term "medial" refers to human anatomy and means situated toward the median plane or midline of the body. Alternately, it may also refer in a similar fashion to an apparatus or structure.

As used herein, and unless otherwise specified, the term "lateral" refers to human anatomy and means denoting a position farther from the median plane or midline of the body or a structure. It may also mean "pertaining to a side". Alternately, it may also refer in a similar fashion to an apparatus or structure.

As used herein, and unless otherwise specified, the term "transparent" means allowing light to pass through so that objects can be distinctly seen, as in "transparent blue water". Common synonymous terms may include clear, crystal clear, see-through, pellucid and limpid. In some embodiments, it may be advantageous to modify the meaning of transparent wherein an alternative meaning may include translucent or shaded to mean that the clarity remains unaltered or dulled, but the "brightness", "tone", "luminance", "luminosity", and or "lightness" may be altered, allowing filtered light to pass through such as for example may occur with windows, sunglasses, one-way mirrored coatings, clear, tinted or colored lenses.

Figure 1B:
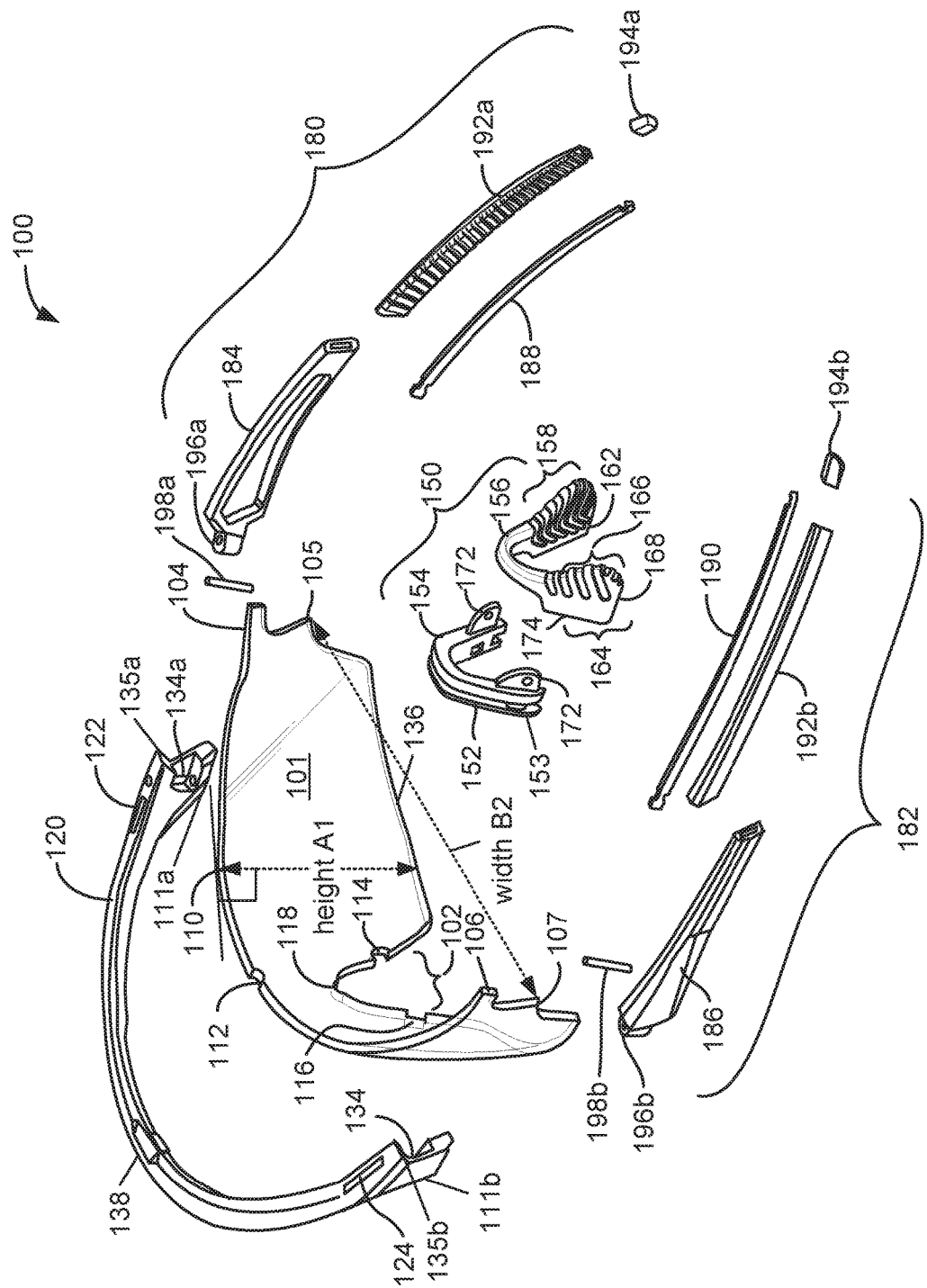
FIG. 1B is an exploded perspective view (top left side) view of the eyeglasses of FIG. 1A.
Figure 1C:
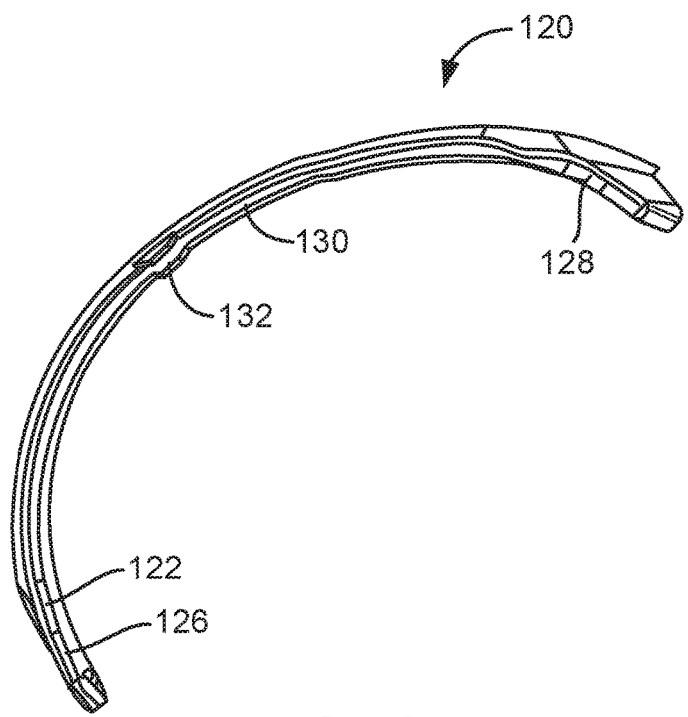
FIG. 1C is a perspective view of the underside of the frame bridge of the semi-rimmed version of eyeglasses of FIG. 1A.
Figure 1D:
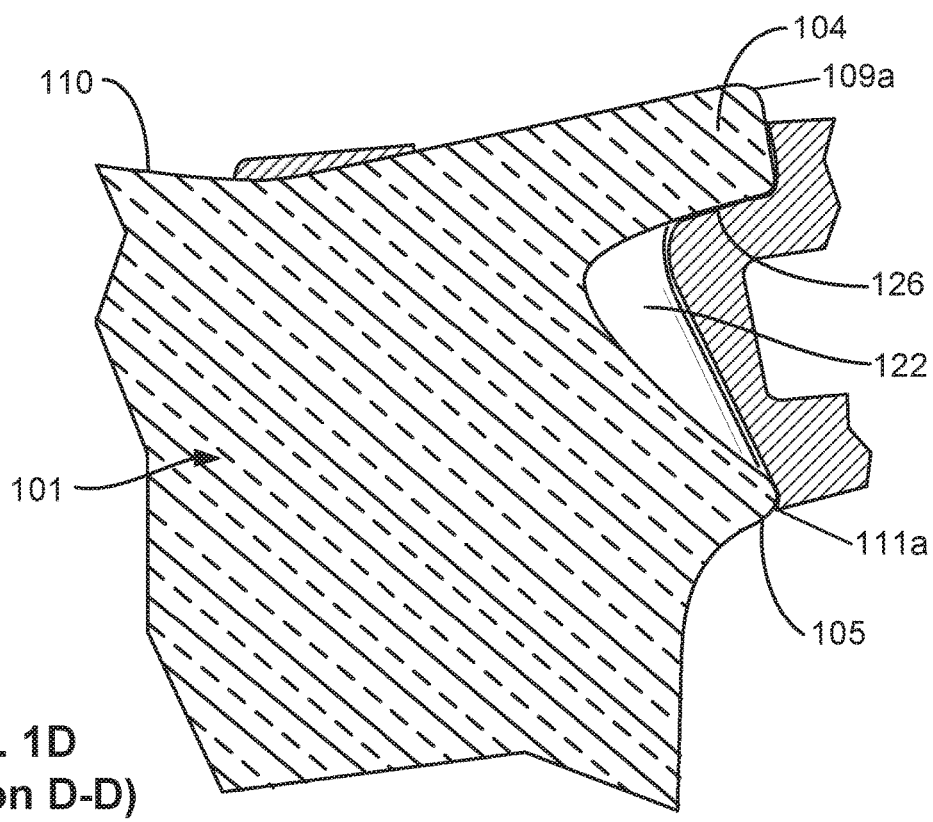
FIG. 1D is a section view of the connecting interface between the lens tab and the frame bridge for a semi-rimmed version of eyeglasses with an interchangeable single lens.

Provided herein is an eyeglass assembly with a bridge frame having a first temple tab thru-hole and a first temple lens retention step receiver, a second temple tab thru-hole and a second temple lens retention step receiver; a nose bridge insert; at least one lens with lens tabs and lens retention steps configured to insert into the temple tab thru-holes and the temple lens retention step receivers of the bridge frame such that the ends of the lens tabs protrude through the temple tab thru-holes. As illustrated in FIGS. 1A thru 1C, at least, in some embodiments of the eyeglasses, the eyeglass assembly is a semi-rimmed eyeglass assembly 100. As illustrated in FIGS. 1A thru 1C, in some embodiments of the eyeglasses, the eyeglass assembly comprises: a frame bridge 120 comprising a first lens tab thru-hole 122, a first lens retention step receiver 126, a second lens tab thru-hole 124 and a second lens retention step receiver 128; a single lens configuration 101 comprising; a central notched region 102 configured to accommodate the shape of a nose of a wearer; a first lens tab 104 and a first lens retention step 105; a second lens tab 106 and a second lens retention step 107; wherein the first lens tab 104 and the first lens retention step 105 are configured to releasably insert into the first lens tab thru-hole 122 and the first lens retention step receiver 126 of the frame bridge 120, as illustrated in FIG. 1D, such that an end of the first lens tab protrudes through the first lens tab thru-hole, and wherein the second lens tab 106 and the second lens retention step 107 are configured to releasably insert into the second lens tab thru-hole 124 and the second lens retention step receiver 128 of the frame bridge such that an end of the second lens tab protrudes through the second lens tab thru-hole, thereby releasably locking the single lens into the frame bridge.

The single lens 101 of embodiments of the semi-rimmed eyeglass assembly 100, or the single lens 201 of the rimless eyeglass assembly 201, comprises a single transparent lens that spans across both the right and left eyes of a wearer. In contrast, a first lens 301 of a twin lens eyeglass assembly 300 only spans a single eye (e.g. right eye as depicted for example in FIG. 16A, FIG. 16B, FIG. 18A, FIG. 21, and/or FIG. 22, or left eye, but not both eyes), wherein the twin lens eyeglass assembly 300 comprises a second lens 311 that only spans the other single eye (e.g. left eye as depicted for example in FIG. 16A, FIG. 16B, FIG. 18A, FIG. 21, and/or FIG. 22, or right eye, respectively, but not both eyes).

As further illustrated in FIG. 1C, in some embodiments, the frame bridge comprises a retaining edge groove 130 to receive a proximal edge 110 of the single lens 101. In some embodiments, the frame bridge further comprises a capture protrusion 132 to releasably receive the proximal edge 110 of the single lens 101.

Further still, as seen in FIG. 1B, in some embodiments, the single lens further comprises a proximal edge indent 112 for releasable attachment to the frame bridge capture protrusion 132. The capture protrusion in the groove of the frame retaining edge serves to receive and align the indent along the proximal edge of the single lens, thus aligning and centering the entire lens within the frame.

In some embodiments, the one or more of the single lens 101, the single lens 201, the first lens 301, and the second lens 311 is manufactured from plastic, such as polycarbonate, high-index plastics, polyurethanes, urethane-based monomers, such as Tribrid, and Trivex developed by Simula Inc. and used for wear and scratch resistance and ultra-high impact resistant lenses; allyl diglycol carbonate, such as CR-39, CR-424, CR-607, CR-630, developed by Columbia-Southern Chemical Corp, a subsidiary of PPG Company, and used in the fabrication of photochromic lenses (During the Second World War, Columbia-Southern produced a line of 200 polymers. CR-39 (CR for "Columbia Resins" and 39 denoting it as the 39th polymer) had qualities suitable for plastic lenses, making it the most noteworthy of the polymers); thiourethane polymers (MR Series), developed by Mitsui Chemicals and used for high refractive index, high ABBE number, low specific gravity and high impact resistance lenses; nylon, glass, or Crown glass (glass made without lead or iron).

In some embodiments, the eyeglass assembly 100 further comprises a nose bridge insert 150 configured to releasably attach to the central notched region 102 of the single lens, wherein the nose bridge insert comprises at least one attachment feature 152, for non-limiting example, an indent, groove, slit or slot, a bump, or protrusion 153, configured to releasably attach to at least a portion of the central notched region 102 of the single lens 101. The nose bridge insert 150 comprises a span, a left side (aligning with and relative to a wearer's left), and a right side (aligning with and relative to a wearer's right) that is linked to the left side by the span.

In some embodiments, the central notched region 102 ascends from a right bottom edge (aligning with and relative to a wearer's right side) of the single lens 101 to an apex and then descends to the left bottom edge (aligning with and relative to the wearer's left side) of the single lens 101, and the central notched region 102 comprises at least one attachment feature for non-limiting example, a slit, a groove, a slot, a bump, or a protrusion, configured to releasably attach to or couple to at least a portion of the nose bridge insert. As shown FIG. 1B, in some embodiments, the central notched region 102 of the single lens 101 comprises a first lateral indent 114 on a right ascending portion of the central notched region, and a second lateral attachment indent 116 on a left descending portion of the central notched region, said second lateral indent 116 configured to releasably attach to at least a slit or slot 152 of the nose bridge insert 150, as illustrated in greater detail in FIGS. 15A and 15B. In some embodiments, the second lateral indent 116 is generally opposite the first lateral indent 114 in the central notched region. In some embodiments, the central notched region 102 of the single lens 101 further comprises an indent 118 at or near the apex of the curve forming the central notched region, configured to releasably attach or couple to at least a slit or slot 152 of the nose bridge insert 150. In some embodiments, at least one bump or protrusion 153 exists within the slot 152 and is configured to align with and mate with at least one of the indents, 114, 116 and/or 118, or any combination of the indents, 114, 116 or 118.

In some embodiments, the nose bridge insert 150 comprises a split nose bridge configuration such that a coupler portion 154 of the split nose bridge is configured to releasably attach to at least a portion of the central notched region 102 of the single lens. The coupler portion 154 comprises an arch, a left leg extending from the left end of the arch, and a right leg extending from the right end of the arch and that is linked to the left leg by the arch.

In some embodiments, the nose bridge insert 150 comprises a split nose bridge configuration such that a slit or slot 152 of the coupler portion 154 of the split nose bridge is configured to releasably attach to or couple to at least one of the first lateral indent 114, second lateral indent 116, or the indent 118 of the central notched region 102 of the single lens 101, or any combination of the indents, 114, 116 or 118. In some embodiments, at least one bump or protrusion 153 exists within the slot 152 of the coupler portion 154 and is configured to align with and mate with at least one of the indents, 114, 116 and/or 118, or any combination of the indents, 114, 116 or 118.

In some embodiments, the nose bridge insert comprises a split nose bridge configuration such that a slit or slot 152 of the coupler portion 154 of the split nose bridge 150 is configured to releasably attach to or couple to at least the first lateral indent 114 and the second lateral indent 116 in the central notched region 102 of the single lens 101. This is accomplished by sliding or inserting the slot 152 of the coupler portion into the notched central region of the lens until the apex of the coupler portion slot 152 is fully flush with the apex of the notched central region of the lens 202. In some embodiments, at least one bump or protrusion 153 exists within the slot 152 of the coupler portion 154 and is configured to align with and mate with at least one of the indents, 114, 116 and/or 118 or any combination of the indents, 114, 116 or 118.

In some embodiments, the split nose bridge configuration of the nose bridge insert 150 further comprises: a pad linker arch 156 configured to be posteriorly offset from the coupler portion 154 wherein the pad linker arch 156 is configured to straddle a bridge of the nose of the wearer, and the pad linker arch further comprising a first nose pad 158 with a first lateral side 160 and a first medial side 162, and a second nose pad 164 with a second medial side 168 and second lateral side 166, and the pad linking arch 156 that links the first nose pad 158 to the second nose pad 164; wherein the first medial side 162 of the first nose pad 158 and the second medial side 168 of the second nose pad 164 are configured to rest on lateral cartilages, lesser alar cartilages, supra alar creases, dense connective tissue above the nostrils of the wearer, or a combination thereof. In some embodiments, the coupler portion 154 is further configured with one or more attachment features, comprising slots, grooves or slits, in mating alignment with one or more protrusions or tabs of the pad linker arch or of the nose pads themselves, such that the first portion and the second portion can be accurately aligned and assembled together in either a releasable or permanent fashion. In some embodiments, the coupler portion is further configured with one or more attachment features, comprising protrusions 172, 272, or tabs, in mating alignment with one or more cooperating attachment features, comprising slots, grooves, or slits 174, 274 of the pad linker arch, the linking arch, or of the nose pads, such that the first portion and the second portion can be accurately aligned and assembled together in either a releasable or permanent fashion.

In some embodiments, the split nose bridge configuration of the nose bridge insert 150 further comprises: a first nose pad 158 with a first lateral side 160 and a first medial side 162, and a second nose pad 164 with a second medial side 168 and second lateral side 166. In some embodiments, the linking arch is absent between the nose pads. In some embodiments, the coupler portion 154 is further configured with one or more attachment features, comprising slots, grooves or slits, in mating alignment with one or more protrusions or tabs of the pad linker arch or of the nose pads themselves, such that the first portion and the second portion can be accurately aligned and assembled together in either a releasable or permanent fashion. In some embodiments, the coupler portion is further configured with one or more attachment features, comprising protrusions or tabs, in mating alignment with one or more cooperating attachment features, comprising slots, grooves or slits of the pad linker arch or of the nose pads themselves, such that the first portion and the second portion can be accurately aligned and assembled together in either a releasable or permanent fashion.

Figure 15A:
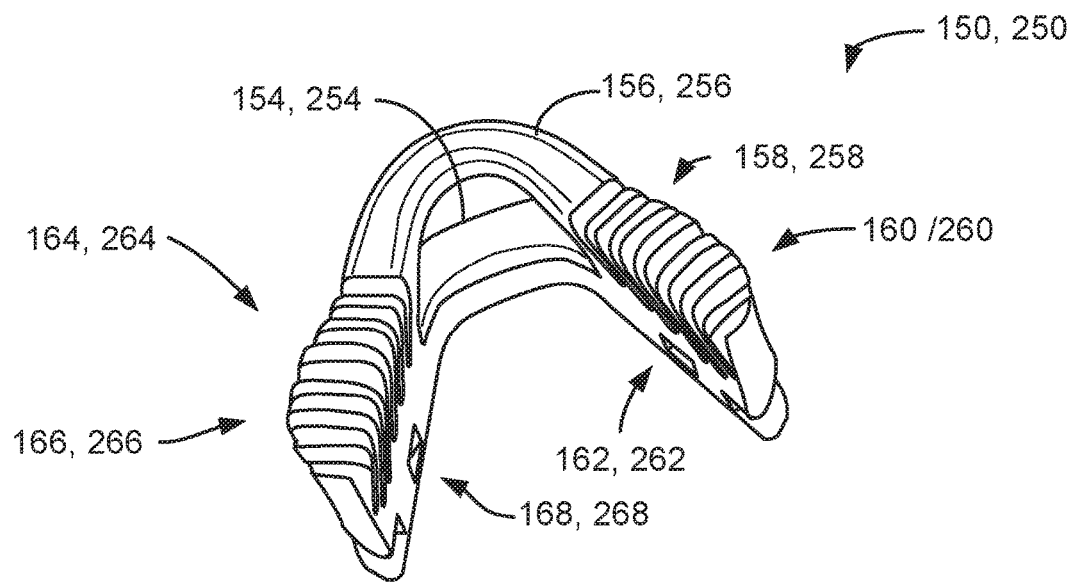
FIG. 15A is a perspective view (rear inferior) of one embodiment of the split nose bridge insert of either FIG. 1A or FIG. 8A.
Figure 15B:
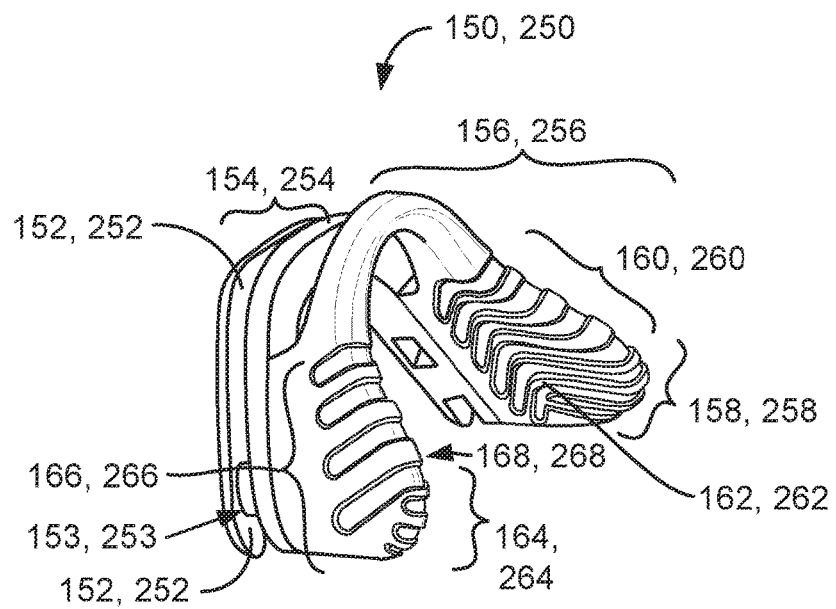
FIG. 15B is a perspective view (left side) of one embodiment of the split nose bridge insert of either FIG. 1A or FIG. 8A.
Figure 15C:
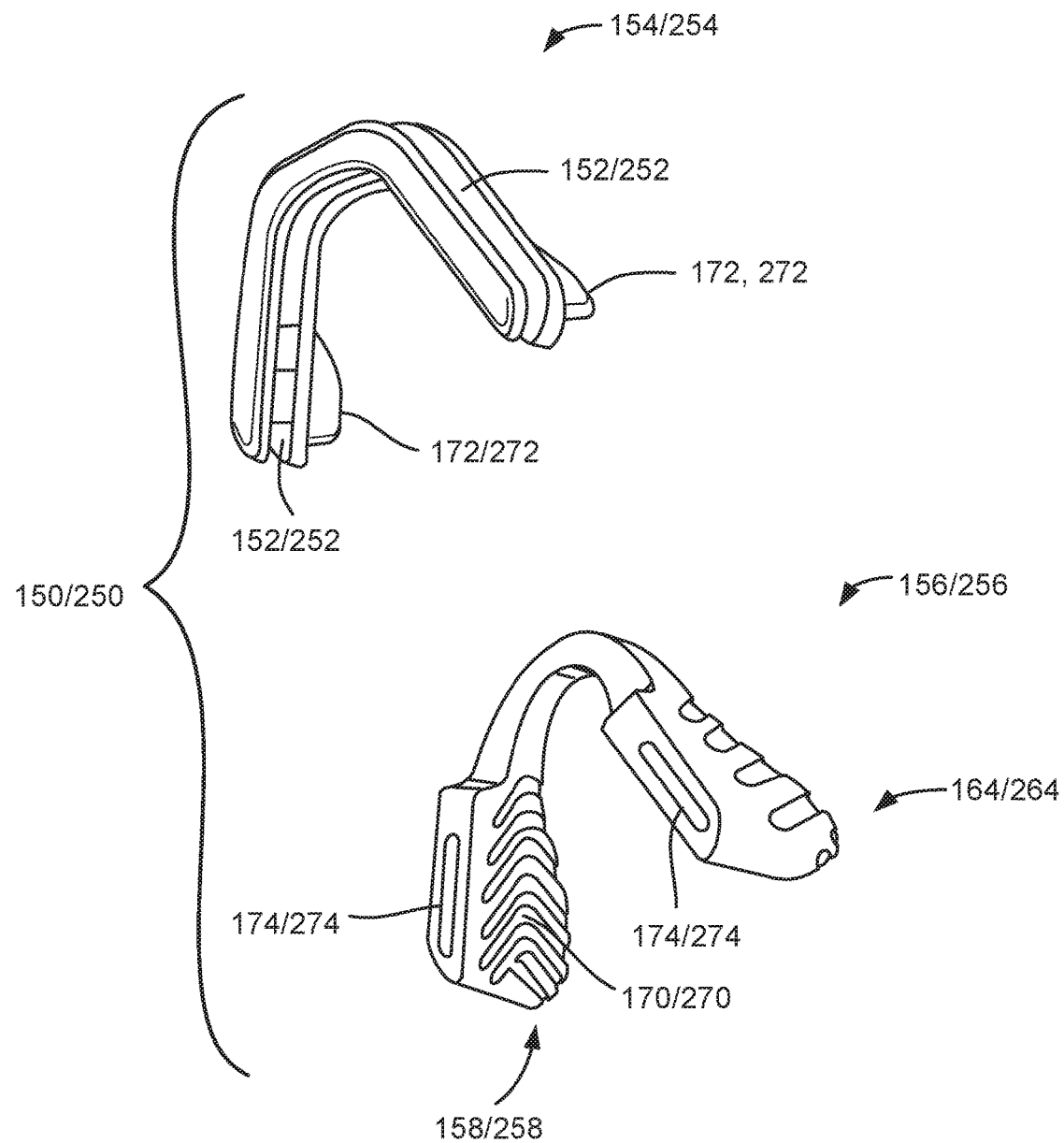
FIG. 15C is a perspective view (rear inferior) of another embodiment of the split nose bridge insert of either FIG. 1A or FIG. 8A, as a two-piece assembly.

In some embodiments, the split nose bridge configuration of the nose bridge insert 150, 250 is a single component, as illustrated in FIGS. 15A and 15B. In some embodiments, the first nose pad 158 is integral with the right leg of the coupler portion either by non-reversible connection thereto, or by way of formation as a single piece. In some embodiments, the second nose pad 164 is integral with the left leg of the coupler portion either by non-reversible connection thereto, or by way of formation as a single piece. In some embodiments, the nose bridge insert 150, 250 comprises both a linking arch that links the first nose pad to the second nose pad and an arch that links that links the first nose pad to the second nose pad. In some embodiments, the nose bridge insert 150, 250 comprises a gap at the apexes of both the linking arch and the arch and which is between the linking arch and the arch. In some embodiments, the split nose bridge configuration of the nose bridge insert 250 is an assembly comprising two or more components, for example the coupler portion 254, and the pad linker arch 256, as illustrated in FIG. 15C. In some embodiments, the split nose bridge configuration of the nose bridge insert 150, 250 is a unitary component. In some embodiments, the split nose bridge configuration of the nose bridge insert 150, 250 is a unitary molded component.

In some embodiments, the unitary or molded split nose bridge insert 150, 250 comprises: coupler portion 154, 254; and a pad linker arch 156, 256, wherein the coupler portion is configured to releasably attach to the central notched region 102 of the single lens 101, and wherein the pad linker arch 156, 256, is configured to be posteriorly offset from the coupler portion and is further configured to straddle the bridge of a nose of the wearer.

In some embodiments, a split nose bridge insert 150, 250 is a molded piece that comprises two or more materials. In some embodiments, the coupler portion 154, 254 and the pad linker arch 156, 256, are each molded of the same material. In some embodiments, the coupler portion comprises a first material and the pad linker arch comprises a second material, and the first material and the second material are different materials.

In some embodiments, the coupler portion 154, 254 and the pad linker arch 156, 256, are each molded of the same material having the same durometer. In some embodiments, the coupler portion comprises a first material having a first durometer, and the pad linker arch comprises the first material comprising a second durometer, and the first durometer and the second durometer are different. In some embodiments, the coupler portion comprises a first material having a first durometer, and the pad linker arch comprises the second material comprising the first durometer. In some embodiments, the coupler portion comprises a first material having a first durometer, and the pad linker arch comprises the second material comprising a second durometer, wherein the first durometer and the second durometer are different, and the first material and the second material are different materials. As used herein, the term durometer refers to a measurement of the hardness of a material. Hardness is defined as a material's resistance to permanent indentation.

In some embodiments, the durometer of the coupler portion 154, 254 is harder (higher) than the durometer of the pad linker arch 156, 256. A harder or tougher or higher durometer would provide a more secure attachment means between the lens and the nose bridge, whereas a softer durometer material would provide softer cushioning over the bridge of the nose of the wearer.

In some embodiments the durometer of the coupler portion is within a range from about Shore 60A to about Shore 100A. In some embodiments the durometer of the pad linker arch is within a range from about Shore 20A to about Shore 70A.

In some embodiments, the coupler portion and the pad linker arch of the molded split nose bridge insert 150 are integral with each other, such as illustrated in FIGS. 15A and 15B. This is often achieved by a molding process that molds the coupler portion and pad linker arch as a single piece. In some embodiments the durometer of the coupler portion and the pad linker arch is within a range from about Shore 40A to about Shore 80A when they are molded together as a single integral unit comprising a single material. In some embodiments the durometer of the coupler portion is within a range from about Shore 60A to about Shore 100A and the durometer of the pad linker arch is within a range from about Shore 20A to about Shore 70A when they are molded together as a single integral unit, but comprising materials of different durometers. Those materials can be the same, having only different durometers, or they can be different materials entirely.

In some embodiments, the coupler portion 154, 254 and the pad linker arch 156, 256 of the molded split nose bridge insert 150, 250 are assembled after molding, such as illustrated in FIG. 15C. In some embodiments, the coupler portion 154 is further with one or more attachment features, comprising slots, grooves or slits, in mating alignment with one or more protrusions or tabs of the pad linker arch or of the nose pads themselves, such that the first portion and the second portion can be accurately aligned and assembled together in either a releasable or permanent fashion. In some embodiments, the coupler portion is further configured with one or more attachment features, comprising protrusions 172, 272, or tabs, in mating alignment with one or more cooperating attachment features, comprising slots, grooves, or slits 174, 274 of the pad linker arch, the linking arch, or of the nose pads, such that the first portion and the second portion can be accurately aligned and assembled together in either a releasable or permanent fashion. The attachment features of the coupler portion; and the attachment features of the pad linker arch are aligned and assembled together in either a releasable or permanent fashion.

In some embodiments, the formation (by molding or another manner) of any portion of either the coupler portion or the pad linker arch will in some embodiments, precede permanent attachment to one or more other portions of the molded split nose bridge insert 150, 250.

In some embodiments, the first medial side 162, 262 of the first nose pad 158, 258 and the second medial side 168, 268 of the second nose pad 164, 264 extending from the second nose bridge portion 156, 256 comprise one or more textured gripping surfaces 170, 270 to further stabilize the eyeglasses over the bridge of the nose, lateral cartilages, lesser alar cartilages, supra alar creases, and/or dense connective tissue above the nostrils of the wearer, or a combination thereof.

This is particularly helpful for humid or sweaty conditions to reduce or eliminate slipping of the eyeglasses as compared to smooth and/or higher durometer pad surfaces. The textured surfaces resemble those of the foot/toe pads on a gecko. Geckos have highly specialized toe pads. This enables them, much to the amazement of human onlookers, to climb vertical surfaces. They can even cross ceilings. Geckos can stick to walls and ceilings because of the attractive nature of intermolecular van der Waals forces. Van der Waals forces include attractions and repulsions between atoms, molecules, and surfaces, as well as other intermolecular forces.

To further augment the gripping capability of the textured gripping surface 170, 270 of the split nose bridge insert, the textured gripping surface comprises a modified gecko texture pattern that is similar to but different from that of a gecko's textured toe pads. Similar to the gecko's toe pad patterns, the textured surface of the textured gripping surface 170, 270 of the split nose bridge insert 150/250, and the temple textured surface 192a, 192b, 292a, 292b, 392a, 392b described elsewhere herein, have irregular outgrowth ridge patterns that act in a similar manner to the footpads and toe pads of the gecko, to improve adhesion of the medial sides of the nose pads 158, 258, 164, 264.

Referring in whole or in part to FIGS. 1A, 1B, 1C, 1D, 1E, 1F, 2, 3, 4, 5, 6, and 7, at least, in some embodiments, the eyeglass assembly further comprises; a first temple arm 180 having a first temple leaf 184 and a first temple extension 188, and a second temple arm 182, with a second temple hinge leaf 186 and a second temple extension 190, wherein the first temple hinge leaf 184 is configured for attachment to a first end of the frame bridge 120 at or about a frame bridge hinge feature 134a, which comprises a recess through a first temple arm hinge or knuckle 196a with a hinge pin 198a, and the first temple extension 188 coupled to the leaf 184 and thereby coupled to the bridge hinge recess 134a is configurable to generally conform to a lateral shape of a wearer's head, extending over the proximal portion of a wearer's first ear between a first auricle of the first ear and a wearer's skull, and wherein the second temple hinge leaf 186 is configured for attachment to a second end of the frame bridge 120 at or about a frame bridge hinge feature 134b, which comprises a recess, through a second temple arm hinge or knuckle 196b with a second hinge pin 198b, and the second temple extension 290 coupled to the leaf 186 and coupled thereby to the bridge hinge recess 134b is configurable to generally conform to a lateral shape of a wearer's head, extending over the proximal portion of a wearer's second ear between a second auricle of the second ear and the wearer's skull.

In some embodiments, the first temple extension 188, and the second temple extension comprise titanium, stainless steel, copper, nickel, aluminum, Beta Ti, nitinol (NiTi), or alloys thereof. In some embodiments, the first temple extension and the second temple extension comprise malleable, flexible or pliant plastic.

In some embodiments, the first temple extension 188, and the second temple extension 190 each further comprise a textured gripping surface 192a, 192b. In some embodiments, the eyeglass assembly further comprises; a first temple extension textured gripping surface 192a, and a second temple extension textured gripping surface 192b; wherein the first temple extension textured gripping surface is configured for insertion onto, over, or surrounding the first temple extension, and wherein the second temple extension textured gripping surface is configured for insertion onto, over, or surrounding the second temple extension. In some embodiments the textured gripping surface comprises a removably replaceable molded polymeric textured surface. As with the split nose bridge insert 150, the temple textured surfaces of each eyeglass assembly design 192a, 192b, (and/or the temple textured surfaces 292a, 292b, 392a, 392b, described elsewhere herein), also have irregular outgrowth ridge patterns that act in a similar manner to the toe pads of the gecko to improve adhesion of the medial sides of the temple textured gripping surfaces as compared to non-textured temple arms of standard eyeglasses.

In some embodiments, the eyeglass assembly further comprises; a first temple extension end cap 194a; and a second temple extension end cap 194b at the end of the temple extensions 188 and 190.

In some embodiments, the frame bridge 120, the first temple arm 180, and the second temple arm 182 are a multi-part assembly.

In some embodiments, the multi-part assembly comprises: a first hinge assembly comprising a first knuckle 196a, and a first recess 134a into which the first knuckle is seated; and a second hinge comprising a second knuckle 196b and a second recess 134b into which the second knuckle is seated; wherein the first hinge and the second hinge are further assembled to the frame bridge with mating compressing joint assemblies, hinge pins 198a, 198b, or a combination thereof.

In some embodiments, the eyeglass assembly further comprises; a first temple extension textured gripping surface 192a, and a second temple extension textured gripping surface 192b, wherein the first temple extension textured gripping surface is configured for insertion onto, over, or surrounding the first temple extension 188, and wherein the second temple extension textured gripping surface is configured for insertion onto, over, or surrounding the second temple extension 190. In some embodiments the textured gripping surface comprises a removably replaceable molded polymeric textured surface.

In some embodiments, the eyeglass assembly further comprises; a first temple extension end cap 194a; and a second temple extension end cap 194b on the ends of the first temple extension 188 and the second temple extension 190 respectively.

In some embodiments of the eyeglass assembly 100 the bridge frame 120, the first temple arm 180 and the second temple arm 182 are a single molded component.

In some embodiments in which the bridge frame 120, the first temple arm 180 and the second temple arm 182 are a single molded component, the first temple arm 180 and the second temple arm 182 each further comprise textured gripping surfaces 192a, 192b.

In some embodiments in which the bridge frame 120, the first temple arm 180 and the second temple arm 182 are a single molded component, the textured gripping surface 192a is molded into the first temple arm 180 and the textured gripping surface 192b is molded into the second temple arm 182. In some embodiments the textured gripping surfaces 192a, 192b comprises a removably replaceable molded polymeric textured surface.

Figure 3:
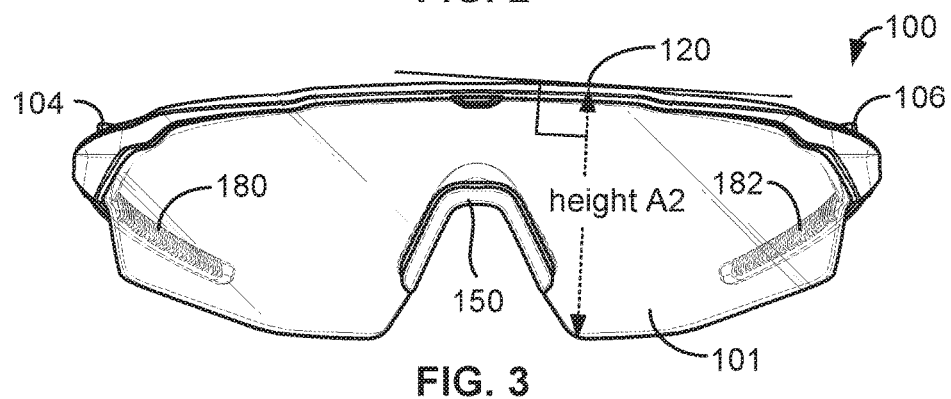
FIG. 3 is a front elevation view of the eyeglasses of FIG. 1A.
Figure 4:
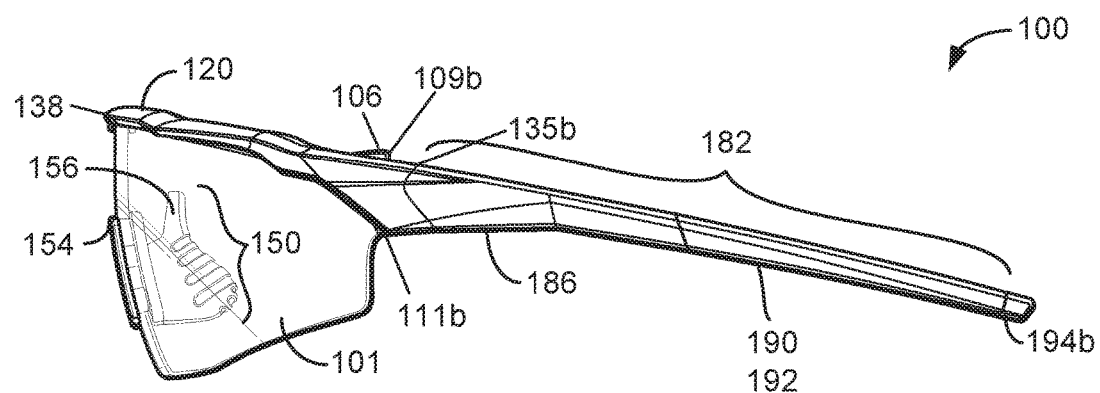
FIG. 4 is a left side elevation view of the eyeglasses of FIG. 1A.
Figure 5:
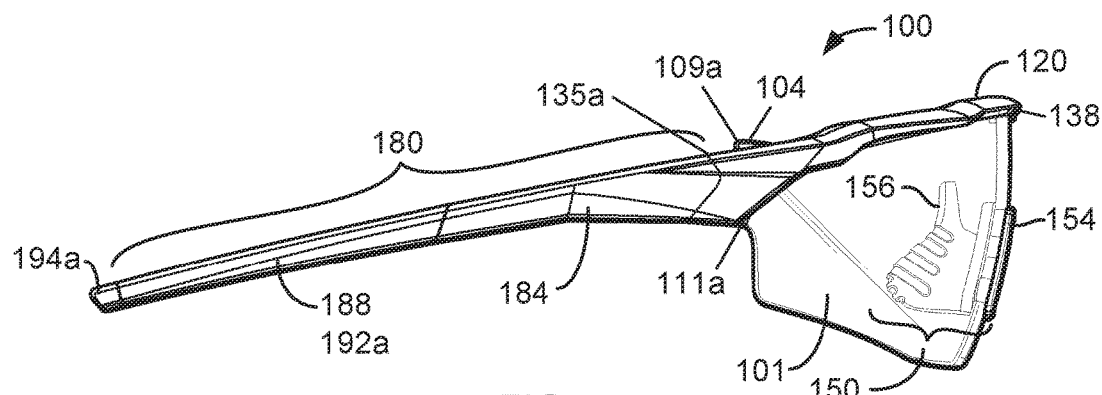
FIG. 5 is a right side elevation view of the eyeglasses of FIG. 1A.
Figure 6:
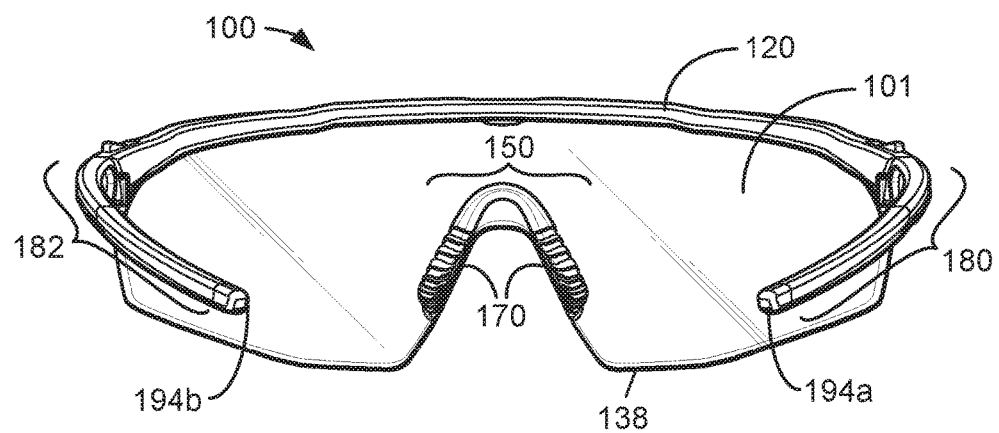
FIG. 6 is a rear elevation view of the eyeglasses of FIG. 1A.

In some embodiments, the single lens is provided in more than one size. In some embodiments, the single lens is provided in two or more heights. In some embodiments, the single lens is configurable to extend approximately 2 mm to approximately 10 mm higher above the eyebrows of the wearer than a standard height lens. In some embodiments, this vertical extension above the eyebrows is accomplished in combination with an interchangeable nose bridge configured to raise the entire eyeglass assembly from the bridge of the wearer's nose. Comparable examples of such nose bridge configurations are illustrated in FIGS. 15A-15C. In some embodiments, the single lens is configurable to extend approximately 2 mm to approximately 10 mm lower below the eyes of the wearer than a standard height lens, to approximately the cheekbone. In some embodiments, the single lens is configured to extend both higher above the eyebrows of the wearer than a standard height lens and extend lower below the eyes of the wearer than a standard height lens within an overall range of approximately 2 mm to approximately 10 mm. As noted above, in some embodiments, this vertical extension above the eyebrows is accomplished in combination with an interchangeable nose bridge configured to raise the entire eyeglass assembly from the bridge of the wearer's nose, whereas the extension below the eyes toward the cheekbone can be accomplished with a longer vertical height of the lens, (e.g.: height 1, as illustrated in FIG. 1B, or height 2, as illustrated in FIG. 3).

In some embodiments, the single lens 101 is configurable to accommodate a corrective lens prescription for a left eye, a right eye, or both left and right eye. In some embodiments, the single lens 101 comprises a corrective lens shape for a left eye, a right eye, or both left and right eye.

In some embodiments, the single lens 101 is configurable to accommodate an anti-reflective treatment. In some embodiments, the single lens 101 comprises an anti-reflective treatment or coating. In some embodiments, the single lens 101 is configurable to accommodate a photochromic treatment. In some embodiments, the single lens 101 comprises silver halide, for non-limiting example silver chloride to generate a photochromatic effect when exposed to sunlight and/or UV rays. In some embodiments, the single lens 101 comprises organic photochromic molecules, for non-limiting example oxazines and/or naphthopyrans, to generate a photochromatic effect when exposed to sunlight and/or UV rays. In some embodiments, silver halide or organic photochromic molecules are embedded in the lens material. In some embodiments, the silver halide or organic photochromic molecules are coated on a pre-formed lens as part of a polymer film. In some embodiments, the single lens 101 is configurable to accommodate a polarized treatment or coating. In some embodiments, the single lens 101 is configurable to accommodate a tinting treatment or coating. In some embodiments, the single lens 101 is configurable to accommodate an anti-fogging treatment or coating. In some embodiments, the single lens 101 is configurable to accommodate a scratch resistance treatment or coating. In some embodiments, the single lens 101 comprises a mirror coating treatment. In some embodiments, the single lens 101 is configurable to accommodate an anti-fog treatment or coating. In some embodiments, the single lens 101 is configurable to accommodate a hydro-phobic treatment or coating. In some embodiments, the single lens 101 is configurable to accommodate an oleo-phobic treatment or coating. In some embodiments, the single lens 101 is configurable to accommodate any combination of the treatments or coatings described herein.

In some embodiments, the frame bridge 120 comprises a first temple lug 108a comprising the first tab thru-hole 122 configured to receive the first lens tab 104. In some embodiments, the frame bridge 120 comprises a second temple lug 108b comprising the second tab thru-hole 124 configured to receive the second lens tab 106. In some embodiments, the frame bridge 120 comprises a first end 135a where the first temple arm 180 meets the frame bridge 120 at the frame bridge the top edge. In some embodiments, the frame bridge 120 comprises a second end 135b where the second temple arm 182 meets the frame bridge 120 at the frame bridge the top edge.

The finished single lens 101 can be provided and manufactured in multiple shapes, multiple widths between the top ends 135a, 135b of the frame bridge 120 or between the first lens apex 109a of the first lens tab 104 and the second lens apex 109b of the second lens tab 106, and/or secondary widths between the bottom meet locations 111a, 111b where the lens 101 meets the bridge 120 on the left and right sides of the eyeglasses, or between the first retention step 105 and the second retention step 107, or multiple overall lens heights from the proximal edge 110 to the inferior edge 136 of the lens as measured along the lens perpendicularly from a tangent line at any location along the proximal edge that does not include the central notched region 102.

Figure 1E:
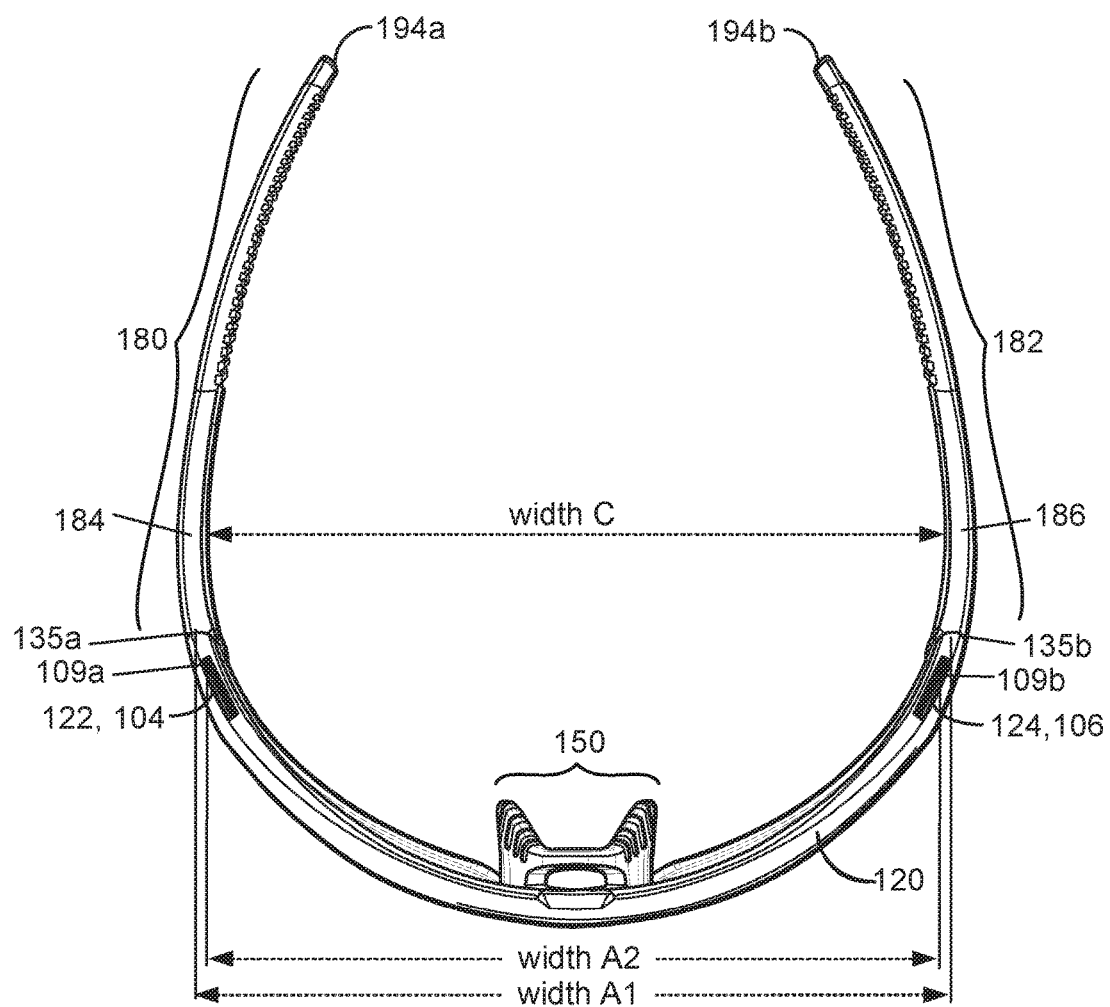
FIG. 1E is a top plan view of the eyeglasses of FIG. 1A.

In some embodiments, the options for the shapes and widths of the finished single lens 101 are configured for style, face comfort, face shape, or eye coverage. In some embodiments, the single lenses that are configured for style comprise different finishes or tinting. In some embodiments, the single lenses having differing shapes or widths are suitably configured for and/or are interchangeable for a single frame bridge (rim) 120. In some embodiments, such single lenses having differing shapes and/or widths, are pre-selected and provided as optional sets including a rim 120 for each finished single lens 101. In some embodiments, several finished single lenses having differing shapes and/or widths, are provided as optional sets in a single package with a single rim 120. In some embodiments, the average width between the top ends 135a, 135b of the frame bridge 120 (referred to as "width A1" herein, as shown in FIG. 1E) or between the first lens apex 109a of the first lens tab 104 and the second lens apex 109b of the second lens tab 106 (referred to as "width A2" herein, as shown in FIG. 1E) is about 135 mm. In some embodiments, width A1 and/or width A2 is from about 125 mm to about 145 mm, from about 127 mm to about 143 mm, from about 129 mm to about 141 mm, from about 131 mm to about 139 mm, or from about 133 mm to about 137 mm. In some embodiments, width A1 and/or width A2 is from 125 mm to 145 mm, from 127 mm to 143 mm, from 129 mm to 141 mm, from 131 mm to 139 mm, or from 133 mm to 137 mm. As used herein, the term "about" when referring to width A of a lens 101, 201 means variations of 1%, 2%, 3%, 4%, 5%, 6%, 7%, 8%, 9%, 10%, 11%, 12%, 13%, 14%, 15%, or 20%, depending on the embodiment.

Figure 7:
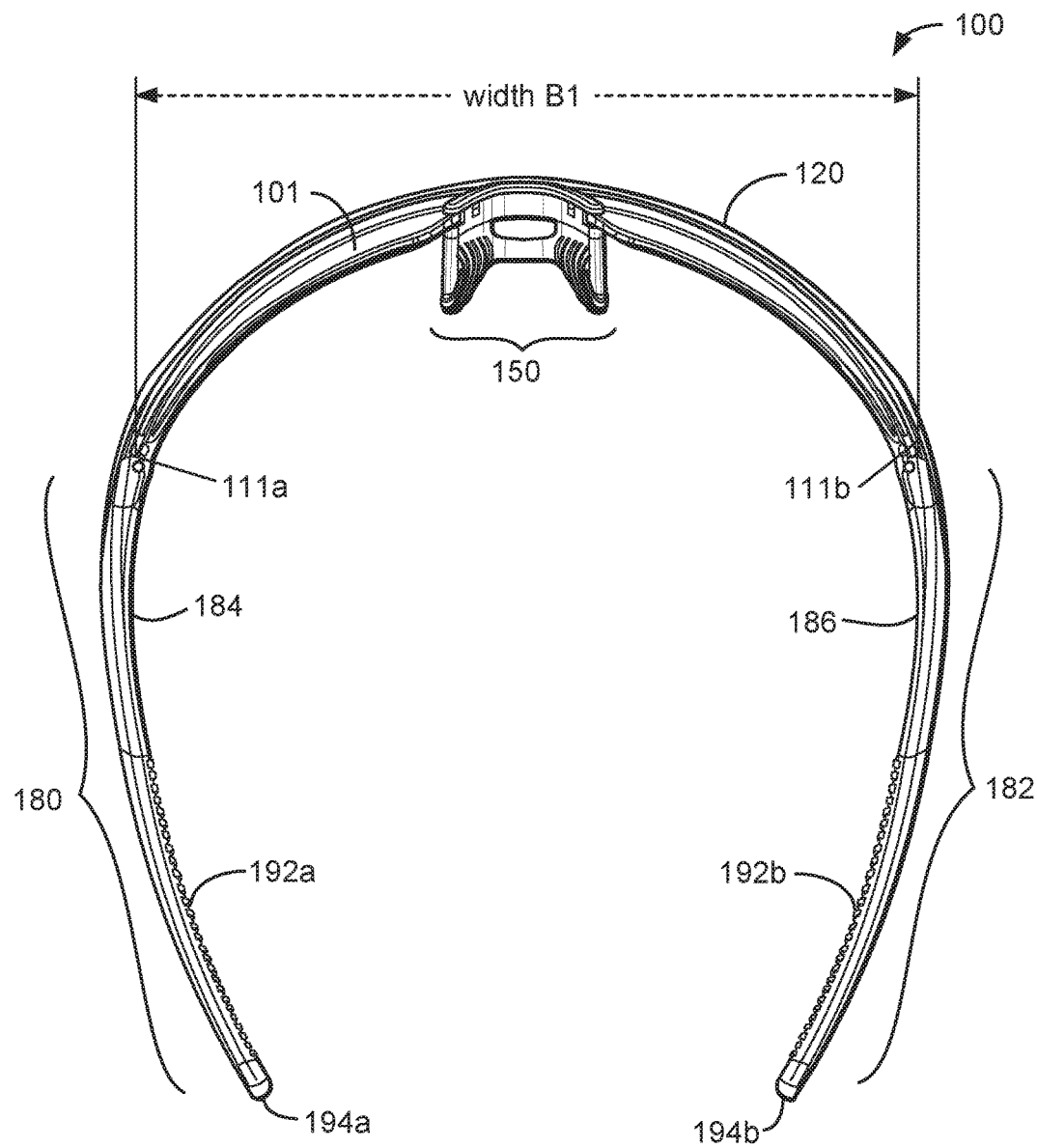
FIG. 7 is a bottom plan view of the eyeglasses of FIG. 1A.

In some embodiments, the average width between the bottom meet locations 111a, 111b where the lens 101 meets the bridge 120 on the left and right sides of the eyeglasses (referred to as "width B1" herein, as shown in FIG. 7), or between the first retention step 105, 107, 307 and the second retention step 107, 207, 317 (referred to as "width B2" herein, as shown in FIG. 1B) is about 137.5 mm. In some embodiments, width B1 and/or width B2 is from about 130 mm to about 145 mm, from about 132 mm to about 143 mm, from about 134 mm to about 141 mm, or from about 136 mm to about 139 mm. In some embodiments, width B1 and/or width B2 is from 130 mm to 145 mm, from 132 mm to 143 mm, from 134 mm to 141 mm, or from 136 mm to 139 mm. As used herein, the term "about" when referring to width B of a lens 101, 201 means variations of 1%, 2%, 3%, 4%, 5%, 6%, 7%, 8%, 9%, 10%, 11%, 12%, 13%, 14%, 15%, or 20%, depending on the embodiment.

In some embodiments of the single lens semi-rimmed design, the variable shapes include different radii of curvature of the lens. In some embodiments, the radius of curvature is about 7.0 Base Curve (referred to as "Base" elsewhere herein) in the horizontal direction, by about 4.0 Base Curve in the vertical direction relative to a wearer's eye.

As used herein, the term Base, Base Curve or Base Curve Radius, or simply base curve (abbreviated BCR or BC) refers to the flatter curvature of a lens (typically) measured in diopters (D) on the front side of a spectacle lens in optometry. Alternatively, on a contact lens, the base curve is the radius of the sphere of the back of the lens that the prescription describes, sometimes referred to as the back central optic radius (abbreviated BCOR), (the lower the number, the steeper the curve of the cornea and the lens, the higher the number, the flatter the curve of the cornea and the lens). Typical values for a contact lens are from 8.0 mm to 10.0 mm. However the full range of base curve is much greater and is often described in a range of about 0.50 D to about 10.00 D. This number is important in order to allow the contact lens to fit well to the wearer's cornea for comfort, to facilitate tear exchange, and to allow oxygen transmission. Manufacturers typically produce a series of semi-finished lens blanks, each with its own base curve. This "base curve series" is a system of lens blanks that increases incrementally in surface power (e.g., +0.50 D, +2.00 D, +4.00 D, and so on). Each base curve in the series is used for producing a small range of prescriptions, as specified by the manufacturer. Consequently, the more base curves available in the series, the broader the prescription range of the product. Manufacturers make base curve selection charts available that provide the recommended prescription ranges for each base curve in the series. A typical base curve selection chart is illustrated below:

| Typical Base Curve Selection Chart | |
| --- | --- |
| Power Range | Base Curve |
| +8.00 D to +4.75 D | 10.00 D |
| +2.25 D to +4.50 D | 8.00 D |
| +2.00 D to −2.00 D | 6.00 D |
| −2.25 D to −4.00 D | 4.00 D |
| −4.25 D to −7.00 D | 2.50 D |
| −7.25 D to −12.00 D | 0.50 D |

Further still, in this application, the term base curve has been extended to include the radius of the frame that holds the spectacle lens(es) and is also used to describe the relative "fit" of the frame on a wearer's face and head.

In some embodiments, the radii of curvature in the horizontal and/or vertical direction relative to the wearer's eye is from about 3.0 Base to about 8.0 Base, from about 3.5 Base to about 7.5 Base, from about 4.0 Base to about 7.0 Base, from about 4.5 Base to about 6.5 Base, from about 5.0 Base to about 6.0 Base, from about 5.5 Base to about 5.5 Base, from about 6.0 Base to about 5.0 Base, from about 6.5 Base to about 4.5 Base, from about 7.0 Base to about 4.0 Base, from about 7.5 Base to about 3.5 Base, from about 8.0 Base to about 3.0 Base, from about 8.5 Base to about 2.5 Base, from about 9.0 Base to about 2.0 Base, from about 9.5 Base to about 1.5 Base, from about 10.0 Base to about 1.0 Base, from about 10.5 Base to about 0.5 Base, or from about 11.0 Base to about 0.0 Base. In some embodiments, the radii of curvature in the horizontal and/or vertical direction relative to the wearer's eye is from 3.0 Base to 8.0 Base, from 3.5 Base to 7.5 Base, from 4.0 Base to 7.0 Base, from 4.5 Base to 6.5 Base, from 5.0 Base to 6.0 Base, from 5.5 Base to 5.5 Base, from 6.0 Base to 5.0 Base, from 6.5 Base to 4.5 Base, from 7.0 Base to 4.0 Base, from 7.5 Base to 3.5 Base, from 8.0 Base to 3.0 Base, from 8.5 Base to 2.5 Base, from 9.0 Base to 2.0 Base, from 9.5 Base to 1.5 Base, from 10.0 Base to 1.0 Base, from 10.5 Base to 0.5 Base, or from 11.0 Base to 0.0 Base. As used herein, the term "about" when referring to Base or Base Curve means variations of 1%, 2%, 3%, 4%, 5%, 6%, 7%, 8%, 9%, 10%, 11%, 12%, 13%, 14%, 15%, or 20%, depending on the embodiment.

In some embodiments of the single lens semi-rimmed design, the variable shapes of the frames include different radii of curvature, as well. In some embodiments the radius of curvature of the frame is about 8.0 Base (Horizontal). In some embodiments the radius of curvature of the frame is 8.0 Base (Horizontal). As used herein, the term "about" when referring to Base or Base Curve means variations of 1%, 2%, 3%, 4%, 5%, 6%, 7%, 8%, 9%, 10%, 11%, 12%, 13%, 14%, 15%, or 20%, depending on the embodiment.

In some embodiments of the single lens semi-rimmed design, different radii of curvature for the frame are desired to accommodate different head shapes for various age, gender and ethnic wearers.

In some embodiments, the radius of curvature of the frame is from about 11.0 Base to about 4.0 Base, from about 11.0 Base to about 5.0 Base, from about 11.0 Base to about 6.0 Base, from about 11.0 Base to about 7.0 Base, from about 10.0 Base to about 4.0 Base, from about 10.0 Base to about 5.0 Base, from about 10.0 Base to about 6.0 Base, from about 10.0 Base to about 7.0 Base, from about 9.0 Base to about 4.0 Base, from about 9.0 Base to about 5.0 Base, from about 9.0 Base to about 6.0 Base, from about 9.0 Base to about 7.0 Base, from about 8.0 Base to about 4.0 Base, from about 8.0 Base to about 5.0 Base, 8.0 Base to about 6.0 Base, or from about 8.0 Base to about 7.0 Base. In some embodiments, the radius of curvature of the frame is from 11.0 Base to 4.0 Base, from 11.0 Base to 5.0 Base, from 11.0 Base to 6.0 Base, from 11.0 Base to 7.0 Base, from 10.0 Base to 4.0 Base, from 10.0 Base to 5.0 Base, from 10.0 Base to 6.0 Base, from 10.0 Base to 7.0 Base, from 9.0 Base to 4.0 Base, from 9.0 Base to 5.0 Base, from 9.0 Base to 6.0 Base, from 9.0 Base to 7.0 Base, from 8.0 Base to 4.0 Base, from 8.0 Base to 5.0 Base, 8.0 Base to 6.0 Base, or from 8.0 Base to 7.0 Base. As used herein, the term "about" when referring to Base or Base Curve means variations of 1%, 2%, 3%, 4%, 5%, 6%, 7%, 8%, 9%, 10%, 11%, 12%, 13%, 14%, 15%, or 20%, depending on the embodiment.

In some embodiments, the height (referred to as "height A1" herein, as shown in FIG. 1B) from the proximal edge 110 to the inferior edge 136 of the lens as measured along the lens perpendicularly from a tangent line at any location along the proximal edge that does not include the central notched region 102 includes an average dimension from about 49.0 mm to about 52.5 mm when averaging a maximum height A1 and a minimum height A1 of the lens. In some embodiments, height A1 is from about 52.0 mm to about 46.0 mm, from about 51.0 mm to about 47.0 mm, or from about 50.0 mm to about 48.0 mm. In some embodiments, height A1 is from 52.0 mm to 46.0 mm, from 51.0 mm to 47.0 mm, or from 50.0 mm to 48.0 mm. Alternatively, in some embodiments, height A1 is from about 70.0 mm to about 35.0 mm, from about 68.0 mm to about 37.0 mm, from about 66.0 mm to about 39.0 mm, from about 64.0 mm to about 41.0 mm, from about 62.0 mm to about 43.0 mm, from about 60.0 mm to about 45.0 mm, from about 58.0 mm to about 47.0 mm, from about 56.0 mm to about 49.0 mm, or from about 54.0 mm to about 51.0 mm. In some embodiments, height A1 is from 70.0 mm to 35.0 mm, from 68.0 mm to 37.0 mm, from 66.0 mm to 39.0 mm, from 64.0 mm to 41.0 mm, from 62.0 mm to 43.0 mm, from 60.0 mm to 45.0 mm, from 58.0 mm to 47.0 mm, from 56.0 mm to 49.0 mm, or from 54.0 mm to 51.0 mm. As used herein, the term "about" when referring to height A1 of a lens 101, or 201 means variations of 1%, 2%, 3%, 4%, 5%, 6%, 7%, 8%, 9%, 10%, 11%, 12%, 13%, 14%, 15%, or 20%, depending on the embodiment.

In some embodiments, the average height (referred to as "height A2" herein, as shown in FIG. 3) from a proximal edge of the frame bridge 120 to the inferior edge 136 of the lens as measured along the lens perpendicularly from a tangent line at any location along the proximal edge of the frame bridge that does not include the central notched region 102 includes an average dimension from about 52.0 mm to about 57.5 mm when averaging a maximum height and a minimum height of the lens. In some embodiments, height A2 is from about 55.0 mm to about 49.0 mm, or from about 53.0 mm to about 51.0 mm. In some embodiments, height A2 is from 55.0 mm to 49.0 mm, or from 53.0 mm to 51.0 mm. Alternatively, in some embodiments, height A2 is from about 75.0 mm to about 40.0 mm, from about 73.0 mm to about 42.0 mm, from about 71.0 mm to about 44.0 mm, from about 69.0 mm to about 46.0 mm, from about 67.0 mm to about 48.0 mm, from about 65.0 mm to about 50.0 mm, from about 63.0 mm to about 52.0 mm, from about 61.0 mm to about 54.0 mm, or from about 59.0 mm to about 56.0 mm. In some embodiments, height A2 is from 55.0 mm to 49.0 mm, or from 53.0 mm to 51.0 mm. In some embodiments, height A2 is from 75.0 mm to 40.0 mm, from 73.0 mm to 42.0 mm, from 71.0 mm to 44.0 mm, from 69.0 mm to 46.0 mm, from 67.0 mm to 48.0 mm, from 65.0 mm to 50.0 mm, from 63.0 mm to 52.0 mm, from 61.0 mm to 54.0 mm, or from 59.0 mm to 56.0 mm. As used herein, the term "about" when referring to height A2 of a lens 101, 201, 301, and/or 311 means variations of 1%, 2%, 3%, 4%, 5%, 6%, 7%, 8%, 9%, 10%, 11%, 12%, 13%, 14%, 15%, or 20%, depending on the embodiment.

In some embodiments, the average width (referred to "width C" herein, as shown in FIG. 1E) of the eyeglasses of the single lens semi-rimmed design, from the first temple hinge leaf 184 to the second temple hinge leaf 186 is from about 140.0 mm to about 147.5 mm, or is 140.0 mm to 147.5 mm. In some embodiments, width C is from about 140.0 mm to about 135.0 mm, or from about 139.0 mm to about 136.0 mm or from about 138.0 mm to about 137.0 mm. In some embodiments, width C is from 140.0 mm to 135.0 mm, or from 139.0 mm to 136.0 mm, or from 138.0 mm to 137.0 mm. Alternatively, in some embodiments, width C is from about 150.0 mm to about 130.0 mm, from about 148.0 mm to about 132.0 mm, from about 146.0 mm to about 134.0 mm, from about 144.0 mm to about 136.0 mm, or from about 142.0 mm to about 138.0 mm. In some embodiments, width C is from 150.0 mm to 130.0 mm, from 148.0 mm to 132.0 mm, from 146.0 mm to 134.0 mm, from 144.0 mm to 136.0 mm, or from 142.0 mm to 138.0 mm. As used herein, the term "about" when referring to width C of the eyeglasses means variations of 1%, 2%, 3%, 4%, 5%, 6%, 7%, 8%, 9%, 10%, 11%, 12%, 13%, 14%, 15%, or 20%, depending on the embodiment.

Figure 2:
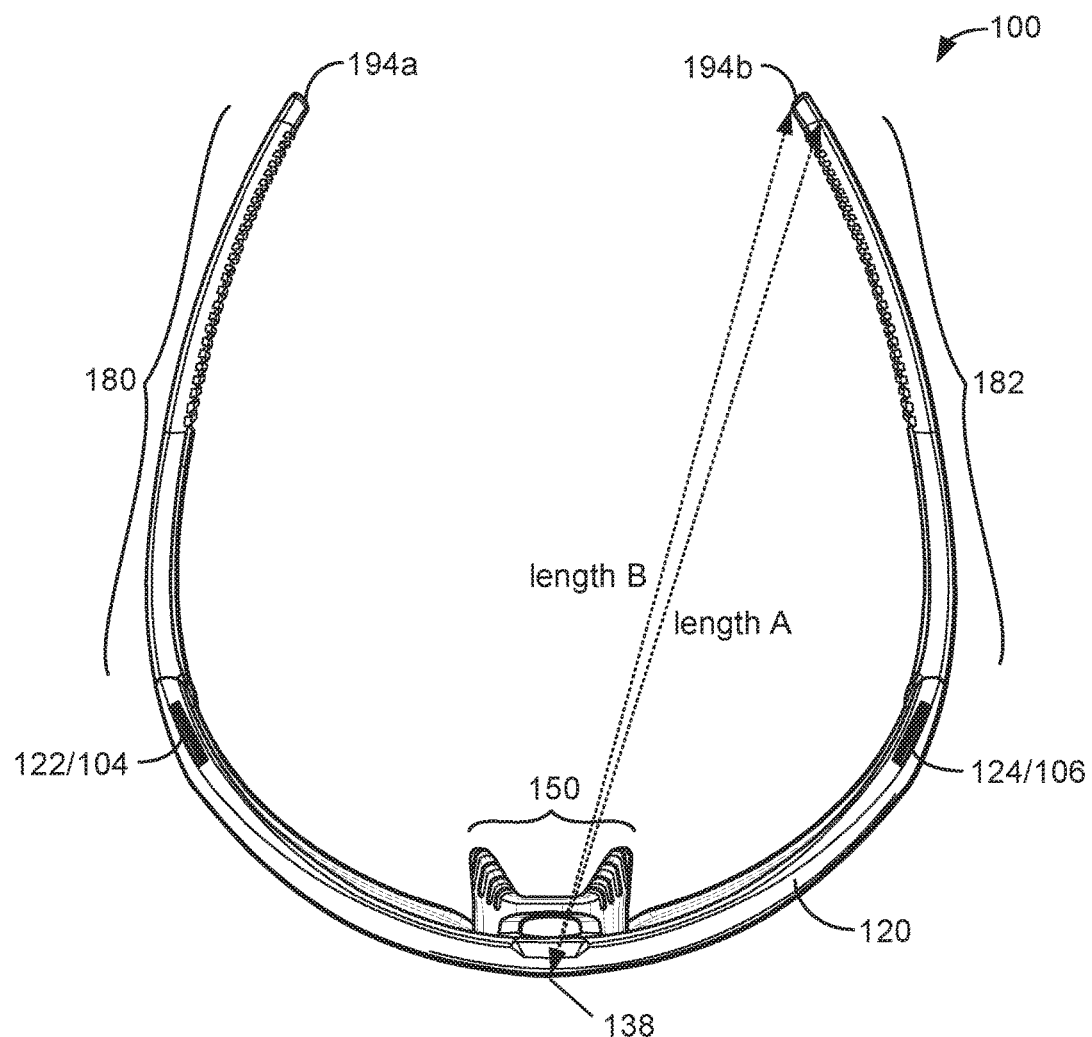
FIG. 2 is another top plan view of the eyeglasses of FIG. 1A.

In some embodiments, the average length (referred to "length A" herein, as shown in FIG. 2) of the eyeglasses of the single lens semi-rimmed design from an anterior aspect of the frame bridge 120, 320 at the apex of the frame bridge 120, 320 to the posterior end of either of temple extensions 188, 190 when fully opened ready for wearing is about 160.0 mm to about 170.0 mm. In some embodiments, length A is from about 165.0 mm to about 175.0 mm, from about 167.0 mm to about 173.0 mm, or from about 169.0 mm to about 171.0 mm. In some embodiments, length A is from 165.0 mm to 175.0 mm, from 167.0 mm to 173.0 mm, or from 169.0 mm to 171.0 mm. Alternately, in some embodiments, length A is from about 155.0 mm to about 185.0 mm, from about 157.0 mm to about 183.0 mm, from about 159.0 mm to about 181.0 mm, from about 161.0 mm to about 179.0 mm, from about 163.0 mm to about 177.0 mm, from about 165.0 mm to about 175.0 mm, from about 167.0 mm to about 173.0 mm, or from about 169.0 mm to about 171.0 mm. In some embodiments, length A is from 155.0 mm to 185.0 mm, from 157.0 mm to 183.0 mm, from 159.0 mm to 181.0 mm, from 161.0 mm to 179.0 mm, from 163.0 mm to 177.0 mm, from 165.0 mm to 175.0 mm, from 167.0 mm to 173.0 mm, or from 169.0 mm to 171.0 mm. As used herein, the term "about" when referring to length A of the eyeglasses means variations of 1%, 2%, 3%, 4%, 5%, 6%, 7%, 8%, 9%, 10%, 11%, 12%, 13%, 14%, 15%, or 20%, depending on the embodiment.

In some embodiments, the average length (referred to "length B" herein, as shown in FIG. 2) of the eyeglasses of the single lens semi-rimmed design from an anterior aspect of the frame bridge 120, 320 at the frame bridge apex 138 of the frame bridge 120, 320 to the posterior end of either of the end caps 194a, 194a when fully opened ready for wearing is from about 175.0 mm to about 175.0 mm. In some embodiments, length B is from about 170.0 mm to about 180.0 mm, from about 172.0 mm to about 178.0 mm, or from about 174.0 mm to about 176.0 mm. In some embodiments, length B is from 170.0 mm to 180.0 mm, from 172.0 mm to 178.0 mm, or from 174.0 mm to 176.0 mm. Alternately, in some embodiments, length B is from about 160.0 mm to about 190.0 mm, from about 162.0 mm to about 188.0 mm, from about 164.0 mm to about 186.0 mm, from about 166.0 mm to about 184.0 mm, from about 168.0 mm to about 182.0 mm, from about 170.0 mm to about 180.0 mm, from about 172.0 mm to about 178.0 mm, or from about 174.0 mm to about 176.0 mm. In some embodiments, length B is from 160.0 mm to 190.0 mm, from 162.0 mm to 188.0 mm, from 164.0 mm to 186.0 mm, from 166.0 mm to 184.0 mm, from 168.0 mm to 182.0 mm, from 170.0 mm to 180.0 mm, from 172.0 mm to 178.0 mm, or from 174.0 mm to 176.0 mm. As used herein, the term "about" when referring to length B of the eyeglasses means variations of 1%, 2%, 3%, 4%, 5%, 6%, 7%, 8%, 9%, 10%, 11%, 12%, 13%, 14%, 15%, or 20%, depending on the embodiment.

Other iterations of this embodiment also incorporate variable height and width lenses 101a/b, at least.

In some embodiments, the semi-rimmed eyeglass assembly 500 comprises: a frame bridge 520 comprising a first lens tab thru-hole, a first lens retention step receiver, a second lens tab thru-hole a second lens retention step receiver, and the single lens 101. The eyeglass assembly 500 further comprises: temple arms modified such that the temple leaf thickness of the temple arm is tapered for approximately ½ of the overall length, or more specifically, a posterior portion of the temple leaf is between ¼ and ½ of the thickness of an anterior portion of the temple leaf. As illustrated in FIGS. 24-26D, the semi-rimmed eyeglass assembly 500, with "MIL" tapered temple arms 580, the temple leaf portion 584 of the temple arm comprises a tapered lateral side 587. This taper 597 is configured for better fit on a wearer's head when wearing ear protection systems and helmets (i.e.: military, paramilitary, police or safety gear). Further, the thinner two-shot "GEKO" textured surface design 292 reduces friction and hair snag while using head gear and helmets to more easily secure frames onto a wearer's head with better comfort by reducing pressure points from head gear, particularly around the auricle of the ear, and especially between the helix and the skull. A lanyard/head strap receiver (thru-hole) 595 is added to the endcap region 594 of the temple arm to increase security of frame on the head or around the neck (similar to existing lanyard/head straps). This model is similar to the semi-rimmed (SR) version. As with the semi-rimmed (SR) version, the exemplary eyeglass assembly further comprises the previously described modular Split Nose Bridge Insert 150 and coupler 154, configurable for variable nose sizes. Future iterations of this embodiment will also incorporate a new nose piece to accept the standard military "revisions" brand RX adapter. Future iterations of this embodiment will also incorporate variable height and width lenses 101a/b, at least.

Figure 25:
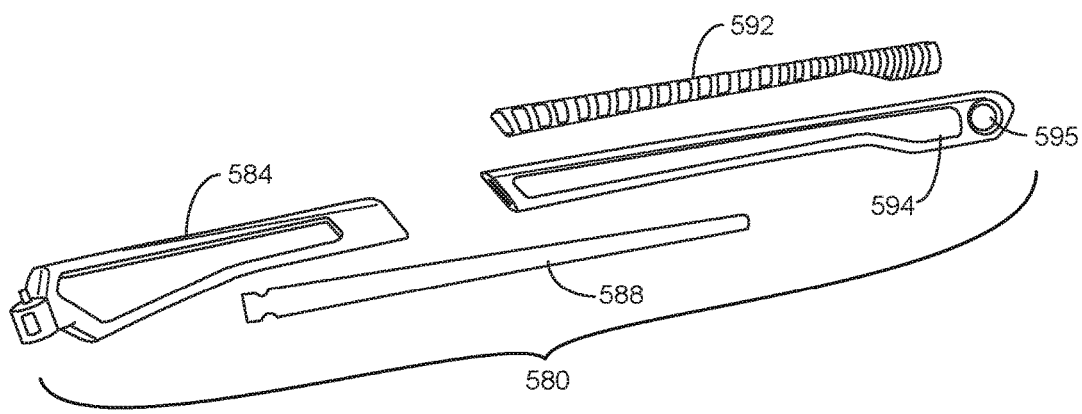
FIG. 25 is an illustrative exploded view of the Right thinner, tapered temple leaf on the temple arm of FIG. 24. (A representative Left thinner, tapered temple leaf on the temple arm of FIG. 24 would be the mirror image of this figure).
Figure 26A:
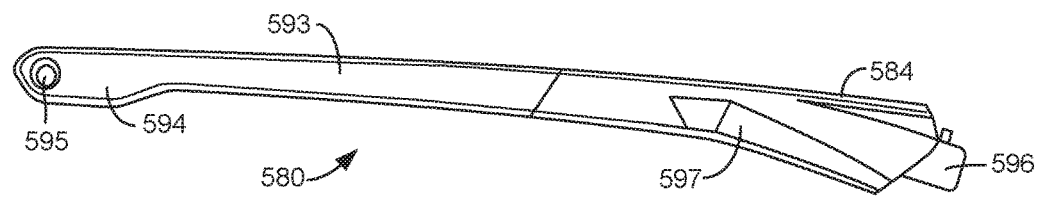
FIG. 26*a* is an illustrative lateral side view of the Right thinner, tapered temple leaf on the temple arm of FIG. 24.
Figure 26B:
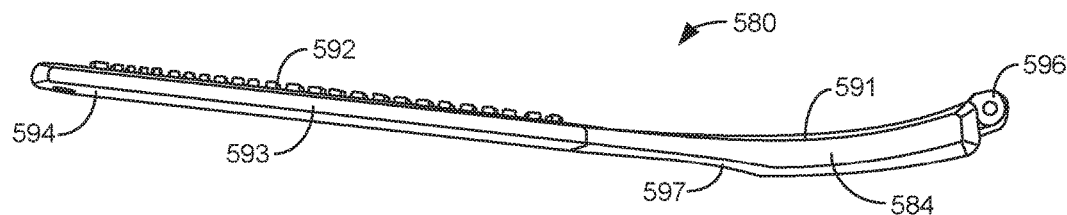
FIG. 26*b* is an illustrative top view of the Right thinner, tapered temple leaf on the temple arm of FIG. 24.
Figure 26C:
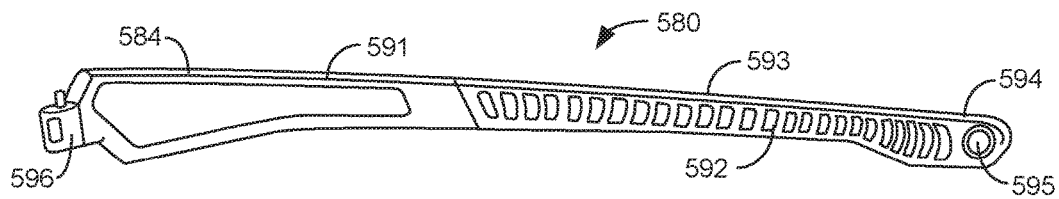
FIG. 26*c* is an illustrative medial side view of the Right thinner, tapered temple leaf on the temple arm of FIG. 24.
Figure 26D:
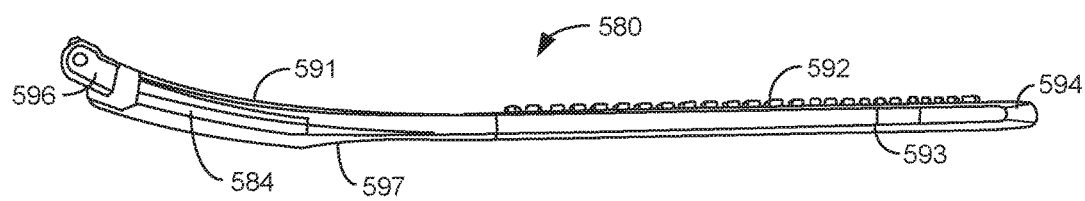
FIG. 26*d* is an illustrative bottom view of the Right thinner, tapered temple leaf on the temple arm of FIG. 24.

As illustrated in FIGS. 25-26D, in some embodiments of the temple arm 580, the temple leaf extension 584 and the temple leaf extension 593, and end cap portion 594 comprise a single substrate, and are formed as a single piece. In some embodiments, the formed single piece temple substrate 588 further comprises a flexible metal or wire core 588. In some embodiments, the posterior end of the formed single piece temple leaf extension substrate comprises a thru-hole 595 configurable for a head strap attachment feature. In some embodiments, the formed single piece temple leaf extension substrate further comprises a textured surface 592 on the medial side. In some embodiments, the textured surface 592 is a molded inlay. In some embodiments the textured surface 592 is a TPE (thermoplastic elastomer) material. In some embodiments, the temple arm 580 or the temple extension 584, 593, 594, comprises: titanium; stainless steel; aluminum; copper; nickel; Beta Titanium; nitinol (NiTi) or alloys thereof. In some embodiments, the temple arm or the temple extension 584, 594, comprises: a malleable plastic; a flexible plastic or a pliant plastic. As noted in FIGS. 26A-26D, the representative Right Temple Arm 580 comprises a Temple (Hinge) Leaf 584, an internal metal Temple Extension Core 588 (not shown in these views), an anterior portion of the temple arm length 591, a Temple Taper 597 on the lateral side of the anterior end of the temple leaf 584, a (hinge) Knuckle 596 at the anterior end of the temple leaf, a posterior portion of the temple arm length 593, a temple arm End Cap region 594, an End Cap Lanyard Thru-hole 595 near the posterior end and an inlayed or molded Temple (TPE) Textured Inlay Gripping Surface 592 on the medial side of the temple extension 593.

The current iteration of this embodiment currently comprises variable height and width lenses 101a/b, at least. Future iterations of this embodiment will comprise additional variable height and width lenses, as well as prescription lenses and all of the myriad treatments and coatings previously described.

In some embodiments of the eyeglass assembly, the eyeglasses are frameless, having first and second temple lugs with temple tab thru-holes and lens locking features; and a single lens configuration 201 having lens tabs, lens retention steps, lug locking notches; and a nose bridge insert.

In some embodiments of the eyeglass assembly, as illustrated in FIGS. 8A, 8B, 8C, 8D, 8E, 8F,9, 10, 11, 12, 13, and 14, in whole or in part, at least, the frameless (alternatively referred to as rimless herein) eyeglass assembly 200 comprises: a single lens configuration 201, a first temple lug 220 comprising a first temple tab thru-hole 222, a first temple lens retention step receiver 226, and a first lens locking feature 230a, such as a ridge, nodule, bump, tab, or other out-dent corresponding in location when assembled to an indentation or other type of notch 208a of the lens 201. In some embodiments the eyeglass assembly comprises a second temple lug 221 comprising a second temple tab thru-hole 224, a second temple lens retention step receiver 228, and a second lens locking feature 230b such as a ridge, nodule, bump, tab, or other out-dent corresponding in location when assembled to an indentation or other type of notch 208b of the lens 201. In some embodiments the single lens 201 comprising a central notched region 202 configured to accommodate the shape of a nose of a wearer; a first lens tab 204, a first lens retention step 205 and a first lug locking notch 208a; a second lens tab 206, a second lens retention step 207 and a second lug locking notch 208b, wherein the first lens tab 204 and the first lens retention step 205 are configured to releasably insert into the first temple tab thru-hole 222 and the first temple lens retention step receiver 226 of the first temple lug 220 such that an end of the first lens tab 204 protrudes through the first temple tab thru-hole, wherein first lens locking feature 230a is configured to insert into the first lug locking notch 208a and releasably secure the first temple lug 220 to the first side of the lens 201, wherein the second lens tab 206 and the second lens retention step 207 are configured to releasably insert into the second temple tab thru-hole 224 and the second temple lens retention step receiver 228 of the second temple lug 221 such that an end of the second lens tab 206 protrudes through the second temple tab thru-hole 224, and wherein second lens tab feature 230b is configured to insert into the second lug locking notch 208b and releasably secure the second temple lug 221 to the second side of the lens 201, thereby releasably locking the single lens 201 into the first temple lug 220 and the second temple lug 221. In some embodiments, the notch or other indentation is the first lens locking feature 230a, and corresponds in location to a ridge, nodule, bump, tab, or other out-dent of the lens 201 when the eyeglasses are assembled. In some embodiments, the notch or other indentation is the second lens locking feature 230b, and corresponds in location to a ridge, nodule, bump, tab, or other out-dent of the lens 201 when the eyeglasses are assembled.

In some embodiments, the eyeglass assembly further comprises, a nose bridge insert 150/250 configured to releasably attach to the central notched region 202 of the single lens, wherein the nose bridge insert comprises at least one attachment feature 252 configured to releasably attach to at least a portion of the central notched region of the single lens 201.

In some embodiments, the central notched region of the single lens comprises at least one attachment feature configured to releasably attach to at least a portion of the nose bridge insert. As shown FIG. 8B, in some embodiments, the central notched region 202 of the single lens comprises a first lateral notch 214 and a second lateral notch 216 that is configured to releasably attach the lens 201 the nose bridge insert 150/250 by allowing the notched region 202 to releasably fit into at least a groove 252 (which could also be a slit or a slot) of the nose bridge insert 150/250, as illustrated in FIGS. 15A thru 15C, at least. In some embodiments, the central notched region 202 of the single lens 201 further comprises a proximal notch 218 configured to releasably attach to at least a grooved portion 252 of the nose bridge insert 150/250.

In some embodiments, the nose bridge insert 150/250 comprises a split nose bridge configuration such that a coupler portion 254 of the split nose bridge is configured to releasably attach to at least a portion of the central notched region 202 of the single lens.

In some embodiments, the nose bridge insert 150/250 comprises a split nose bridge configuration such that a grooved portion 252 of the coupler portion 254 of the split nose bridge is configured to releasably attach to the at least one attachment feature 214, 216, or 218 (such as notches or indentation), of the central notched region 202 of the single lens 201.

In some embodiments, the nose bridge insert comprises a split nose bridge configuration such that a grooved portion 252 of the coupler portion 254 of the split nose bridge 250 is configured to releasably attach to at least the first lateral attachment feature 214 (such as a notch or indentation in the central notched region 202) and the second lateral attachment feature 216 (such as a notch or indentation in the central notched region 202) in the central notched region 202 of the single lens 201.

In some embodiments, the split nose bridge configuration of the nose bridge insert 150/250 further comprises: a pad linker arch 256 configured to be posteriorly offset from the coupler portion 254 wherein the pad linker arch is configured to straddle a bridge of the nose of the wearer, and the pad linker further comprising a first nose pad 258 on the left a first lateral side 260 and a first medial side 262, and a second nose pad 264 with a second medial side 268 and second lateral side 266, and a linking arch that links the first nose pad 258 to the second nose pad 264; wherein the first medial side 262 of the first nose pad 258 and the second medial side 268 of the second nose pad 264 are configured to rest on lateral cartilages, lesser alar cartilages, supra alar creases, dense connective tissue above the nostrils of the wearer, or a combination thereof. In some embodiments, the coupler portion 254 is further configured with one or more attachment features, which comprises slots, grooves or slits, in mating alignment with one or more protrusions or tabs of the pad linker arch or of the nose pads themselves, such that the first portion and the second portion can be accurately aligned and assembled together in either a releasable or permanent fashion. In some embodiments, the coupler portion is further configured with one or more attachment features, which comprises protrusions 172, 272, or tabs, in mating alignment with one or more cooperating attachment features, which comprises slots, or grooves, or slits 174, 274 of the pad linker arch, the linking arch, or of the nose pads, such that the first portion and the second portion can be accurately aligned and assembled together in either a releasable or permanent fashion.

In some embodiments, the split nose bridge configuration of the nose bridge insert 250 further comprises: a first nose pad 258 with a first lateral side 260 and a first medial side 262, and a second nose pad 264 with a second medial side 268 and second lateral side 266. In some embodiments, the linking arch is absent between the nose pads. In some embodiments, the coupler portion 254 is further configured with one or more attachment features, which comprises slots or grooves or slits, in mating alignment with one or more protrusions or tabs of the pad linker arch or of the nose pads themselves, such that the first portion and the second portion can be accurately aligned and assembled together in either a releasable or permanent fashion. In some embodiments, the coupler portion is further configured with one or more attachment features, which comprises protrusions or tabs, in mating alignment with one or more cooperating attachment features, which comprises slots or grooves or slits of the pad linker arch or of the nose pads themselves, such that the first portion and the second portion can be accurately aligned and assembled together in either a releasable or permanent fashion.

In some embodiments, the split nose bridge configuration of the nose bridge insert 150/250 is a single component, as illustrated in FIGS. 15A and 15B. In some embodiments, the first nose pad 158 is integral with the right leg of the coupler portion either by non-reversible connection thereto, or by way of formation as a single piece. In some embodiments, the second nose pad 164 is integral with the left leg of the coupler portion either by non-reversible connection thereto, or by way of formation as a single piece. In some embodiments, the nose bridge insert 150, 250 comprises both a linking arch that links the first nose pad to the second nose pad and an arch that links that links the first nose pad to the second nose pad. In some embodiments, the nose bridge insert 150, 250 comprises a gap at the apexes of both the linking arch and the arch and which is between the linking arch and the arch. In some embodiments, the split nose bridge configuration of the nose bridge insert 250 is an assembly comprising two or more components, for example the coupler portion 254, and the pad linker arch 256, as illustrated in FIG. 15C. In some embodiments, the split nose bridge configuration of the nose bridge insert 150, 250 is a unitary component. In some embodiments, the split nose bridge configuration of the nose bridge insert 150, 250 is a unitary molded component.

In some embodiments, the molded split nose bridge insert 150, 250 comprises: a coupler portion 154, 254; and a pad linker arch 156, 256, wherein the coupler portion is configured to releasably attach to the central notched region 102, 202 of the single lens 101, 201 and wherein the pad linker arch 156, 256, is configured to be posteriorly offset from the coupler portion and is further configured to straddle the bridge of a nose of the wearer.

In some embodiments, a split nose bridge insert 150, 250 is a molded piece comprises two or more materials. In some embodiments, the coupler portion 154, 254 and the pad linker arch 156, 256, are each molded of the same material. In some embodiments, the coupler portion comprises a first material and the pad linker arch comprises a second material, and the first material and the second material are different materials.

In some embodiments, the coupler portion 154, 254 and the pad linker arch 156, 256, are each molded of the same material having the same durometer. In some embodiments, the coupler portion comprises a first material having a first durometer, and the pad linker arch comprises the first material comprising a second durometer, and the first durometer and the second durometer are different. In some embodiments, the coupler portion comprises a first material having a first durometer, and the pad linker arch comprises the second material comprising the first durometer. In some embodiments, the coupler portion comprises a first material having a first durometer, and the pad linker arch comprises the second material comprising a second durometer, wherein the first durometer and the second durometer are different, and the first material and the second material are different materials.

In some embodiments, the durometer of the coupler portion 154, 254 is harder (higher) than the durometer of the pad linker arch 156, 256. A harder or tougher or higher durometer would provide a more secure attachment means between the lens and the nose bridge, whereas a softer durometer material would provide softer cushioning over the bridge of the nose of the wearer.

As noted previously herein, in some embodiments the durometer of the coupler portion is within a range from about Shore 60A to about Shore 100A. In some embodiments the durometer of the pad linker arch is within a range from about Shore 20A to about Shore 70A.

In some embodiments, the coupler portion and the pad linker arch of the molded split nose bridge insert 150/250 are integral with each other, at the same time, such as illustrated in FIGS. 15A and 15B. This will, in some embodiments, be achieved by a molding process that molds the coupler portion and pad linker arch as a single piece.

In some embodiments, the coupler portion 154, 254 and the pad linker arch 156, 256 of the molded split nose bridge insert 150, 250 are assembled after molding, such as illustrated in FIG. 15C. In some embodiments, the coupler portion 154 is further with one or more attachment features, which comprises slots, grooves or slits, in mating alignment with one or more protrusions or tabs of the pad linker arch or of the nose pads themselves, such that the first portion and the second portion can be accurately aligned and assembled together in either a releasable or permanent fashion. In some embodiments, the coupler portion is further configured with one or more attachment features, which comprises protrusions 172, 272, or tabs, in mating alignment with one or more cooperating attachment features, which comprises slots, grooves, or slits 174, 274 of the pad linker arch, the linking arch, or of the nose pads, such that the first portion and the second portion can be accurately aligned and assembled together in either a releasable or permanent fashion. The attachment features of the coupler portion; and the attachment features of the pad linker arch are aligned and assembled together in either a releasable or permanent fashion.

In some embodiments, the formation (by molding or another manner) of any portion of either the coupler portion or the pad linker arch will precede permanent attachment to one or more other portions of the molded split nose bridge insert 150, 250.

Figure 23:
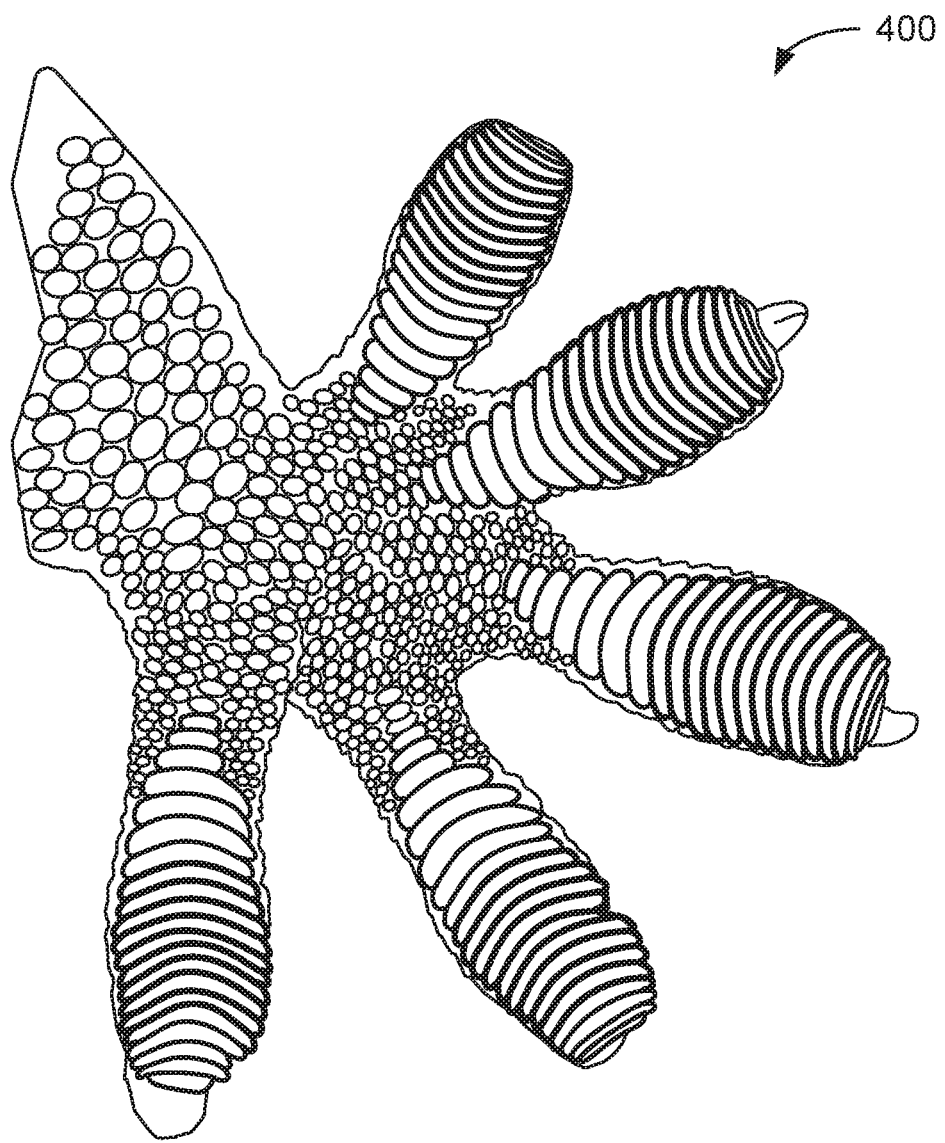
FIG. 23 is an illustrative plan view of a gecko's textured foot pad.
Figure 24:
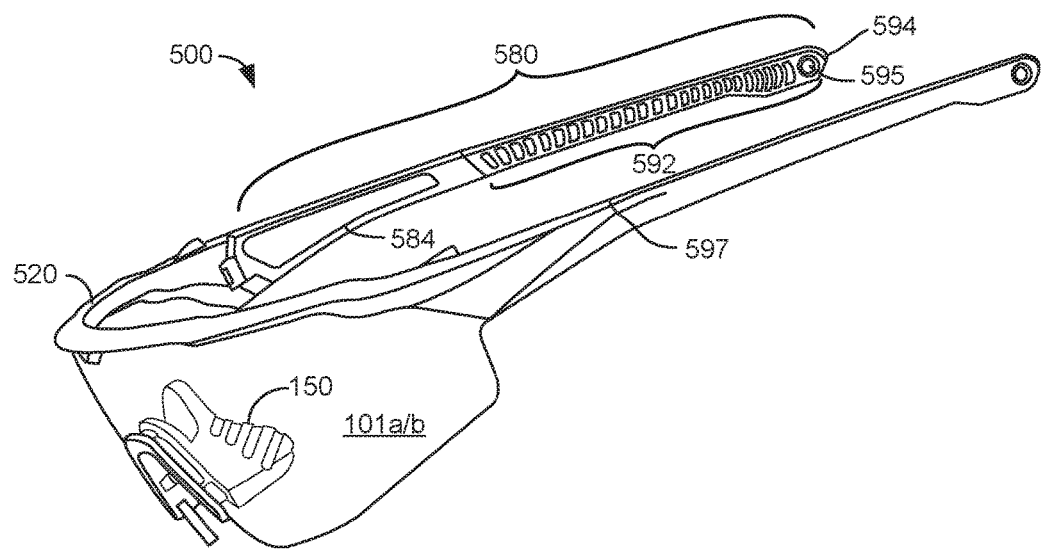
FIG. 24 is an illustrative ISO view of one embodiment of a semi-rimmed version of eyeglasses with an interchangeable single lens, further comprising a thinner, tapered temple leaf on the temple arm.

In some embodiments, the first medial side 162 of the first nose pad 158 and the second medial side 168 of the second nose pad 164 extending from the second nose bridge portion 156, 256 comprise one or more textured gripping surfaces 170, 270 to further stabilize the eyeglasses over the bridge of the nose, lateral cartilages, lesser alar cartilages, supra alar creases, and/or dense connective tissue above the nostrils of the wearer or a combination thereof. This is particularly helpful for humid or sweaty conditions to reduce or eliminate slipping of the eyeglasses as compared to smooth and/or higher durometer pad surfaces To further augment the gripping capability of the textured gripping surface 170, 270 of the split nose bridge insert, the textured gripping surface comprises a modified gecko-like texture pattern that is engineered to be similar to, but different from, that of a gecko's textured toe pads, as illustrated in FIG. 23.

In nature, the majority of gecko species have adhesive toe pads that allow them to adhere to most surfaces without the use of liquids or surface tension. The spatula-shaped setae arranged in lamellae on gecko footpads enable attractive van der Waals' forces between the β-keratin lamellae/setae/spatulae structures and the surface. In biology, setae/ˈsiːtiː/ (singular seta/ˈsiːtə/; from the Latin word for "bristle") are any of a number of different bristle- or hair-like structures on living organisms. In surface anatomy, a lamella is a thin plate-like structure, often one amongst many lamellae very close to one another, with open space between. Aside from respiratory organs, they appear in the traction surfaces of geckos. The pads on a gecko's feet are small hair-like processes that play a role in the animal's ability to cling to vertical surfaces. The micrometer-scale setae branch into nanometer-scale projections called spatulae.

Similar, but alternative to the gecko's foot pad patterns, the textured surface of the textured gripping surface 170, 270 of the split nose bridge insert 150/250, and the temple textured surface 192a, 192b, 292a, 292b, 392a, 392b, have irregular outgrowth ridge patterns, that act in a similar manner to the footpads of the gecko, to improve adhesion of the medial sides 162, 168, 262, 268 of the nose pads 158, 258, 164, 264.

In some embodiments, such as in FIGS. 8A, 8B, 9, 10, 11, 12, 13 and 14 in whole or in part, the eyeglass assembly further comprises: a first temple arm 280 having a first temple hinge leaf 284 and a first temple extension 288, and a second temple arm 282, with a second temple leaf 286 and a second temple extension 290, wherein the first temple leaf 284 is configured for attachment to the first temple lug 220 at the hinge feature recess 234a through a first temple arm hinge or knuckle 296a with a first hinge pin 298a, wherein the first temple extension 288 coupled to the leaf 284 and thereby coupled to the bridge hinge recess 234a is configurable to generally conform to a lateral shape of a wearer's head, extending over the proximal portion of a wearer's first ear between a first auricle of the first ear and a wearer's skull, wherein the second temple leaf 286 is configured for attachment to a second temple lug 221 at the hinge feature recess 234b which comprises a recess, through a second temple arm hinge or knuckle 296b with a second hinge pin 298b, and wherein the second temple extension 290 coupled to the leaf 286 and coupled thereby to the bridge hinge recess 234b is configurable to generally conform to a lateral shape of a wearer's head, extending over the proximal portion of a wearer's second ear between a second auricle of the second ear and the wearer's skull.

In some embodiments, the first temple extension 288, and the second temple extension 290 comprise titanium, stainless steel, copper, nickel, aluminum, Beta Ti, nitinol (NiTi), or alloys thereof. In some embodiments, the first temple extension 288 and the second temple extension 290 comprise malleable, flexible or pliant plastic.

In some embodiments, the first temple extension 288, and the second temple extension 290 each further comprise a textured gripping surface 292a, 292b.

In some embodiments, the eyeglass assembly further comprises: a first temple extension textured gripping surface 292a, and a second temple extension textured gripping surface 292b, wherein the first temple extension textured gripping surface is configured for attachment to, or over the first temple extension 288, and wherein the second temple extension textured gripping surface is configured for attachment to, or over the second temple extension 290. As with the split nose bridge insert 250, the temple textured surfaces of each eyeglass assembly design 292a, 292b, (and/or the temple textured surfaces 192a, 192b, 392a, 392b, described elsewhere herein), also have irregular outgrowth ridge patterns, that act in a similar manner to the toe pads of the gecko, to improve adhesion of the medial sides of the temple textured gripping surfaces as compared to non-textured temple arms of standard eyeglasses. In some embodiments the textured gripping surface, 192a, 192b, 292a, 292b, 392a, 392b comprises a removably replaceable molded polymeric textured surface.

In some embodiments, the eyeglass assembly further comprises: a first temple extension end cap 294a; and a second temple extension end cap 294b.

In some embodiments, the first temple lug 220 and the first temple arm 280 are components of a multi-part assembly and the second temple lug 221 and the second temple arm 282 are components of a multi-part assembly. In some embodiments, the multi-part assembly comprises: a first hinge assembly comprising a first knuckle 296a, and a first recess 234a into which the first knuckle is seated; and a second hinge comprising a second knuckle 296b and a second recess 234b into which the second knuckle is seated; wherein the first hinge and the second hinge are further assembled to the frame bridge with mating compressing joint assemblies, hinge pins 298a, 298b, or a combination thereof.

In some embodiments, the first temple lug 220 and the first temple arm 280 are a single molded component and the second temple lug 221 and the second temple arm 282 are a single molded component.

In some embodiments, the first temple arm 280 and the second temple arm 282 each comprise textured gripping surfaces 292a, 292b. In some embodiments, the textured gripping surface 292a is molded into the first temple arm 280 and the textured gripping surface 292b is molded into the second temple arm 282.

In some embodiments, the single lens 201 is configurable to accommodate a corrective lens prescription for a left eye, a right eye, or both left and right eye.

In some embodiments, the single lens 201 comprises a corrective lens shape for a left eye, a right eye, or both left and right eye.

In some embodiments, the single lens 201 is configurable to accommodate an anti-reflective treatment.

In some embodiments, the single lens 101 comprises an anti-reflective treatment or coating.

In some embodiments, the single lens 201 is configurable to accommodate a photochromic treatment. In some embodiments, the single lens 201 comprises silver halide, for non-limiting example silver chloride to generate a photochromatic effect when exposed to sunlight and/or UV rays. In some embodiments, the single lens 201 comprises organic photochromic molecules, for non-limiting example oxazines and/or naphthopyrans, to generate a photochromatic effect when exposed to sunlight and/or UV rays. In some embodiments, silver halide or organic photochromic molecules are embedded in the lens material. In some embodiments, the silver halide or organic photochromic molecules are coated on a pre-formed lens as part of a polymer film.

In some embodiments, the single lens 201 is configurable to accommodate a polarized treatment or coating. In some embodiments, the single lens 201 is configurable to accommodate a tinting treatment.

In some embodiments, the single lens 101 comprises a tinting treatment or coating.

In some embodiments, the single lens 201 is configurable to accommodate an anti-fogging treatment or coating.

In some embodiments, the single lens 201 is configurable to accommodate a scratch resistance treatment or coating.

In some embodiments, the eyeglasses comprises a first temple lug 220 comprising the first tab thru-hole 222 configured to receive the first lens tab 204. In some embodiments, the eyeglasses comprises a second temple lug 221 comprising the second tab thru-hole 224 configured to receive the second lens tab 206. In some embodiments, the eyeglasses comprises a first end 235a where the first temple arm 280 meets the first lug 220 at a top edge. In some embodiments, the eyeglasses comprises a second end 235b where the second temple arm 282 meets second lug 221 at a top edge.

In some embodiments, the finished single lens 201 of the rimless design eyeglass assembly 200 comprises: variable shapes, variable widths between the first temple lug and the second temple lug, and/or secondary variable widths below the first temple lug and the second temple lug, or variable overall lens heights from the proximal edge to the inferior edge of the lens.

Figure 9:
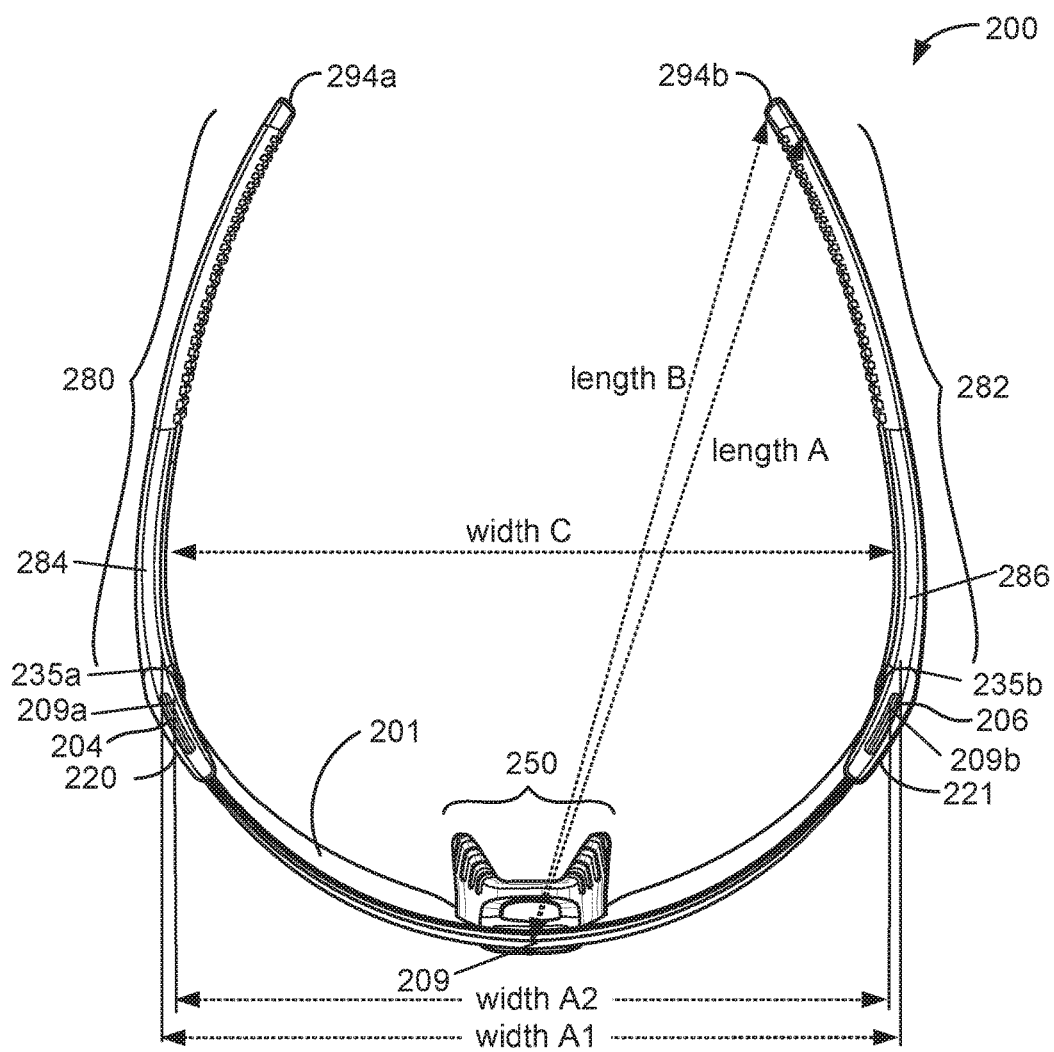
FIG. 9 is a top plan view of the eyeglasses of FIG. 8A.

In some embodiments, the average width between the top ends 235a, 235b of the of the first temple lug 220 and the second temple lug 221, respectively (referred to as "width A1" herein, as shown in FIG. 9) or between the first lens apex 209a of the first lens tab 204 and the second lens apex 209b of the second lens tab 206 (referred to as "width A2" herein, as shown in FIG. 9) is from about 137.5 about 126.5 mm. In some embodiments, width A1 and/or width A2 is from about 125 mm to about 145 mm, from about 127 mm to about 143 mm, from about 129 mm to about 141 mm, from about 131 mm to about 139 mm, or from about 133 mm to about 137 mm. In some embodiments, width A1 and/or width A2 is from 125 mm to 145 mm, from 127 mm to 143 mm, from 129 mm to 141 mm, from 131 mm to 139 mm, or from 133 mm to 137 mm. As used herein, the term "about" when referring to width A of a lens 101, 201 means variations of 1%, 2%, 3%, 4%, 5%, 6%, 7%, 8%, 9%, 10%, 11%, 12%, 13%, 14%, 15%, or 20%, depending on the embodiment.

Figure 8A:
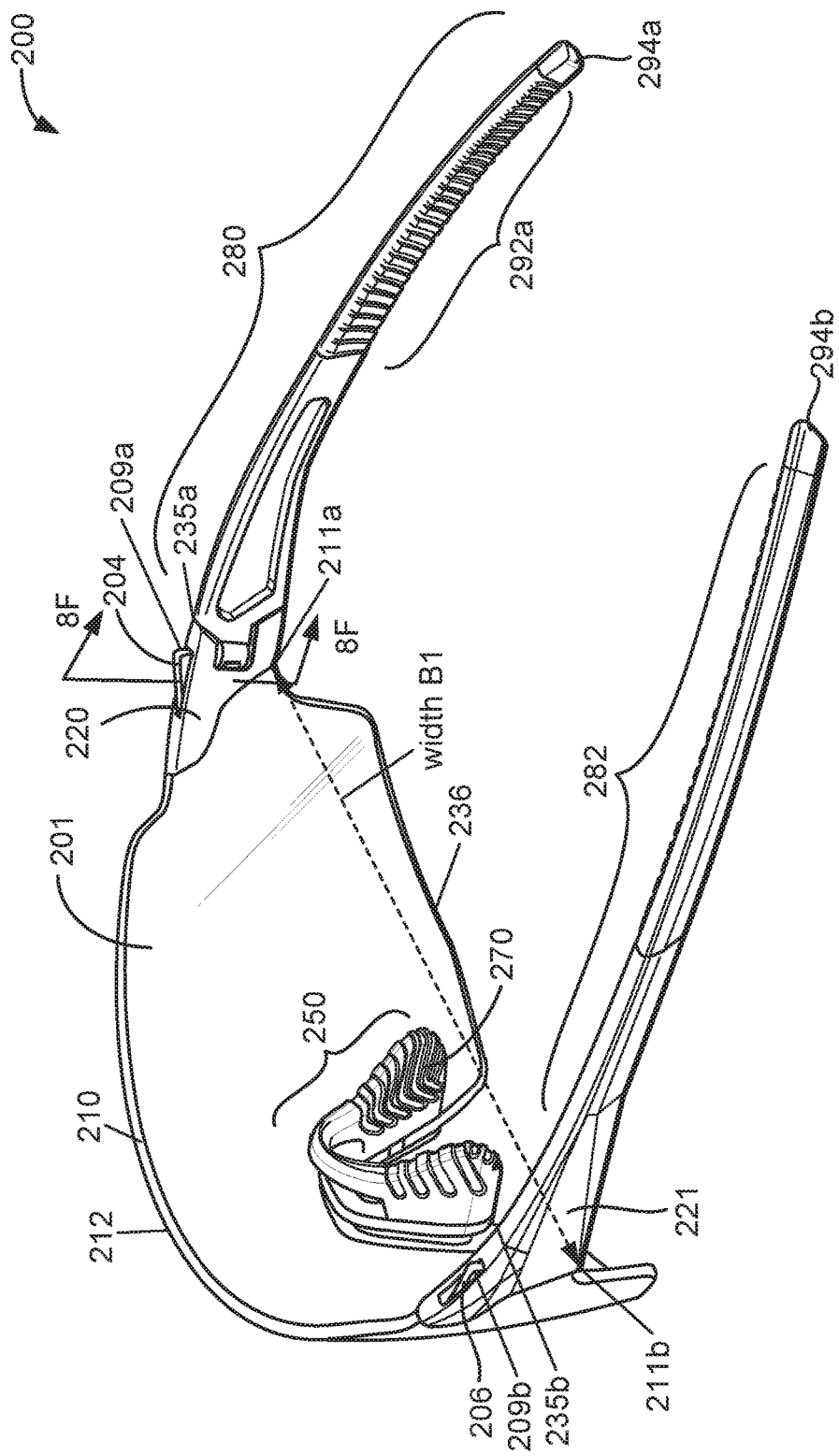
FIG. 8A is a perspective view (top left side) view of another embodiment of a rimless version of eyeglasses with an interchangeable single lens.
Figure 8B:
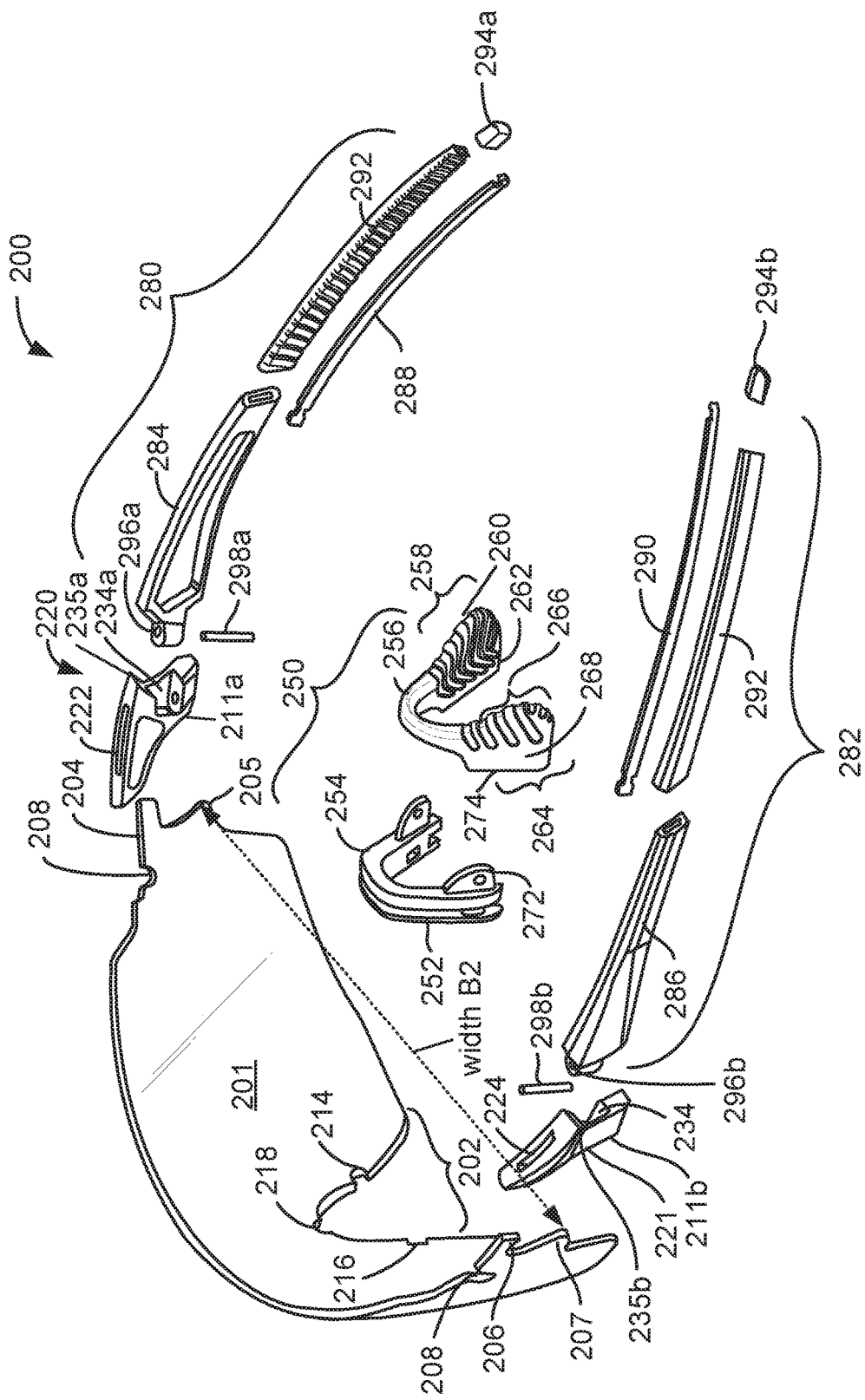
FIG. 8B is an exploded perspective view (top left side) view of the eyeglasses of FIG. 8A.
Figure 8C:
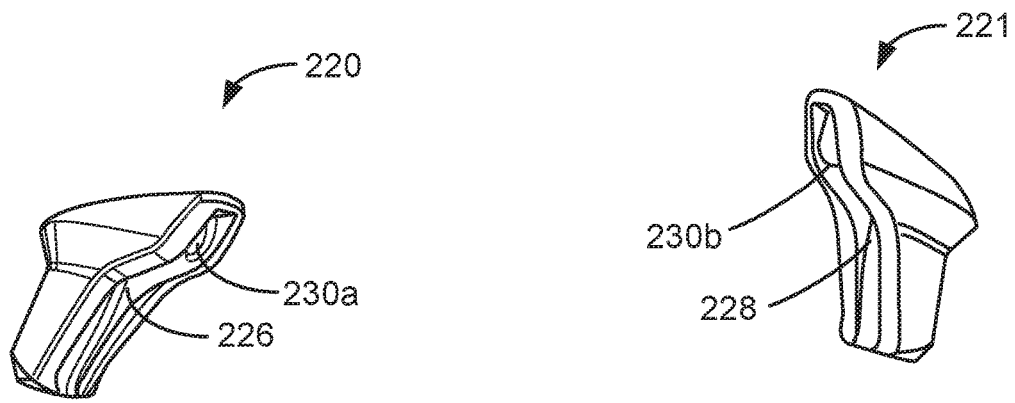
FIG. 8C is a perspective view (front inferior right side) of the first and second temple lugs of the eyeglasses of FIG. 8A.
Figure 8D:
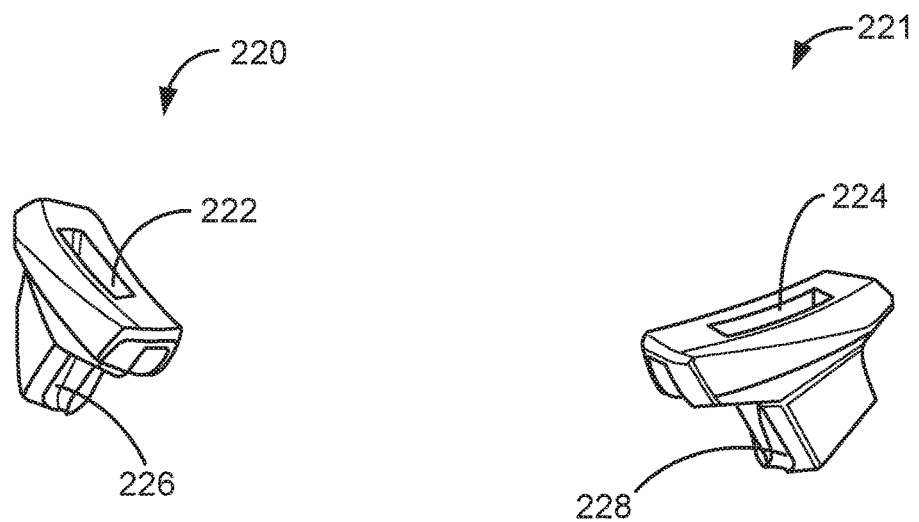
FIG. 8D is a perspective view (front top right side) of the first and second temple lugs of the eyeglasses of FIG. 8A.
Figure 8E:
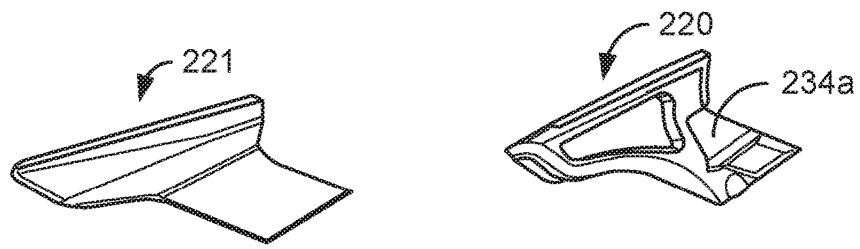
FIG. 8E is a perspective view (left side) of the first and second temple lugs of the eyeglasses of FIG. 8A.
Figure 8F:
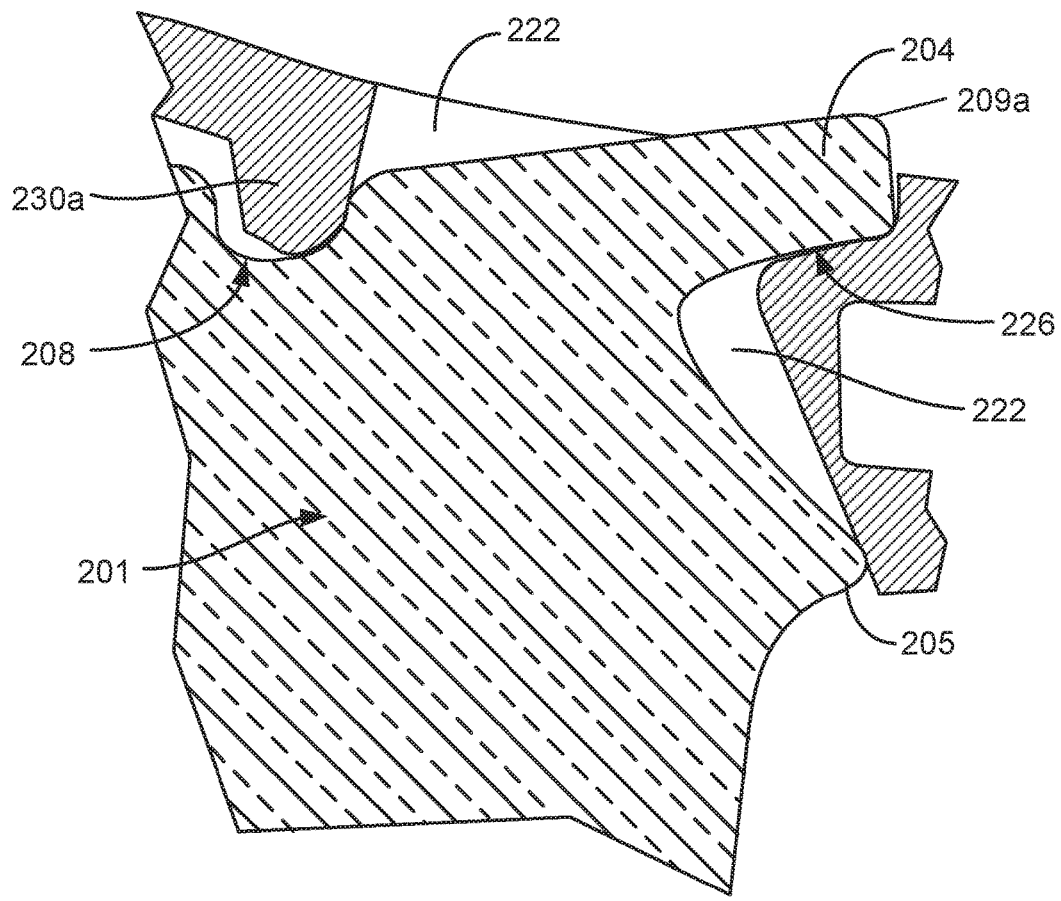
FIG. 8F is a section view of the connecting interface between the lens tab and the temple lug for a rimless version of eyeglasses with an interchangeable single lens.

In some embodiments, the average width between the first bottom meet location 211a where the lens 201 meets the temple lug 220 on the right of the eyeglasses and the second bottom meet location 211b where the lens 201 meets the temple lug 221 on the left of the eyeglasses (referred to as "width B1" herein, as shown in FIG. 8A), or between the first retention step 205 and the second retention step 207 (referred to as "width B2" herein, as shown in FIG. 8B) is about 137.5 mm. In some embodiments, width B1 and/or width B2 is from about 130 mm to about 145 mm, from about 132 mm to about 143 mm, from about 134 mm to about 141 mm, or from about 136 mm to about 139 mm. In some embodiments, width B1 and/or width B2 is from 130 mm to 145 mm, from 132 mm to 143 mm, from 134 mm to 141 mm, or from 136 mm to 139 mm. As used herein, the term "about" when referring to width B of a lens 101, 201 means variations of 1%, 2%, 3%, 4%, 5%, 6%, 7%, 8%, 9%, 10%, 11%, 12%, 13%, 14%, 15%, or 20%, depending on the embodiment.

In some embodiments of the single lens rimless design, the variable shapes include different radii of curvature of the lens. In some embodiments, the radius of curvature is about 7.0 Base Curve (referred to as "Base" elsewhere herein) in the horizontal direction by 4.0 Base Curve (referred to as "Base" elsewhere herein) in the vertical direction relative to a wearer's eye.

In some embodiments, the radii of curvature in the horizontal and/or vertical direction relative to the wearer's eye is from about 3.0 Base to about 8.0 Base, from about 3.5 Base to about 7.5 Base, from about 4.0 Base to about 7.0 Base, from about 4.5 Base to about 6.5 Base, from about 5.0 Base to about 6.0 Base, from about 5.5 Base to about 5.5 Base, from about 6.0 Base to about 5.0 Base, from about 6.5 Base to about 4.5 Base, from about 7.0 Base to about 4.0 Base, from about 7.5 Base to about 3.5 Base, from about 8.0 Base to about 3.0 Base, from about 8.5 Base to about 2.5 Base, from about 9.0 Base to about 2.0 Base, from about 9.5 Base to about 1.5 Base, from about 10.0 Base to about 1.0 Base, from about 10.5 Base to about 0.5 Base, or from about 11.0 Base to about 0.0 Base. In some embodiments, the radii of curvature in the horizontal and/or vertical direction relative to the wearer's eye is from 3.0 Base to 8.0 Base, from 3.5 Base to 7.5 Base, from 4.0 Base to 7.0 Base, from 4.5 Base to 6.5 Base, from 5.0 Base to 6.0 Base, from 5.5 Base to 5.5 Base, from 6.0 Base to 5.0 Base, from 6.5 Base to 4.5

Base, from 7.0 Base to 4.0 Base, from 7.5 Base to 3.5 Base, from 8.0 Base to 3.0 Base, from 8.5 Base to 2.5 Base, from 9.0 Base to 2.0 Base, from 9.5 Base to 1.5 Base, from 10.0 Base to 1.0 Base, from 10.5 Base to 0.5 Base, or from 11.0 Base to 0.0 Base. As used herein, the term "about" when referring to Base or Base Curve means variations of 1%, 2%, 3%, 4%, 5%, 6%, 7%, 8%, 9%, 10%, 11%, 12%, 13%, 14%, 15%, or 20%, depending on the embodiment In some embodiments of the single lens rimless design, the variable shapes of the frame-lens assemblies include different radii of curvature, as well. In some embodiments, the radius of curvature of the frame-lens assembly is about 8.0 Base (Horizontal). In some embodiments of the single lens rimless design, the variable shapes of the frame-lens assembly include different radii of curvature, as well. In some embodiments, the radius of curvature of the frame-lens assembly is 8.0 Base (Horizontal). As used herein, the term "about" when referring to Base or Base Curve means variations of 1%, 2%, 3%, 4%, 5%, 6%, 7%, 8%, 9%, 10%, 11%, 12%, 13%, 14%, 15%, or 20%, depending on the embodiment.

In some embodiments of the single lens rimless design, different radii of curvature for the frame-lens assembly are desired to accommodate different head shapes for various age, gender and ethnic wearers.

In some embodiments, the radius of curvature of the frame-lens assembly is from about 11.0 Base to about 4.0 Base, from about 11.0 Base to about 5.0 Base, from about 11.0 Base to about 6.0 Base, from about 11.0 Base to about 7.0 Base, from about 10.0 Base to about 4.0 Base, from about 10.0 Base to about 5.0 Base, from about 10.0 Base to about 6.0 Base, from about 10.0 Base to about 7.0 Base, from about 9.0 Base to about 4.0 Base, from about 9.0 Base to about 5.0 Base, from about 9.0 Base to about 6.0 Base, from about 9.0 Base to about 7.0 Base, from about 8.0 Base to about 4.0 Base, from about 8.0 Base to about 5.0 Base, 8.0 Base to about 6.0 Base, or from about 8.0 Base to about 7.0 Base. In some embodiments, the radius of curvature of the frame-lens assembly is from 11.0 Base to 4.0 Base, from 11.0 Base to 5.0 Base, from 11.0 Base to 6.0 Base, from 11.0 Base to 7.0 Base, from 10.0 Base to 4.0 Base, from 10.0 Base to 5.0 Base, from 10.0 Base to 6.0 Base, from 10.0 Base to 7.0 Base, from 9.0 Base to 4.0 Base, from 9.0 Base to 5.0 Base, from 9.0 Base to 6.0 Base, from 9.0 Base to 7.0 Base, from 8.0 Base to 4.0 Base, from 8.0 Base to 5.0 Base, 8.0 Base to 6.0 Base, or from 8.0 Base to 7.0 Base. As used herein, the term "about" when referring to Base or Base Curve means variations of 1%, 2%, 3%, 4%, 5%, 6%, 7%, 8%, 9%, 10%, 11%, 12%, 13%, 14%, 15%, or 20%, depending on the embodiment.

Figure 10:
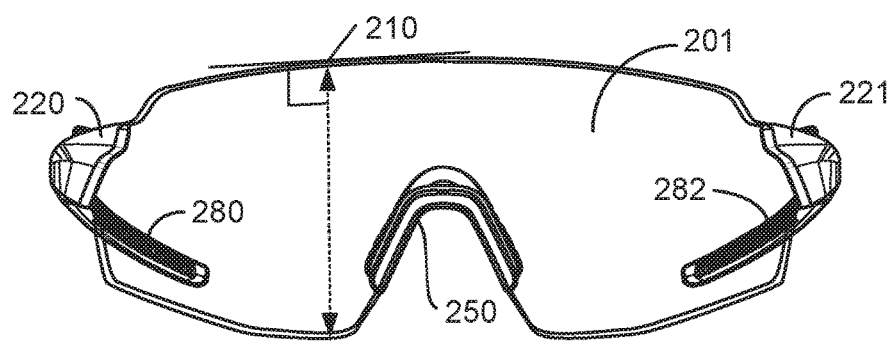
FIG. 10 is a front elevation view of the eyeglasses of FIG. 8A.
Figure 11:
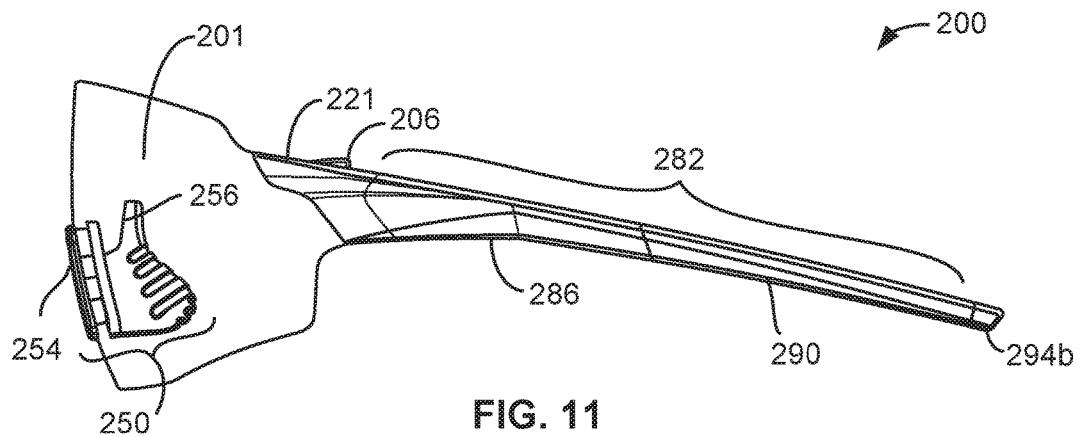
FIG. 11 is a left side elevation view of the eyeglasses of FIG. 8A.
Figure 12:
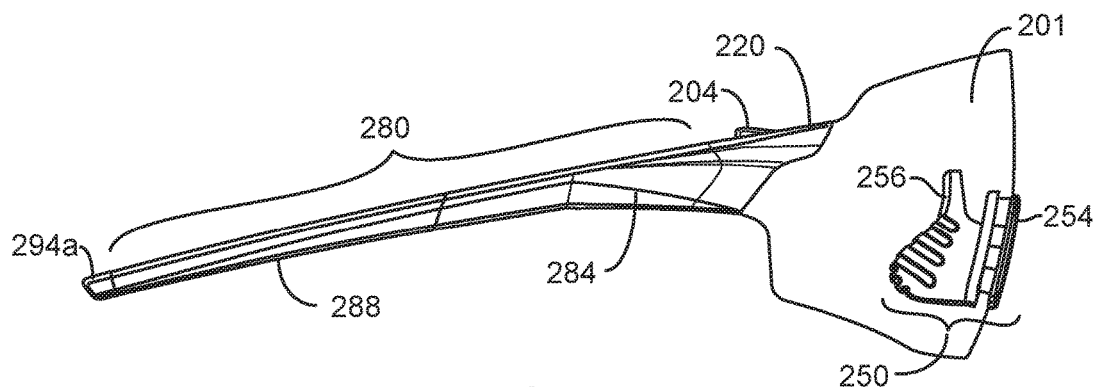
FIG. 12 is a right side elevation view of the eyeglasses of FIG. 8A.
Figure 13:
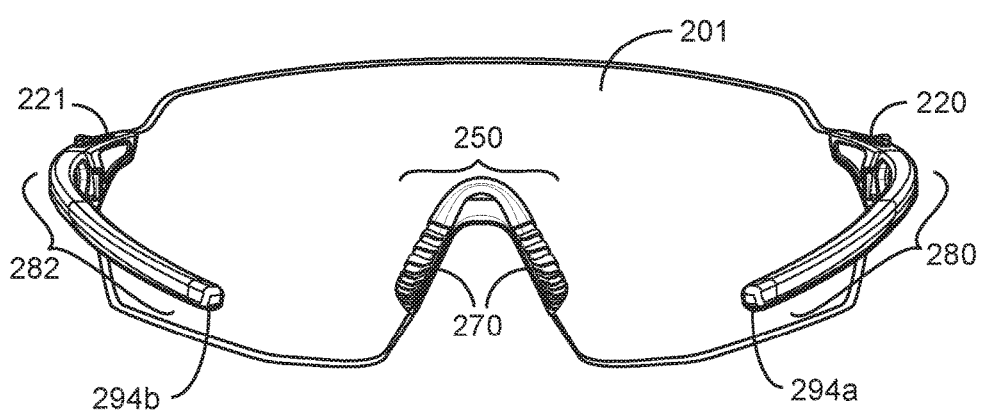
FIG. 13 is a rear elevation view of the eyeglasses of FIG. 8A.
Figure 14:
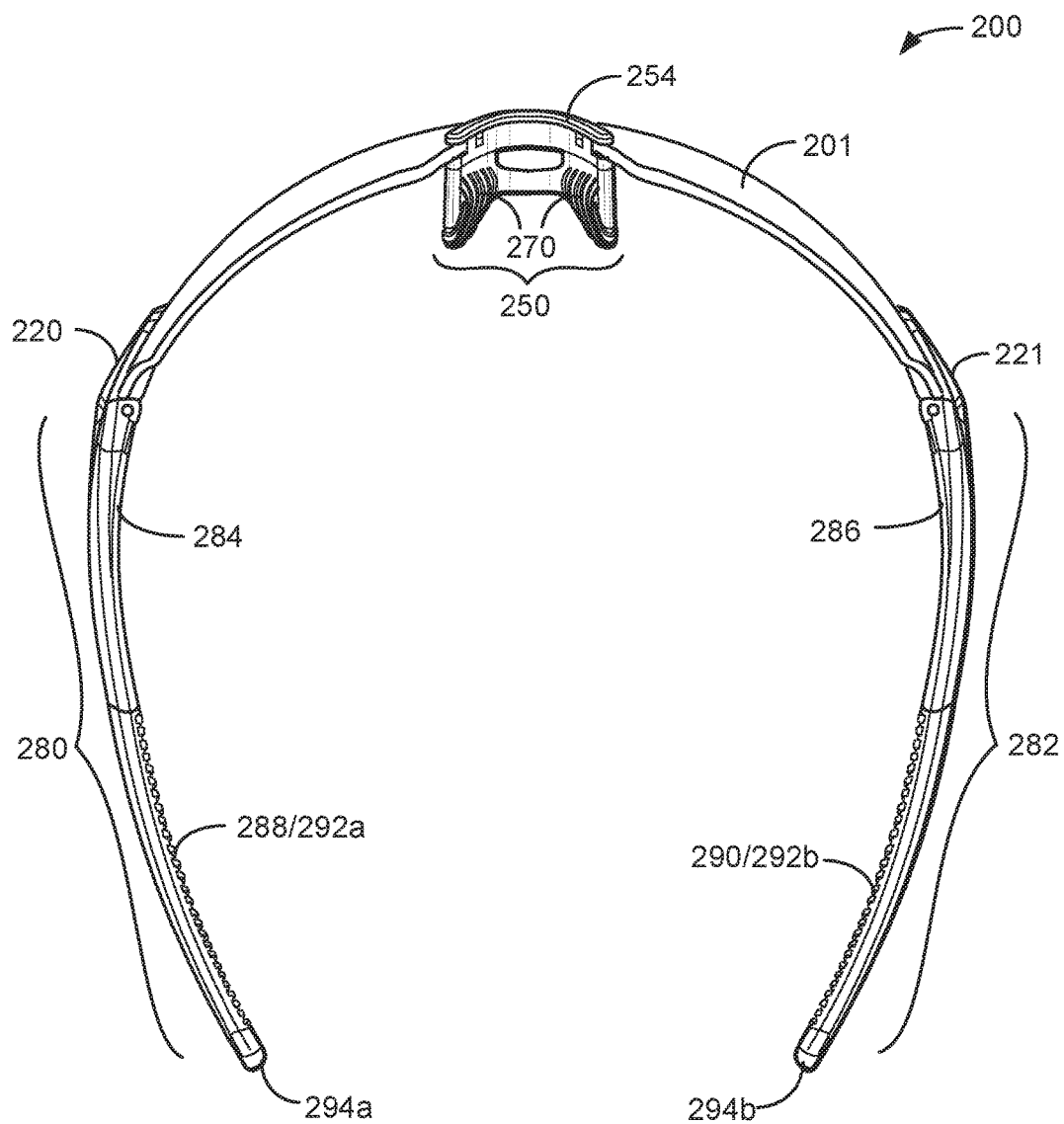
FIG. 14 is a bottom plan view of the eyeglasses of FIG. 8A.

In some embodiments, the average height (referred to as "height A" herein, as shown in FIG. 10) from the proximal edge 210 to the inferior edge 236 of the lens as measured along the lens perpendicularly from a tangent line at any location along the proximal edge that does not include the central notched region 202 includes an average dimension of 52.0 mm to about 57.5 mm when averaging a maximum height and a minimum height of the lens. In some embodiments, height A is from about 49.0 mm to about 55.0 mm, from about 50.0 mm to about 54.0 mm, or from about 51.0 mm to about 53.0 mm. In some embodiments, height A is from 49.0 mm to 55.0 mm, from 50.0 mm to 54.0 mm, or from 51.0 mm to 53.0 mm. Alternately, in some embodiments, height A is from about 40.0 mm to about 75.0 mm, from about 42.0 mm to about 73.0 mm, from about 44.0 mm to about 71.0 mm, from about 46.0 mm to about 69.0 mm, from about 48.0 mm to about 67.0 mm, from about 50.0 mm to about 65.0 mm, from about 52.0 mm to about 63.0 mm, from about 54.0 mm to about 61.0 mm, or from about 56.0 mm to about 59.0 mm. In some embodiments, height A is from 40.0 mm to 75.0 mm, from 42.0 mm to 73.0 mm, from 44.0 mm to 71.0 mm, from 46.0 mm to 69.0 mm, from 48.0 mm to 67.0 mm, from 50.0 mm to 65.0 mm, from 52.0 mm to 63.0 mm, from 54.0 mm to 61.0 mm, or from 56.0 mm to 59.0 mm. As used herein, the term "about" when referring to height A of a lens 201 means variations of 1%, 2%, 3%, 4%, 5%, 6%, 7%, 8%, 9%, 10%, 11%, 12%, 13%, 14%, 15%, or 20%, depending on the embodiment.

In some embodiments, the height (referred to as "height A" herein) from the proximal edge 210 to the inferior edge 236 of the lens as measured along the lens perpendicularly from a tangent line at any location along the proximal edge that does not include the central notched region 202 includes an average dimension of 51.0 mm when averaging a maximum height A and a minimum height A of the lens. In some embodiments, height A is from about 61.0 mm to about 46.0 mm, from about 59.0 mm to about 47.0 mm, from about 57.0 mm to about 48.0 mm, from about 55.0 mm to about 49.0 mm, or from about 53.0 mm to about 50.0 mm. In some embodiments, height A is from 61.0 mm to 46.0 mm, from 59.0 mm to 47.0 mm, from 57.0 mm to 48.0 mm, from 55.0 mm to 49.0 mm, or from 53.0 mm to 50.0 mm. As used herein, the term "about" when referring to height A of a lens 201 means variations of 1%, 2%, 3%, 4%, 5%, 6%, 7%, 8%, 9%, 10%, 11%, 12%, 13%, 14%, 15%, or 20%, depending on the embodiment.

In some embodiments, the average width (referred to "width C" herein, as shown in FIG. 9) of the eyeglasses of the single lens rimless design, from the first temple hinge leaf 284 to the second temple hinge leaf 286 is from 137.5 mm to about 140 mm. In some embodiments, width C is from about 135 mm to about 140 mm, from about 136 mm to about 139 mm, or from about 137 mm to about 138 mm. In some embodiments, width C is from 135 mm to 140 mm, from 136 mm to 139 mm, or from 137 mm to 138 mm. Alternatively, in some embodiments, width C is from about 130 mm to about 150 mm, from about 132 mm to about 148 mm, from about 134 mm to about 146 mm, from about 136 mm to about 144 mm, or from about 138 mm to about 142 mm. In some embodiments, width C is from 130 mm to 150 mm, from 132 mm to 148 mm, from 134 mm to 146 mm, from 136 mm to 144 mm, or from 138 mm to 142 mm. As used herein, the term "about" when referring to width C of the eyeglasses means variations of 1%, 2%, 3%, 4%, 5%, 6%, 7%, 8%, 9%, 10%, 11%, 12%, 13%, 14%, 15%, or 20%, depending on the embodiment.

In some embodiments, the average length (referred to "length A" herein, as shown in FIG. 9) of the eyeglasses of the rimless single lens design from an anterior aspect of the at the apex of the lens 212 to the posterior end of either of temple extensions 288, 290 when fully opened ready for wearing is about 170 mm. In some embodiments, length A is from about 155 mm to about 185 mm, from about 157 mm to about 183 mm, from about 159 mm to about 181 mm, from about 161 mm to about 179 mm, from about 163 mm to about 177 mm, from about 165 mm to about 175 mm, from about 167 mm to about 173 mm, or from about 169 mm to about 171 mm. In some embodiments, length A is from 155 mm to 185 mm, from 157 mm to 183 mm, from 159 mm to 181 mm, from 161 mm to 179 mm, from 163 mm to 177 mm, from 165 mm to 175 mm, from 167 mm to 173 mm, or from 169 mm to 171 mm. As used herein, the term "about" when referring to length A of the eyeglasses means variations of 1%, 2%, 3%, 4%, 5%, 6%, 7%, 8%, 9%, 10%, 11%, 12%, 13%, 14%, 15%, or 20%, depending on the embodiment.

In some embodiments, the average length (referred to "length B" herein, as shown in FIG. 9) of the eyeglasses of the rimless single lens design from an anterior aspect of the at the apex of the lens to the posterior end of either of the end caps 294a, 294b when fully opened ready for wearing is about 175 mm. In some embodiments, length B is about 160 mm to about 190 mm, from about 162 mm to about 188 mm, from about 164 mm to about 186 mm, from about 166 mm to about 184 mm, from about 168 mm to about 182 mm, from about 170 mm to about 180 mm, from about 172 mm to about 178 mm, or from about 174 mm to about 176 mm. In some embodiments, length B is from 160 mm to 190 mm, from 162 mm to 188 mm, from 164 mm to 186 mm, from 166 mm to 184 mm, from 168 mm to 182 mm, from 170 mm to 180 mm, from 172 mm to 178 mm, or from 174 mm to 176 mm. As used herein, the term "about" when referring to length B of the eyeglasses means variations of 1%, 2%, 3%, 4%, 5%, 6%, 7%, 8%, 9%, 10%, 11%, 12%, 13%, 14%, 15%, or 20%, depending on the embodiment.

Other iterations of this embodiment also incorporate variable height and width lenses 101a/b, at least.

Figure 27:
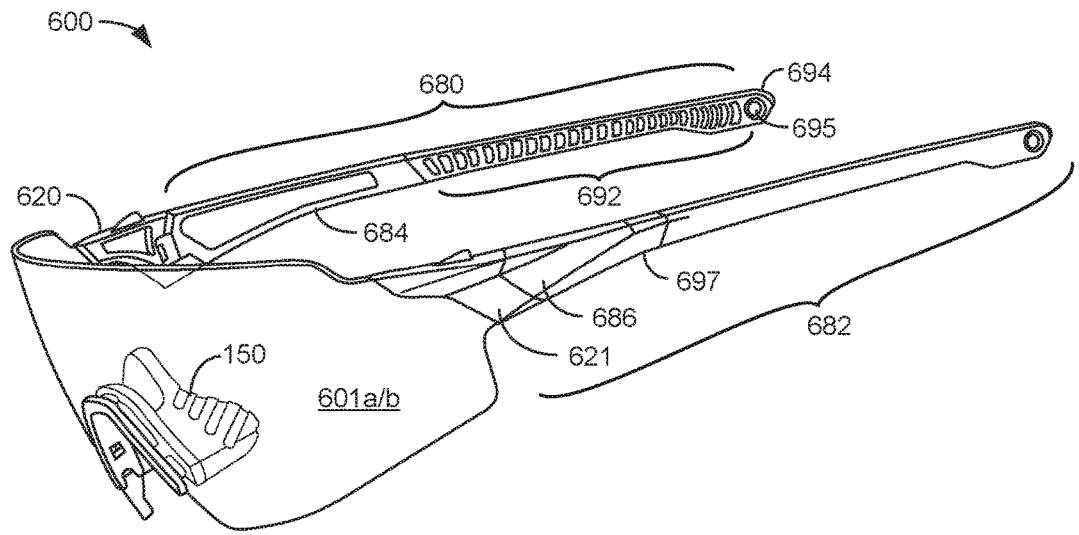
FIG. 27 is an illustrative perspective view (top left side) of another embodiment of a rimless version of eyeglasses with an interchangeable single lens, further comprising a thinner, tapered temple leaf on the temple arm, similar to FIG. 24.

In some embodiments, the rimless eyeglass assembly comprises: first and second temple lugs 620, 621, with temple tab thru-holes and lens locking features; and a single lens configuration 601a/b having lens tabs, lens retention steps, lug locking notches; and a nose bridge insert. The rimless eyeglass assembly 600, further comprises: temple arms 681, 682 modified such that the temple leaf 684,686 thickness of the temple arm is tapered for approximately ½ of the overall length, or a posterior portion of the temple leaf is between ¼ and ½ of the thickness of an anterior portion of the temple leaf. (The concept and feature component nomenclature for the temple arms is identical to that of the Semi-Rimmed Temple Arm Eyeglass Assembly). As illustrated in FIG. 27, the rimless eyeglass assembly 600, with 'MIL' tapered temple arms 680, 682, having the temple leaf portion 684, 686 of the temple arm, comprises a tapered lateral side. This taper 697, is configured for better fit on a wearer's head when wearing ear protection systems and helmets (i.e.: military, paramilitary, police or safety gear). Further, the thinner two-shot "GEKO" textured surface design 692 reduces friction and hair snag while using head gear and helmets to more easily secure frames onto a wearer's head with better comfort by reducing pressure points from head gear, particularly around the auricle of the ear, and especially between the helix and the skull. A lanyard/head strap receiver (thru-hole) 695 is added to the endcap region 694 of the temple arm to increase security of frame on the head or around the neck (similar to existing lanyard/head straps). This model is similar to the semi-rimmed version. As with the rimless version, the exemplary eyeglass assembly further comprises the previously described modular "split nose bridge insert 150 and coupler 154, configurable for variable nose sizes. Other iterations of this embodiment also incorporate a nose piece configured to accept the standard military "revisions" brand RX adapter.

As illustrated in FIG. 27, in some embodiments of the temple arms 680, 682, the temple leaf extension 684, 686, the temple leaf extension, and end cap portion 694 comprise a single substrate, and are formed as a single piece. In some embodiments, the formed single piece temple substrate further comprises a flexible metal or wire core (not shown in this figure). In some embodiments, the posterior end of the formed single piece temple leaf extension substrate comprises a thru-hole 695 configurable for a head strap attachment feature. In some embodiments, the temple leaf extension substrate further comprises a textured surface 692 on the medial side. In some embodiments, the textured surface 692 is a molded inlay. In some embodiments the textured surface 692 is a TPE (thermoplastic elastomer) material. In some embodiments, the temple arm 680 or the temple leaf extension 684, 694, comprises: titanium; stainless steel; aluminum; copper; nickel; Beta Titanium; nitinol (NiTi) or alloys thereof. In some embodiments, the temple arm or the temple leaf extension 684, 694, comprises: a malleable plastic; a flexible plastic or a pliant plastic. As noted in FIG. 27, (and similarly to FIGS. 26A-26D) the representative Temple Arms 680, 682 comprises a temple (hinge) leaf 684, 686, an internal metal temple extension core (not shown in this view), an anterior portion of the temple arm length, a temple taper 697 on the lateral side of the anterior end of the temple leaf 686, a (hinge) knuckle at the anterior end of the temple leaf (to mate with the first and second temple lugs 620, 621), a posterior portion of the temple arm length, a temple arm end cap region 694, an end cap lanyard thru-hole 695 near the posterior end and an inlayed or molded temple (TPE) textured inlay gripping surface 692 on the medial side of the temple extension.

This embodiment comprises variable height and width lenses 601a/b, at least. Other iterations of this embodiment comprise additional variable height and width lenses, as well as prescription lenses and all of the myriad treatments and coatings previously described.

In some embodiments, the eyeglass assembly has a bridge frame with an integral nose bridge, two lenses, each lens having a lens hook 308, 318, respectively.

In some embodiments, such as those illustrated in FIGS. 16A, 16B, 16C, 16D, 16E, 17, 18A, 19, 20, 21, and 22 in whole or in part, the dual lens or, alternately named, the twin lens eyeglass assembly 300 comprises: a frame bridge 320 comprising a first lens receiver 328, a second lens receiver 329, and an integral nose bridge 350 comprising two appendages and an arch connecting the two appendages. In some embodiments, the integral nose bridge 350 comprises a first lateral side 360 of the first appendage, and a second lateral side 366 of the second appendage, wherein the first and second lens receivers 328, 329, respectively, are positioned on the lateral sides 360, 366 of the appendages, respectively. In some embodiments, the first appendage comprises a portion of the first lens receiver. In some embodiments the second appendage comprises a portion of the second lens receiver. In some embodiments, the first appendage comprises a first medial side 362 and the second appendage comprises a second medial side 368 configured to straddle the bridge of a wearer's nose. In some embodiments, the nose bridge 350 comprises a first nose pad arm 352 and a second nose pad arm 354. In some embodiments, the first nose pad arm 352 extends from the first appendage. In some embodiments, the first nose pad arm 352 extends posteriorly from the first appendage. In some embodiments, the second nose pad arm 354 extends from the second appendage. In some embodiments, the first nose pad arm 354 extends posteriorly from the second appendage. In some embodiments, the first nose pad arm 352 comprises a first lens hook receptacle 326, and the second nose pad arm 354 comprises a second lens hook receptacle 327. In some embodiments, the first appendage on the first lateral side 360 comprises a first lens hook receptacle 326, and the second appendage on the first lateral side 366 comprises a second lens hook receptacle 327. The first lens hook receptacle 326 is within the first lens receiver 328.

In some embodiments, the second lens hook receptacle 327 is within the second lens receiver 329. In some embodiments, the first lens hook receptacle 326 is positioned and configured to couple the first lens 301 to the frame bridge 320 when the first lens hook 308 is seated in the first lens hook receptacle 326 and the first lens 301 is fit into the first lens receiver 328. In some embodiments, the second lens hook receptacle 327 is positioned and configured to couple the first lens 311 to the frame bridge 320 when the second lens hook 318 is seated in the second lens hook receptacle 327 and the second lens 311 is fit into the second lens receiver 329. In some embodiments, the twin lens eyeglass assembly 300 comprises a first tab thru-hole 322 and a first lens retention step receiver 324 in a lateral side of the first lens receiving portion 328. In some embodiments, the twin lens eyeglass assembly 300 comprises a second tab thru-hole 323 and a second lens retention step receiver 325 in a lateral side of the second lens receiving portion 329. In some embodiments, the twin lens eyeglass assembly 300 comprises a first tab thru-hole 322, and a first lens retention step receiver 324 in a medial side of the first lens receiving portion 328. In some embodiments, the twin lens eyeglass assembly 300 comprises a second tab thru-hole 323 and a second lens retention step receiver 325 in a medial side of the second lens receiving portion 329. In some embodiments, the twin lens eyeglass assembly 300 comprises and a first lens 301 comprising; a first proximal edge 302, a first medial edge 303, a first lateral edge 304 and a first inferior edge 305; a first lens tab 306 on or about the first proximal edge and in proximity to the first lateral edge, a first lens retention step 307 on the first lateral edge below the first tab, and a first lens hook 308 on or about the first proximal edge and in proximity to the first medial edge. In some embodiments, the twin lens eyeglass assembly 300 comprises a second lens 311 comprising; a second proximal edge 312, a second medial edge 313, a second lateral edge 314 and a second inferior edge 315; a second lens tab 316 on or about the second proximal edge and in proximity to the second lateral edge, a second lens retention step 317 on the second lateral edge below the second lens tab, and a second lens hook 318 on or about the second proximal edge and in proximity to the second medial edge. In some embodiments, the first lens tab 306 and the first lens retention step 307 are configured to releasably insert into the first tab thru-hole 322 and the first lens retention step receiver 324 of the frame bridge 320 such that an end of the first lens tab 306 protrudes through the top of the first temple tab thru-hole 322. In some embodiments, the first lens hook 308 is configured to releasably insert into the first lens hook receptacle 326 of the nose bridge 350. In some embodiments, the twin lens eyeglass assembly 300 comprises the second lens tab 316 and the second lens retention step 317 are configured to releasably insert into the second tab thru-hole 323 and the second lens retention step receiver 325 of the frame bridge such that an end of the second lens tab 316 protrudes through the top of the second temple tab thru-hole 323. In some embodiments, and the second lens hook 318 is configured to releasably insert into the second lens hook receptacle 327 of the nose bridge.

In some embodiments, the lenses 301, 311 are manufactured from plastic, such as polycarbonate, high-index plastics, polyurethanes, urethane-based monomers, such as Tribrid, and Trivex developed by Simula Inc. and used for wear and scratch resistance and ultra-high impact resistant lenses; allyl diglycol carbonate, such as CR-39, CR-424, CR-607, CR-630, developed by Columbia-Southern Chemical Corp, and used in the fabrication of photochromic lenses; thiourethane polymers (MR Series), developed by Mitsui Chemicals and used for high refractive index, high ABBE number, low specific gravity and high impact resistance lenses; nylon, glass, or Crown glass, (glass made without lead or iron).

In some embodiments, the frame bridge 320 is configured to releasably capture a portion of the first lateral edge 304, the first proximal edge 302 and a portion of the first medial edge 303 of the first lens 301 between the first lens retention step receiver 324, an inferior edge 330 of the first lens receiver 328, and the first lateral side of the integral nose bridge 350. In some embodiments, the frame bridge 320 is configured to releasably capture a portion of the second lateral edge 314, the second proximal edge 312 and a portion of the second medial edge 313 of the second lens 311 between the second lens retention step receiver 325, an inferior edge 332 of the second lens receiving portion 329, and the second lateral side of the integral nose bridge 350, thereby releasably locking the first lens and the second lens into the frame bridge. The releasable capture is achieved for the first lens by the lens tab capture 306 being seated in the thru-hole 322, on the temple-side of the frame and being held in place by the hook 308 being seated in place in the hook receptacle 326 on the frame bridge, at least. The releasable capture is achieved for the second lens by the lens tab 316 capture being seated in the thru-hole 323, on the temple-side of the frame and being held in place by the hook 318 being seated in place in the hook receptacle 327 on the frame bridge, at least.

In some embodiments of the twin lens eyeglass assembly 300, the first nose pad arm 352 of the nose bridge 350 further comprises a first nose pad 358, and the second nose pad arm 354 of the nose bridge 350 further comprises a second nose pad 364.

In some embodiments, at least the first nose pad 358 on the first medial side 362 and the second nose pad 364 on the second medial side 368 of further comprise a textured gripping surface 370 to further stabilize the eyeglasses over the bridge of the nose, lateral cartilages, lesser alar cartilages, supra alar creases, and/or dense connective tissue above the nostrils of the wearer or a combination thereof. This is particularly relevant in humid or sweaty conditions. As described previously with the split nose bridge inserts (150, 250), to further augment the gripping capability of the textured gripping surface of the nose pads, the textured gripping surface comprises a modified gecko toe pad texture pattern, similar to but different from that of a gecko toe pad.

In contrast to the toe pad texture pattern of the gecko toe pad, the textured surface of the textured gripping surface of the nose pads, and the temple textured surface, described infra, have irregular outgrowth ridge patterns. Nevertheless, the textured gripping surface of the nose pads, and the temple textured surfaces described infra act in a similar manner to the footpads (i.e. toe-pads) of the gecko, to improve adhesion of at least the medial sides of the nose pads and the temple textured gripping surfaces.

In some embodiments, the first nose pad 358 comprises a first nose pad attachment feature 372, such as a slot, slit, or guide hole, or alternatively such as a protrusion or extension or hook configured to mate with a correspondingly shaped feature, i.e. a protrusion, hook, extension, or alternatively, a slot, slit, or guide hole, of the first nose pad arm 352 in a socket-plug manner, or a plug-socket manner for example. In some embodiments, the second nose pad 364 comprises a second nose pad attachment feature 374 such as a slot, slit, or guide hole, or alternatively such as a protrusion or extension or hook configured to mate with a correspondingly shaped feature, i.e. a protrusion, hook, extension, or alternatively, a slot, slit, or guide hole of the second nose pad arm 354 in a socket-plug manner, or a plug-socket manner for example.

In some embodiments, the first nose pad 358 is molded integrally to the first nose pad arm 352. In some embodiments, the second nose pad 364 is molded integrally to the second nose pad arm 354.

In some embodiments, the dual or twin lens eyeglass assembly 301 further comprises: a first temple arm 380 having a first temple leaf 384 and a first temple extension 388, and a second temple arm 382, with a second temple leaf 386 and a second temple extension 390. In some embodiments, the first temple leaf 384 is configured for attachment to a first end of the frame bridge 320 at or about a frame bridge hinge feature recess 334a through a first temple arm hinge or knuckle 396a with a hinge pin 398a, and the first temple extension 388 is configurable to generally conform to a lateral shape of a wearer's head, extending over the proximal portion of a wearer's first ear between a first auricle of the first ear and a wearer's skull. In some embodiments, the second temple leaf 386 is configured for attachment to a second end of the frame bridge 320 at or about a frame bridge hinge feature recess 334b through a second temple arm hinge or knuckle 396b with a hinge pin 398b, and the second temple extension 390 is configurable to generally conform to a lateral shape of a wearer's head, extending over the proximal portion of a wearer's second ear between a second auricle of the second ear and the wearer's skull.

In some embodiments, the first temple extension 388, and the second temple extension 390 comprise titanium, stainless steel, copper, nickel, aluminum, Beta Ti, nitinol (NiTi), or alloys thereof. In some embodiments, the first temple extension 388 and the second temple extension 390 comprise malleable, flexible or pliant plastic.

In some embodiments, the first temple extension 388, and the second temple extension 390 each further comprise a textured gripping surface 392a, 392b, respectively.

In some embodiments, the eyeglass assembly comprises: a first temple extension textured gripping surface 392a, and a second temple extension textured gripping surface 392b; wherein the first temple extension textured gripping surface 392a is configured for insertion onto, over, or surrounding the first temple extension 388, and wherein the second temple extension textured gripping surface 392b is configured for insertion onto, over, or surrounding the second temple extension 390. In some embodiments, the textured gripping surface, 392a, 392b comprises a removably replaceable molded polymeric textured surface.

In some embodiments, the eyeglass assembly further comprises: a first end cap 394a, and a second end cap 394b.

In some embodiments, the frame bridge 320, the first temple arm 380, and the second temple arm 382 are a multi-part assembly.

In some embodiments, the multi-part assembly comprises: a first hinge comprising a first frame bridge recess 334a and a first knuckle 396a that is linked to the first frame bridge recess 334a with a hinge pin 398a. In some embodiments, the multi-part assembly comprises: a second frame bridge recess 334b and a second knuckle 396b that is linked to the second frame bridge recess 334b with a hinge pin 398b. When assembled, the pins 398a, 398b fit within holes in the knuckles 396a, 396b, and the pins 398a, 398b then seat within indents in the frame bridge recesses 334a, 334b, respectively, and form pivot points for the first temple arm 380 and the second temple arm 382, respectively. In some embodiments, the first knuckle comprises pin nubs that protrude from the top and/or bottom of the first knuckle (in alternative to a pin), and seat within one or more indents in the first frame bridge recess 334a to form the hinge pivot point when assembled. In some embodiments, the second knuckle comprises pin nubs that protrude from the top and/or bottom of the second knuckle (in alternative to a pin), and seat within one or more indents in the second frame bridge recess 334b to form the hinge pivot point when assembled. In some embodiments of the first or second hinge, the first or second knuckle comprises a pin that when assembled to the knuckle protrudes from the top or bottom of the knuckle, and a pin nub integral to the knuckle that protrudes from the other end (bottom or top) of the knuckle (in alternative to a pin on that side). In some embodiments, the pin is a screw, and the knuckle on either the right or left side or both, comprises threads that coordinate with the screw and the frame bridge recess comprises a hole that is accessible to a user for accessing the head of the screw to tighten or assemble the arm to the glasses. In some embodiments, the frame bridge comprises mating compressing joint assemblies, hinge pins 398a, 398b, or a combination thereof.

In some embodiments, the bridge frame 320, the first temple extension 388 and the second temple extension 390 are a single molded component. In some embodiments of the single molded eyeglasses having the bridge frame 320, the first temple extension 388 and the second temple extension 390 are a single molded component, the eyeglasses comprise no hinges.

In some embodiments, the first temple arm 380 and the second temple arm 382 further comprise textured gripping surfaces 392a, 392b.

In some embodiments of the single molded component, the textured gripping surfaces 392a, 392b are configured for insertion onto, over, or surrounding the first temple extension 388 and the second temple extension 390, respectively. In some embodiments of the single molded component, the textured gripping surface 392a is molded into the first temple extension 388 and the textured gripping surface 392b is molded into the second temple extension 390.

In some embodiments, the first lens 301 and the second lens 311 are configurable to accommodate a corrective lens prescription. In some embodiments, the first lens 301 or the second lens 311 or both comprise a corrective lens shape.

In some embodiments, the first lens 301 or the second lens 311 or both are configurable to accommodate an anti-reflective treatment. In some embodiments, the first lens 301 or the second lens 311 or both comprise an anti-reflective treatment or coating.

In some embodiments, the first lens 301 or the second lens 311 or both are configurable to accommodate a photochromic treatment. In some embodiments, the first lens 301 or the second lens 311 or both comprise a silver halide, for non-limiting example silver chloride to generate a photochromatic effect when exposed to sunlight and/or UV rays. In some embodiments, the single lens 101 comprises organic photochromic molecules, for non-limiting example oxazines and/or naphthopyrans, to generate a photochromatic effect when exposed to sunlight and/or UV rays. In some embodiments, silver halide or organic photochromic molecules are embedded in the lens material. In some embodiments, the silver halide or organic photochromic molecules are coated on a pre-formed lens as part of a polymer film.

In some embodiments, the first lens 301 or the second lens 311 or both are configurable to accommodate an anti-reflective treatment or coating.

In some embodiments, the first lens 301 or the second lens 311 or both are configurable to accommodate a photochromic treatment or coating.

In some embodiments, the first lens 301 or the second lens 311 or both are configurable to accommodate a polarized treatment or coating.

In some embodiments, the first lens 301 or the second lens 311 or both are configurable to accommodate a tinting treatment or coating. In some embodiments, the first lens 301 or the second lens 311 or both comprise a mirror treatment or coating.

In some embodiments, the first lens 301 or the second lens 311 or both are configurable to accommodate an anti-fogging treatment or coating.

In some embodiments, the first lens 301 or the second lens 311 or both are configurable to accommodate a scratch resistance treatment or coating.

In some embodiments, the first lens 301 or the second lens 311 or both are configurable to accommodate a hydrophobic coating treatment.

In some embodiments, the first lens 301 or the second lens 311 or both are configurable to accommodate an oleo-phobic coating treatment.

In some embodiments, the first lens 301 or the second lens 311 or both are configurable to accommodate any combination of treatments or coatings described herein.

The options for the shapes and widths of the finished twin lens design 300 are configured for style or face comfort or face shape or eye coverage, in some embodiments. In some embodiments, the single lenses having differing shapes or widths are suitably configured for and/or are interchangeable for a single frame bridge (rim) 320. The single lenses having differing shapes and/or widths, in some embodiments, are pre-selected and provided as optional sets including a rim 320 for each set of finished lens 301, 302. In some embodiments, several finished sets of lenses 301, 302 having differing shapes and/or widths matching sets, are provided as optional sets in a single package with a single rim 320.

In some embodiments, each finished lens of the semi-rimmed dual lens design eyeglass assembly 300 (alternatively referred to as a twin lens eyeglass assembly or a twin lens design herein) comprises: variable shapes, variable widths between the ends of the frame bridge and the integral nose bridge, and/or secondary variable widths below the ends of the frame bridge and the integral nose bridge, or variable overall lens heights from the proximal edge to the inferior edge of the lenses.

Figure 16A:
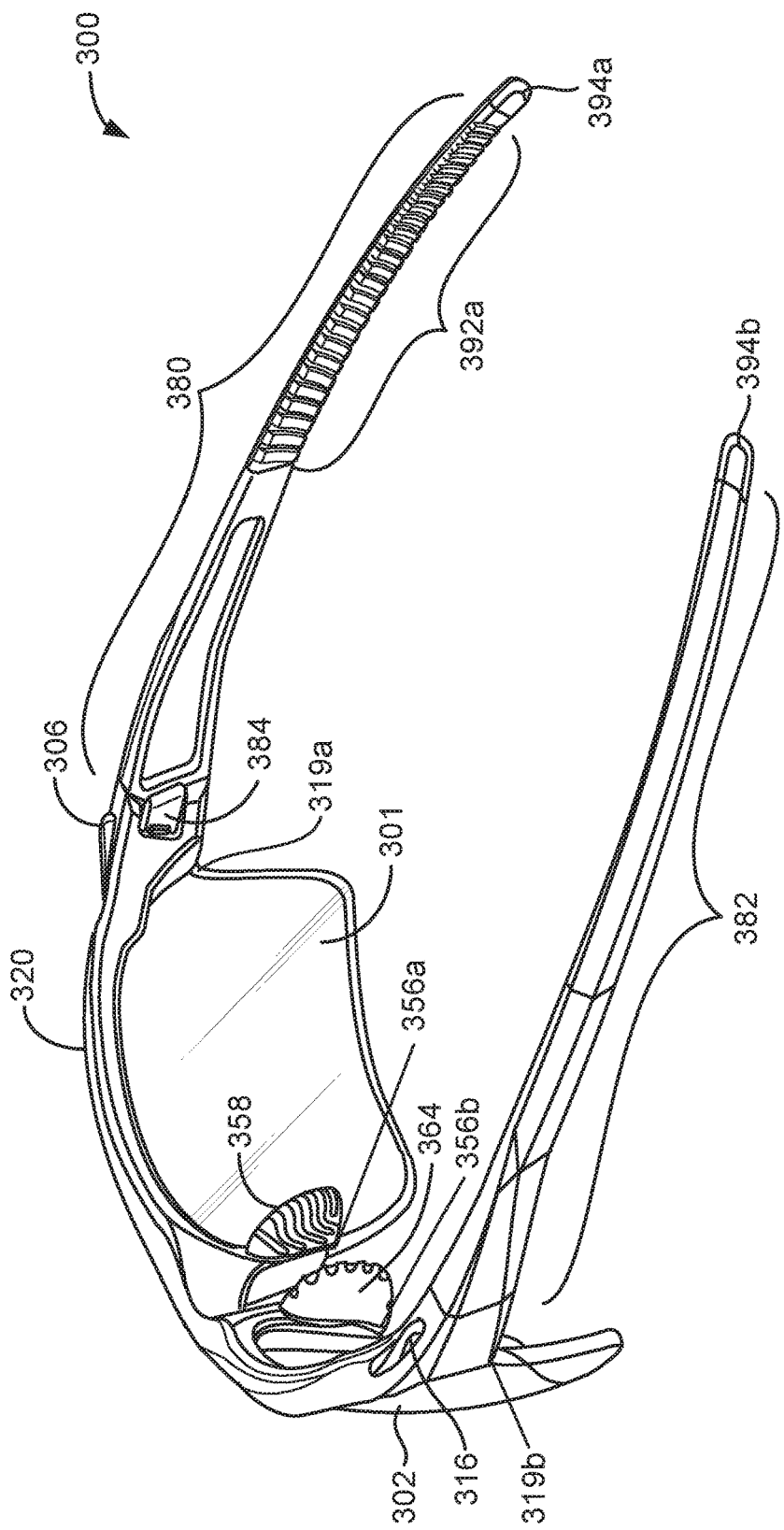
FIG. 16A is a perspective view (top left side) view of another embodiment of a semi-rimmed version of eyeglasses with two interchangeable lenses and an integral nose bridge.
Figure 16B:
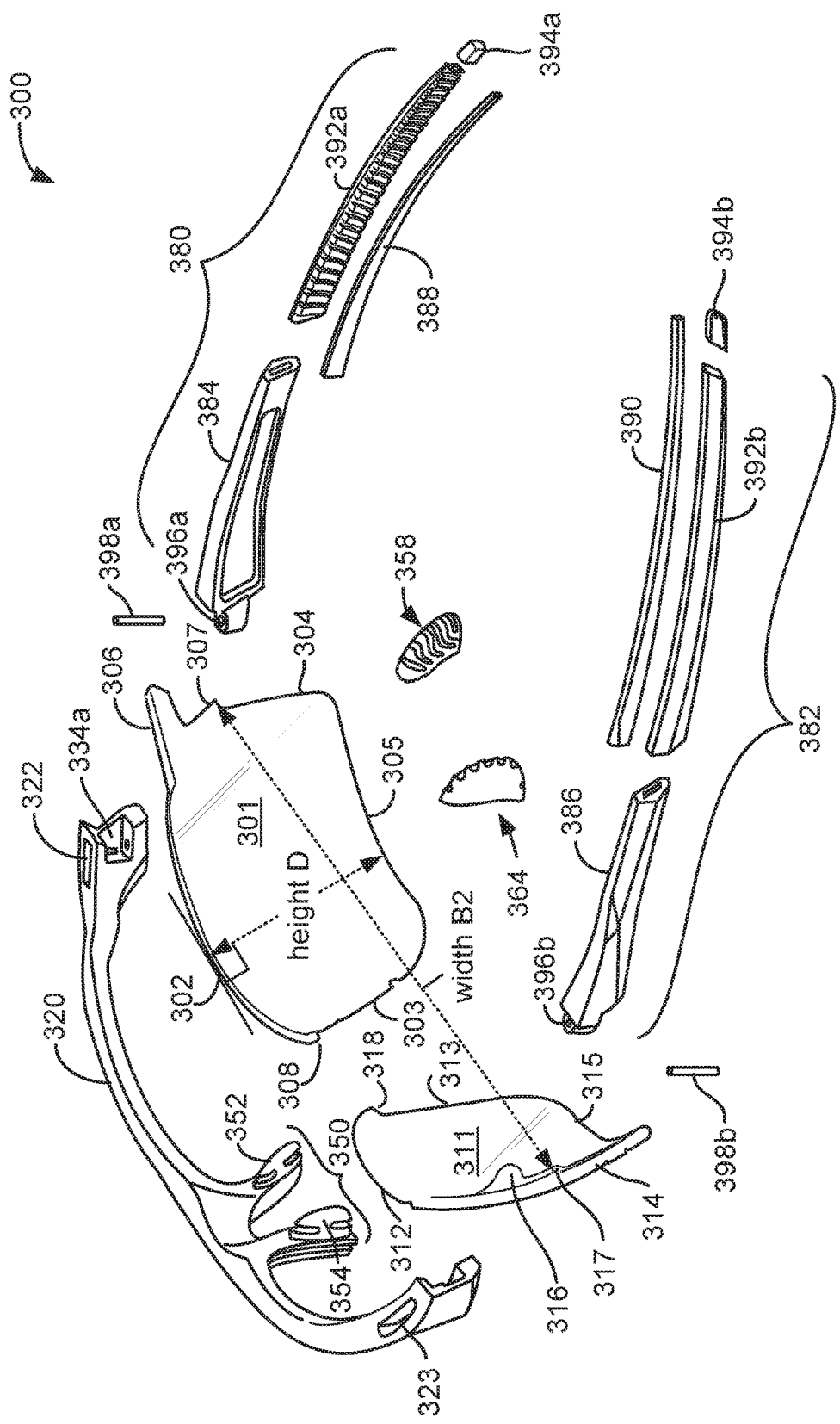
FIG. 16B is an exploded perspective view (top left side) view of the eyeglasses of FIG. 16A.
Figure 16C:
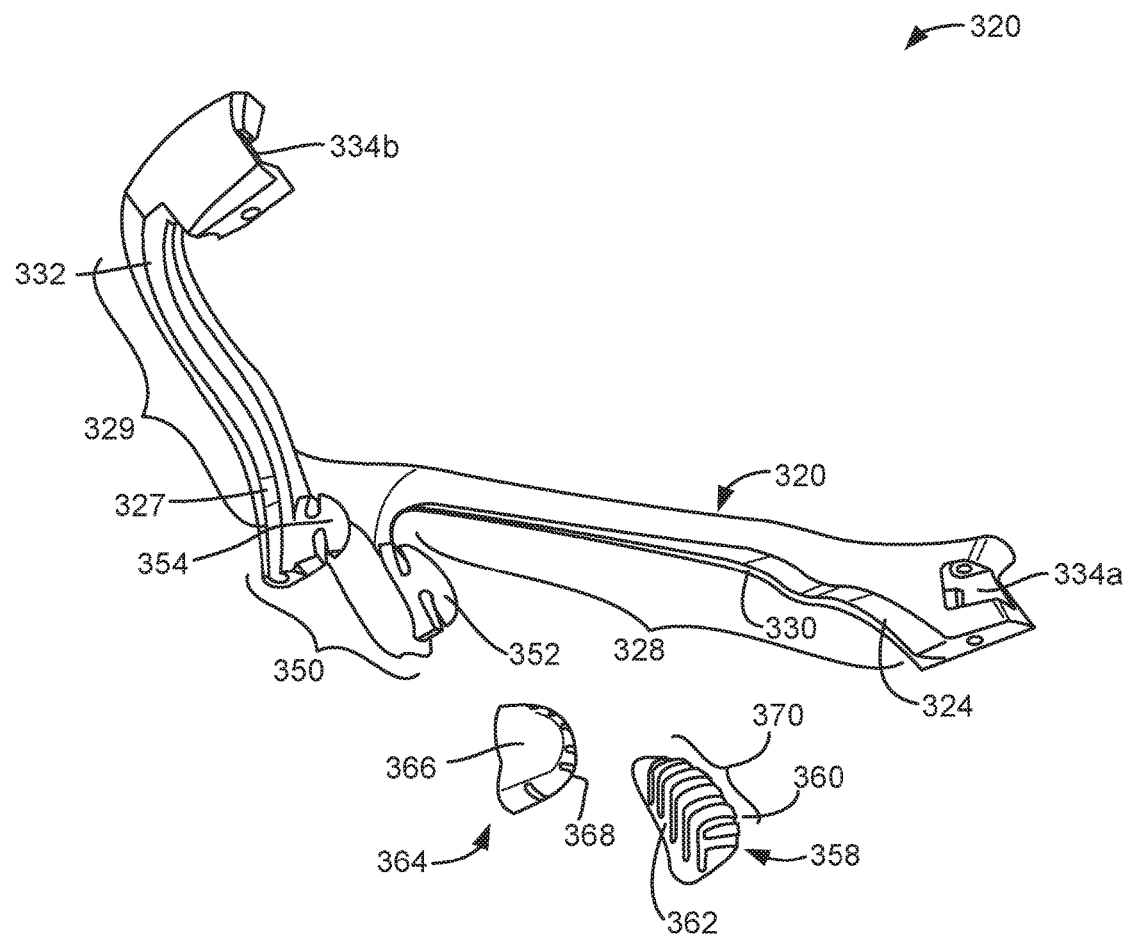
FIG. 16C is a perspective view (left rear, inferior) of the underside of the frame bridge of the semi-rimmed version of eyeglasses of FIG. 16A and the first and second textured nose pad inserts.
Figure 16D:
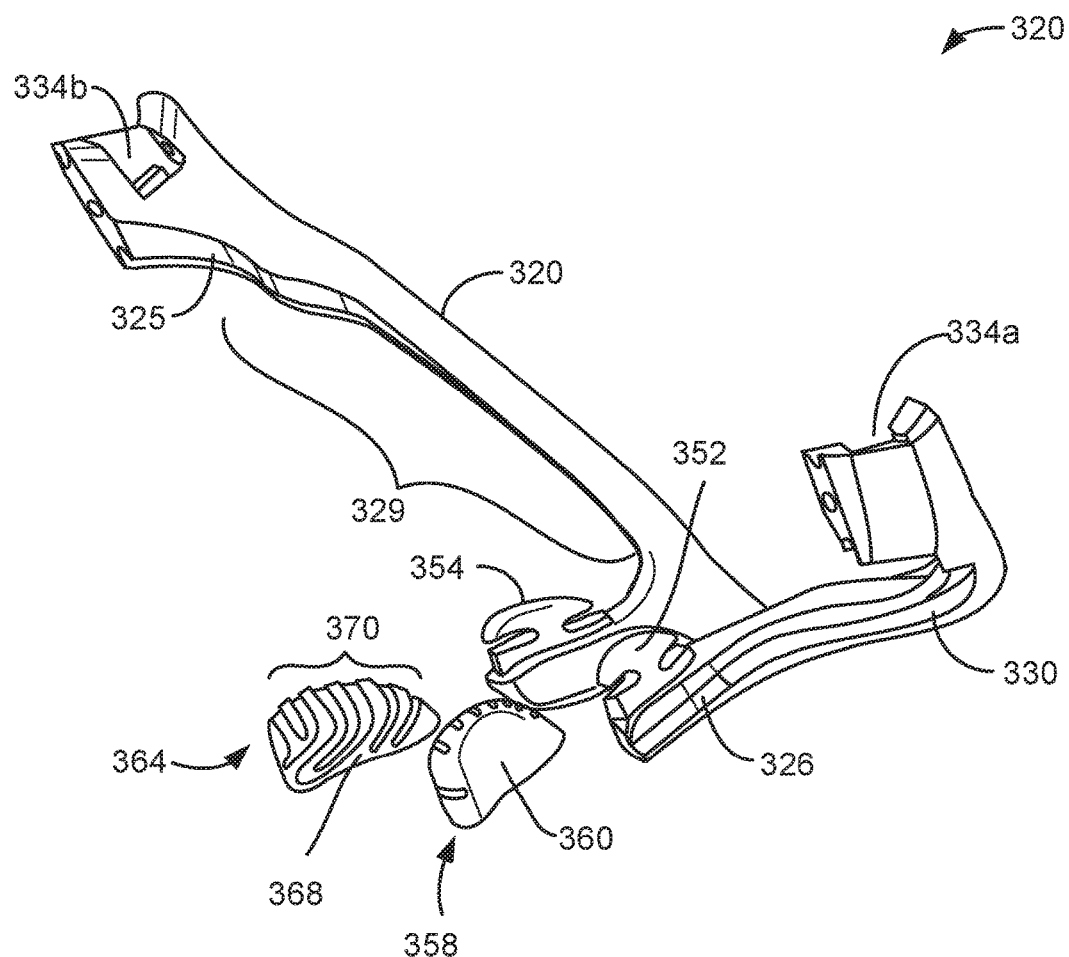
FIG. 16D is a perspective view (right rear, inferior) of the underside of the frame bridge of the semi-rimmed version of eyeglasses of FIG. 16A and the first and second textured nose pad inserts.
Figure 16E:
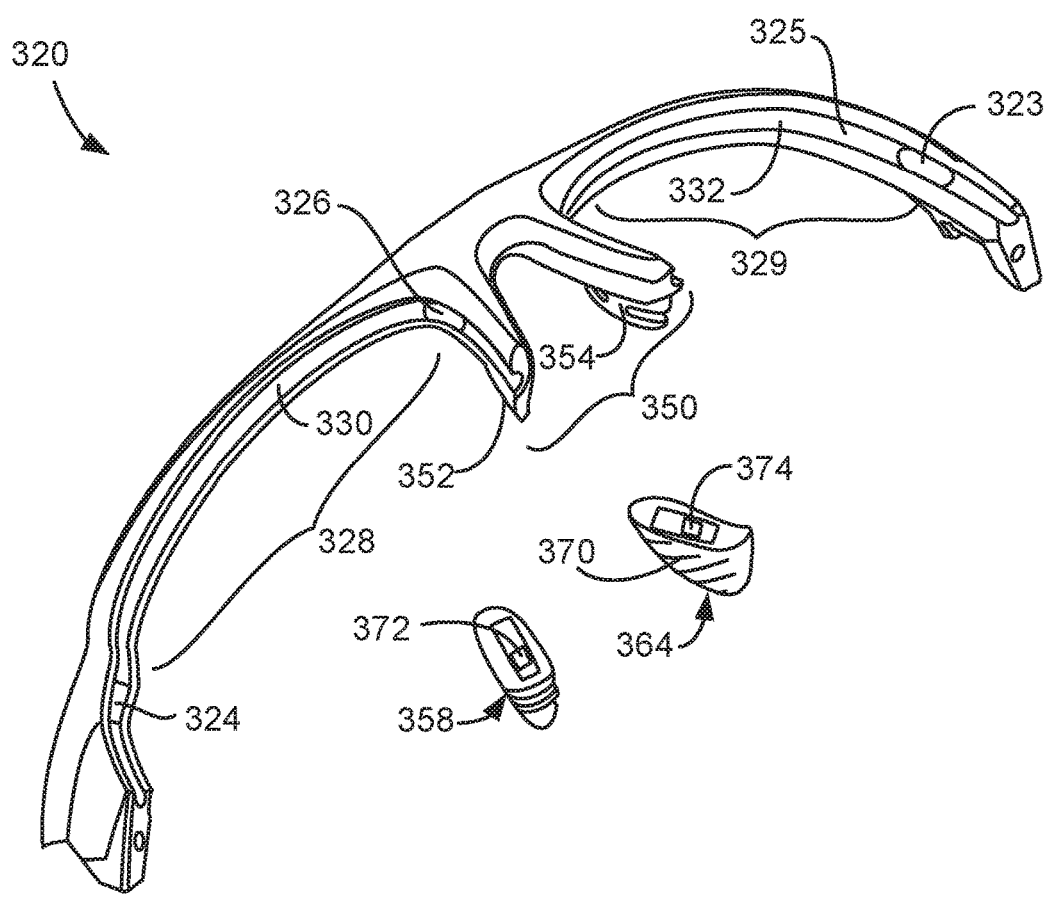
FIG. 16E is a perspective view (right front, inferior) of the underside of the frame bridge of the semi-rimmed version of eyeglasses of FIG. 16A with the integral nose bridge and the first and second textured nose pad inserts.

In some embodiments, the average width between the first retention step location 307 on the right of the eyeglasses and the second retention step location 317 location on the left of the eyeglasses (referred to as "width B2" herein, as shown in FIG. 16B) is about 130 mm. In some embodiments, width B2 is from about 120 mm to about 140 mm, from about 122 mm to about 138 mm, from about 124 mm to about 136 mm, from about 126 mm to about 134 mm, or from about 128 mm to about 132 mm. In some embodiments, width B2 is from 120 mm to 140 mm, from 122 mm to 138 mm, from 124 mm to 136 mm, from 126 mm to 134 mm, or from 128 mm to 132 mm. As used herein, the term "about" when referring to width B of a lens 101, 201 means variations of 1%, 2%, 3%, 4%, 5%, 6%, 7%, 8%, 9%, 10%, 11%, 12%, 13%, 14%, 15%, or 20%, depending on the embodiment.

Figure 22:
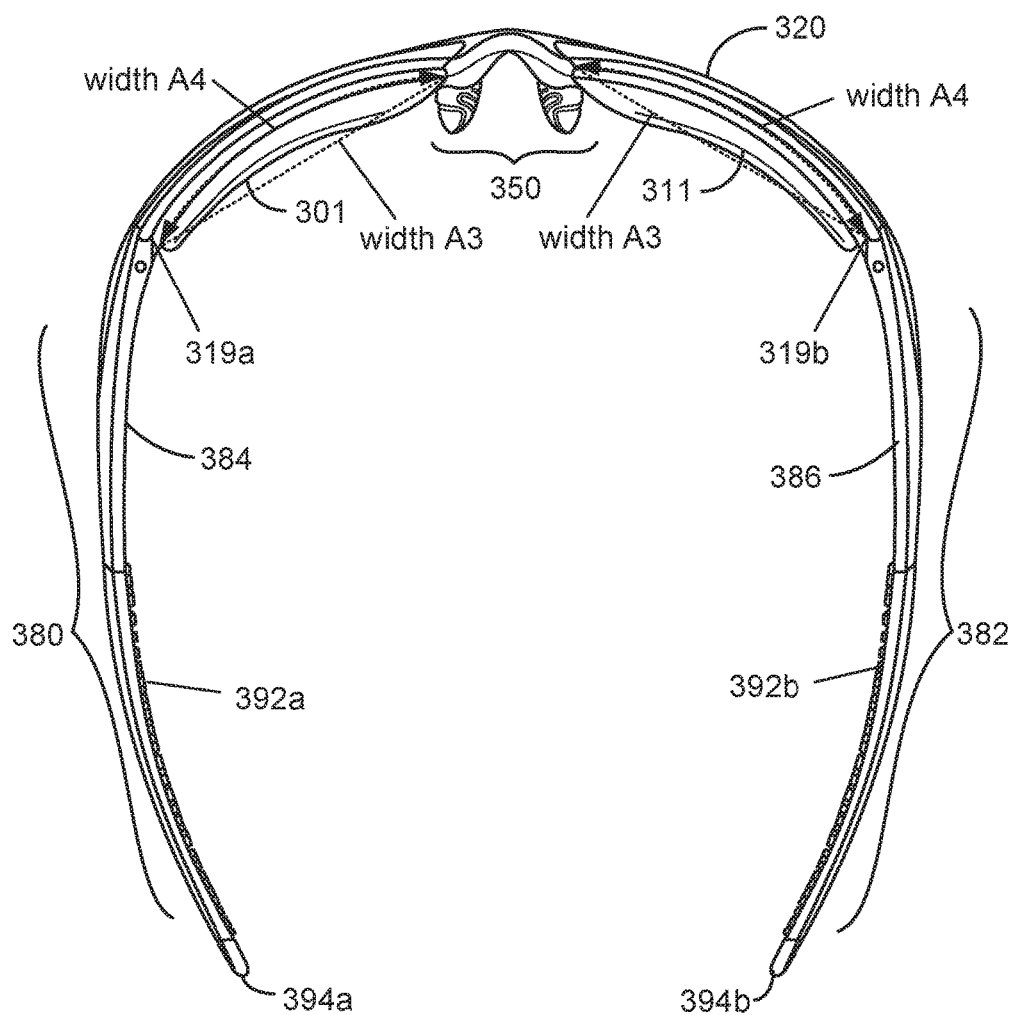
FIG. 22 is a bottom plan view of the eyeglasses of FIG. 16A.

In some embodiments, the average width of each finished lens of the semi-rimmed dual (or twin) lens design between the ends of the frame bridge 319a, 319b (where the lenses 301, 311, respectively, meet the bridge 320 on the right and left sides of the eyeglasses, respectively) and the nose bridge arm ends 356a, 356b, respectively, as measured as a straight line (referred to as "width A3" herein, as shown in FIG. 22), in some embodiments, and as measured along the lens (referred to as "width A4" herein, as shown in FIG. 22), in some embodiments, is about 71.5 mm. In some embodiments, the width A3 and/or width A4 of each lens is from about 63.0 mm to about 80.0 mm, from about 65.0 mm to about 78.0 mm, from about 67.0 mm to about 76.0 mm, from about 69.0 mm to about 74.0 mm, or from about 71.0 mm to about 72.0 mm. In some embodiments, the width A3 and/or width A4 of each lens is from 63.0 mm to 80.0 mm, from 65.0 mm to 78.0 mm, from 67.0 mm to 76.0 mm, from 69.0 mm to 74.0 mm, or from 71.0 mm to 72.0 mm. As used herein, the term "about" when referring to width A3 and width A4 of lens 301, or lens 311 means variations of 1%, 2%, 3%, 4%, 5%, 6%, 7%, 8%, 9%, 10%, 11%, 12%, 13%, 14%, 15%, or 20%, depending on the embodiment.

In some embodiments, the width of each finished lens of the semi-rimmed dual (or twin) lens design between the ends of the frame bridge 319a, 319b (where the lenses 301, 311, respectively, meet the bridge 320 on the right and left sides of the eyeglasses, respectively) and the nose bridge arm ends 356a, 356b, respectively, as measured as a straight line (referred to as "width A3" herein, as shown in FIG. 22), in some embodiments, as measured along the lens (referred to as "width A4" herein, as shown in FIG. 22), in some embodiments, is about 66.0 mm. In some embodiments, the width A3 and/or width A4 of each lens is from about 61.0 mm to about 81.0 mm, from about 62.0 mm to about 79.0 mm, from about 63.0 mm to about 77.0 mm, from about 64.0 mm to about 75.0 mm, or from about 65.0 mm to about 73.0 mm. In some embodiments, the width A3 and/or width A4 of each lens is from 61.0 mm to 81.0 mm, from 62.0 mm to 79.0 mm, from 63.0 mm to 77.0 mm, from 64.0 mm to 75.0 mm, or from 65.0 mm to 73.0 mm. As used herein, the term "about" when referring to width A3 and width A4 of lens 301, or lens 311 means variations of 1%, 2%, 3%, 4%, 5%, 6%, 7%, 8%, 9%, 10%, 11%, 12%, 13%, 14%, 15%, or 20%, depending on the embodiment.

In some embodiments, the first lens 301 or the second lens 311 or both comprise spherical base curves.

In some embodiments, the first lens 301 or the second lens 311 or both comprise a vertical base curve and a different horizontal base curve.

In some embodiments, the first lens 301 or the second lens 311 or both comprise a spherical base curve and the second lens 311 comprises a vertical base curve and a different horizontal base curve.

In some embodiments, the first lens 301 or the second lens 311 comprise a spherical base curve and the other lens of the first lens 301 or the second lens 311 comprises a vertical base curve and a different horizontal base curve.

In some embodiments of the dual lens, or alternately twin lens design, the variable shapes include different radii of curvature of the lens.

In some embodiments of the dual lens, or alternately twin lens design, the radius of curvature is a spherical curvature having a radius of curvature of about 8.0 Base.

In some embodiments, the radius of curvature is from about 2.0 Base, from about 2.5 Base, from about 3.0 Base, from about 3.5 Base, from about 4.0 Base, from about 4.5 Base, from about 5.0 Base, from about 5.5 Base, from about 6.0 Base, from about 6.5 Base, from about 7.0 Base, from about 7.5 Base, from about 8.0 Base, from about 8.5 Base, from about 9.0 Base, from about 9.5 Base, from about 10.0 Base, from about 10.5 Base, or from about 11.0 Base.

In some embodiments, the radius of curvature is about 7.0 Base Curve (referred to as "Base" elsewhere herein) in the horizontal direction by 4.0 Base Curve (referred to as "Base" elsewhere herein) in the vertical direction relative to a wearer's eye.

In some embodiments, the radius of curvature is about 7.0 Base Curve (referred to as "Base" elsewhere herein) in the horizontal direction by x0.0 Base Curve (referred to as "Base" elsewhere herein) in the vertical direction relative to a wearer's eye.

In some embodiments, the radii of curvature in the horizontal and/or vertical direction relative to the wearer's eye is from about 3.0 Base to about 8.0 Base, from about 3.5 Base to about 7.5 Base, from about 4.0 Base to about 7.0 Base, from about 4.5 Base to about 6.5 Base, from about 5.0 Base to about 6.0 Base, from about 5.5 Base to about 5.5 Base, from about 6.0 Base to about 5.0 Base, from about 6.5 Base to about 4.5 Base, from about 7.0 Base to about 4.0 Base, from about 7.5 Base to about 3.5 Base, from about 8.0 Base to about 3.0 Base, from about 8.5 Base to about 2.5 Base, from about 9.0 Base to about 2.0 Base, from about 9.5 Base to about 1.5 Base, from about 10.0 Base to about 1.0 Base, from about 10.5 Base to about 0.5 Base, or from about 11.0 Base to about 0.0 Base. In some embodiments, the radii of curvature in the horizontal and/or vertical direction relative to the wearer's eye is from 3.0 Base to 8.0 Base, from 3.5 Base to 7.5 Base, from 4.0 Base to 7.0 Base, from 4.5 Base to 6.5 Base, from 5.0 Base to 6.0 Base, from 5.5 Base to 5.5 Base, from 6.0 Base to 5.0 Base, from 6.5 Base to 4.5 Base, from 7.0 Base to 4.0 Base, from 7.5 Base to 3.5 Base, from 8.0 Base to 3.0 Base, from 8.5 Base to 2.5 Base, from 9.0 Base to 2.0 Base, from 9.5 Base to 1.5 Base, from 10.0 Base to 1.0 Base, from 10.5 Base to 0.5 Base, or from 11.0 Base to 0.0 Base. As used herein, the term "about" when referring to Base or Base Curve means variations of 1%, 2%, 3%, 4%, 5%, 6%, 7%, 8%, 9%, 10%, 11%, 12%, 13%, 14%, 15%, or 20%, depending on the embodiment.

In some embodiments of the dual lens, or alternately called the twin lens design, the variable shapes of the frames include different radii of curvature, as well. In some embodiments, the radius of curvature of the frame is about 8.0 Base (Horizontal). In some embodiments, the radius of curvature of the frame is about 6.0 Base (Horizontal). In some embodiments, the radius of curvature of the frame is about 4.0 Base (Horizontal). In still other embodiments, the radius of curvature of the frame is about 10.0 Base (Horizontal). As used herein, the term "about" when referring to Base or Base Curve means variations of 1%, 2%, 3%, 4%, 5%, 6%, 7%, 8%, 9%, 10%, 11%, 12%, 13%, 14%, 15%, or 20%, depending on the embodiment.

In some embodiments of the dual lens, or alternately twin lens design, different radii of curvature for the frame are desired to accommodate different head shapes for various age, gender and ethnic wearers.

In some embodiments, the radius of curvature of the frame is from about 11.0 Base to about 0.0 Base, from about 11.0 Base to about 1.0 Base, from about 11.0 Base to about 2.0 Base, from about 11.0 Base to about 3.0 Base, from about 11.0 Base to about 4.0 Base, from about 11.0 Base to about 5.0 Base, from about 11.0 Base to about 6.0 Base, from about 11.0 Base to about 7.0 Base, from about 10.0 Base to about 0.0 Base, from about 10.0 Base to about 1.0 Base, from about 10.0 Base to about 2.0 Base, from about 10.0 Base to about 3.0 Base, from about 10.0 Base to about 4.0 Base, from about 10.0 Base to about 5.0 Base, from about 10.0 Base to about 6.0 Base, from about 10.0 Base to about 7.0 Base, from about 9.0 Base to about 0.0 Base, from about 9.0 Base to about 1.0 Base, from about 9.0 Base to about 2.0 Base, from about 9.0 Base to about 3.0 Base, from about 9.0 Base to about 4.0 Base, from about 9.0 Base to about 5.0 Base, from about 9.0 Base to about 6.0 Base, from about 9.0 Base to about 7.0 Base, from about 8.0 Base to about 0.0 Base, from about 8.0 Base to about 1.0 Base, from about 8.0 Base to about 2.0 Base, from about 8.0 Base to about 3.0 Base, from about 8.0 Base to about 4.0 Base, from about 8.0 Base to about 5.0 Base, 8.0 Base to about 6.0 Base, or from about 8.0 Base to about 7.0 Base. In some embodiments, the radius of curvature of the frame is from 11.0 Base to 0.0 Base, from 11.0 Base to 1.0 Base, from 11.0 Base to 2.0 Base, from 11.0 Base to 3.0 Base, from 11.0 Base to 4.0 Base, from 11.0 Base to 5.0 Base, from 11.0 Base to 6.0 Base, from 11.0 Base to 7.0 Base, from 10.0 Base to 0.0 Base, from 10.0 Base to 1.0 Base, from 10.0 Base to 2.0 Base, from 10.0 Base to 3.0 Base, from 10.0 Base to 4.0 Base, from 10.0 Base to 5.0 Base, from 10.0 Base to 6.0 Base, from 10.0 Base to 7.0 Base, from 9.0 Base to 0.0 Base, from 9.0 Base to 1.0 Base, from 9.0 Base to 2.0 Base, from 9.0 Base to 3.0 Base, from 9.0 Base to 4.0 Base, from 9.0 Base to 5.0 Base, from 9.0 Base to 6.0 Base, from 9.0 Base to 7.0 Base, from 8.0 Base to 0.0 Base, from 8.0 Base to 1.0 Base, from 8.0 Base to 2.0 Base, from 8.0 Base to 3.0 Base, from 8.0 Base to 4.0 Base, from 8.0 Base to 5.0 Base, 8.0 Base to 6.0 Base, or from 8.0 Base to 7.0 Base. As used herein, the term "about" when referring to Base or Base Curve means variations of 1%, 2%, 3%, 4%, 5%, 6%, 7%, 8%, 9%, 10%, 11%, 12%, 13%, 14%, 15%, or 20%, depending on the embodiment.

In some embodiments, the average height (referred to as "height D" herein and illustrated in FIG. 16B) from the first lens proximal edge 302 or the second lens proximal edge 312 to the first lens inferior edge 305 or the second lens inferior edge 315, respectively, of first lens 301 or second lens 311, respectively, as measured along the individual lens perpendicularly from a tangent line at any location along the proximal edge includes an average dimension from about 40.0 mm to about 42.5 mm. In some embodiments, height D of each lens is from about 38.0 mm to about 42.0 mm, or from about 39.0 mm to about 41.0 mm. In some embodiments, height D of each lens is from 38.0 mm to 42.0 mm, or from 39.0 mm to 41.0 mm. Alternately, in some embodiments, height D of each lens is from about 35.0 mm to about 50.0 mm, from about 37.0 mm to about 48.0 mm, from about 39.0 mm to about 46.0 mm, or from about 41.0 mm to about 44.0 mm. In some embodiments, height D of each lens is from 35.0 mm to 50.0 mm, from 37.0 mm to 48.0 mm, from 39.0 mm to 46.0 mm, or from 41.0 mm to 44.0 mm. As used herein, the term "about" when referring to height D of a lens 301, and/or 311 means variations of 1%, 2%, 3%, 4%, 5%, 6%, 7%, 8%, 9%, 10%, 11%, 12%, 13%, 14%, 15%, or 20%, depending on the embodiment.

Figure 17:
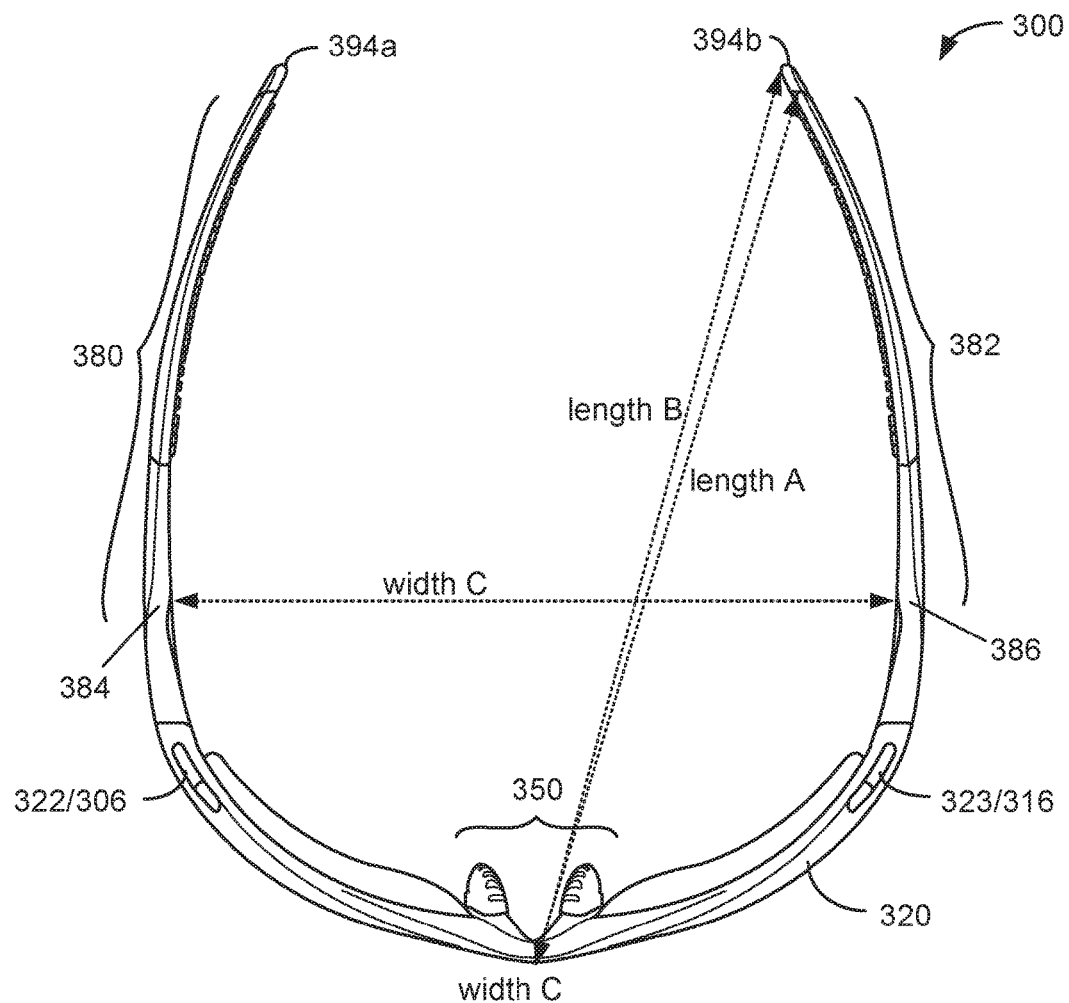
FIG. 17 is a top plan view of the eyeglasses of FIG. 16A.
Figure 18A:
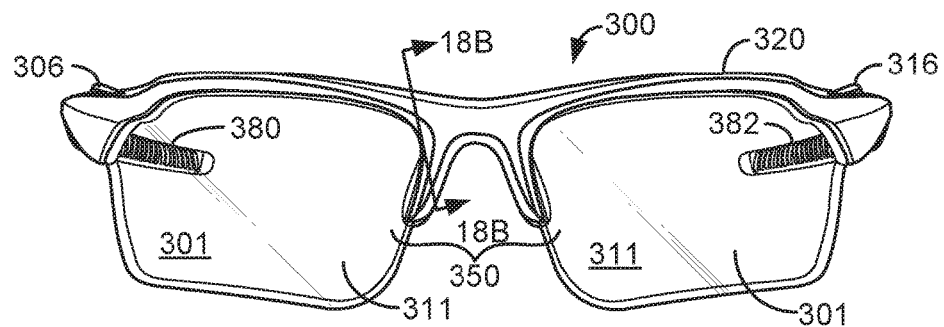
FIG. 18A is a front elevation view of the eyeglasses of FIG. 16A.
Figure 18B:
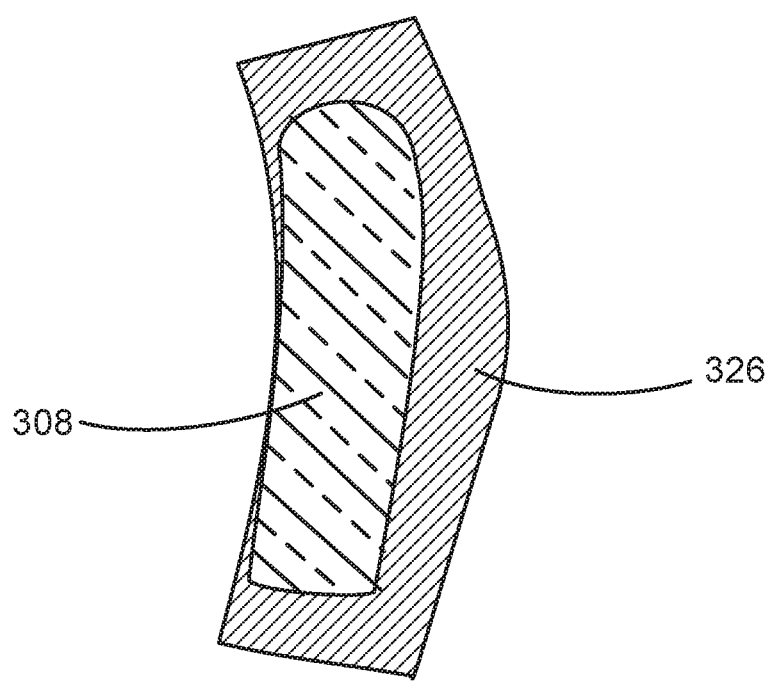
FIG. 18B is a section view of the connecting interface between the lens hook and the nose bridge lens hook receptacle for a dual lens version of eyeglasses with interchangeable lenses shown in FIG. 18A.
Figure 19:
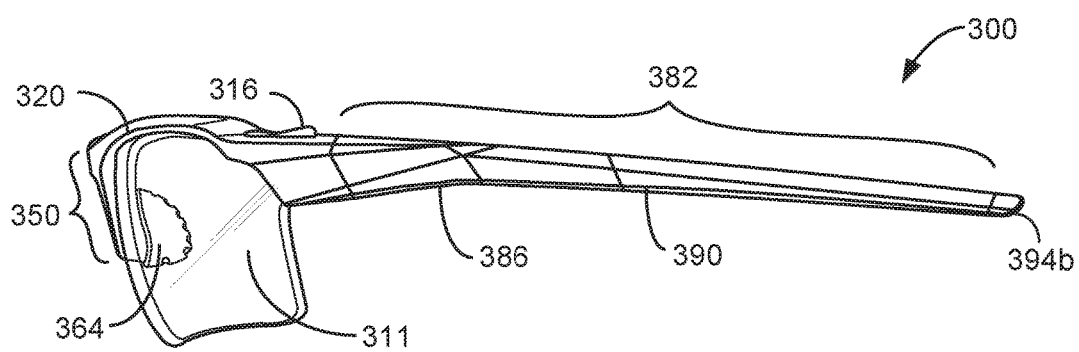
FIG. 19 is a left side elevation view of the eyeglasses of FIG. 16A.
Figure 20:
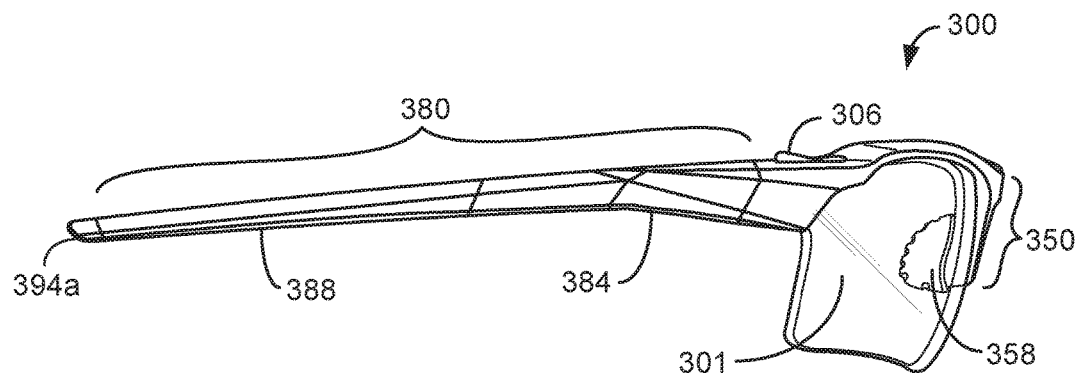
FIG. 20 is a right side elevation view of the eyeglasses of FIG. 16A.
Figure 21:
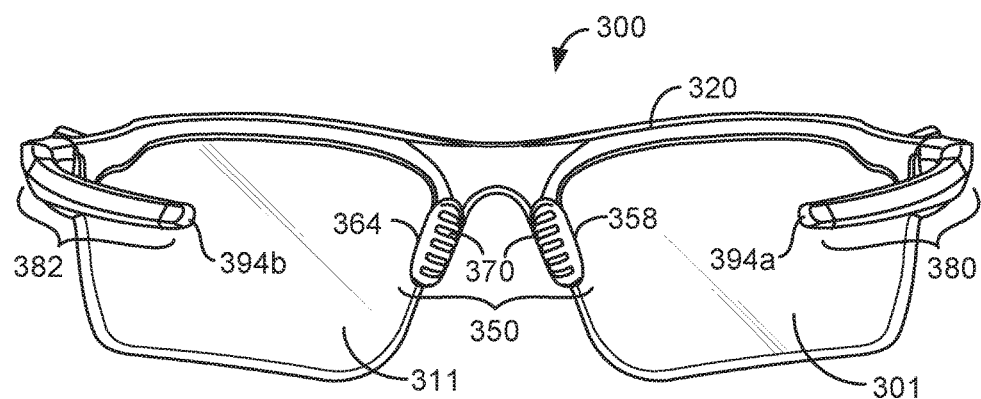
FIG. 21 is a rear elevation view of the eyeglasses of FIG. 16A.

In some embodiments, the average width (referred to "width C" herein, as shown in FIG. 17) of the eyeglasses of the semi-rimmed dual lens design, from the first temple hinge leaf 384 to the second temple hinge leaf 386, is about 135 mm or is 135 mm. In some embodiments, width C is from about 127.0 mm to about 143.0 mm, from about 129.0 mm to about 141.0 mm, from about 131.0 mm to about 139.0 mm, or from about 133.0 mm to about 137.0 mm. In some embodiments, width C is from 127.0 mm to 143.0 mm, from 129.0 mm to 141.0 mm, from 131.0 mm to 139.0 mm, or from 133.0 mm to 137.0 mm. As used herein, the term "about" when referring to width C of the eyeglasses means variations of 1%, 2%, 3%, 4%, 5%, 6%, 7%, 8%, 9%, 10%, 11%, 12%, 13%, 14%, 15%, or 20%, depending on the embodiment.

In some embodiments, the average length of the eyeglasses of the semi-rimmed dual lens design from an anterior aspect of the at the apex 336 of the frame bridge 320 to the posterior end of either of temple extensions 388, 390 when fully opened ready for wearing (referred to "length A" herein, as shown in FIG. 17) is from about 170 mm to about 175 mm. In some embodiments, length A is from about 170.0 mm to about 180.0 mm, from about 172.0 mm to about 178.0 mm, or from about 174.0 mm to about 176.0 mm. In some embodiments, length A is from 170.0 mm to 180.0 mm, from 172.0 mm to 178.0 mm, or from 174.0 mm to 176.0 mm. Alternately, in some embodiments, length A is from about 155.0 mm to about 185.0 mm, from about 157.0 mm to about 183.0 mm, from about 159.0 mm to about 181.0 mm, from about 161.0 mm to about 179.0 mm, from about 163.0 mm to about 177.0 mm, from about 165.0 mm to about 175.0 mm, from about 167.0 mm to about 173.0 mm, or from about 169.0 mm to about 171.0 mm. In some embodiments, length A is from 155.0 mm to 185.0 mm, from 157.0 mm to 183.0 mm, from 159.0 mm to 181.0 mm, from 161.0 mm to 179.0 mm, from 163.0 mm to 177.0 mm, from 165.0 mm to 175.0 mm, from 167.0 mm to 173.0 mm, or from 169.0 mm to 171.0 mm. As used herein, the term "about" when referring to length A of the eyeglasses means variations of 1%, 2%, 3%, 4%, 5%, 6%, 7%, 8%, 9%, 10%, 11%, 12%, 13%, 14%, 15%, or 20%, depending on the embodiment.

In some embodiments, the average length of the eyeglasses of the semi-rimmed dual lens design from an anterior aspect of the at the apex 336 of the frame bridge 320 to the posterior end of either of end caps 394a, 394b when fully opened ready for wearing (referred to "length B" herein, as shown in FIG. 17) is from about 170.0 mm, to about 175.0 mm. In some embodiments, length B is from about 165.0 mm to about 175.0 mm, from about 167.0 mm to about 173.0 mm, or from about 169.0 mm to about 171.0 mm. In some embodiments, length B is from 165.0 mm to 175.0 mm, from 167.0 mm to 173.0 mm, or from 169.0 mm to 171.0 mm. Alternatively, in some embodiments, length B is from about 160.0 mm to about 190.0 mm, from about 162.0 mm to about 188.0 mm, from about 164.0 mm to about 186.0 mm, from about 166.0 mm to about 184.0 mm, from about 168.0 mm to about 182.0 mm, from about 170.0 mm to about 180.0 mm, from about 172.0 mm to about 178.0 mm, or from about 174.0 mm to about 176.0 mm. In some embodiments, length B is from 160.0 mm to 190.0 mm, from 162.0 mm to 188.0 mm, from 164.0 mm to 186.0 mm, from 166.0 mm to 184.0 mm, from 168.0 mm to 182.0 mm, from 170.0 mm to 180.0 mm, from 172.0 mm to 178.0 mm, or from 174.0 mm to 176.0 mm. As used herein, the term "about" when referring to length B of the eyeglasses means variations of 1%, 2%, 3%, 4%, 5%, 6%, 7%, 8%, 9%, 10%, 11%, 12%, 13%, 14%, 15%, or 20%, depending on the embodiment.

Future iterations of this embodiment will comprise additional variable height and width lenses 301a/b-311a/b, at least. Future iterations of this embodiment will comprise additional variable height and width lenses, as well as prescription lenses and all of the myriad treatments and coatings previously described.

Figure 28:
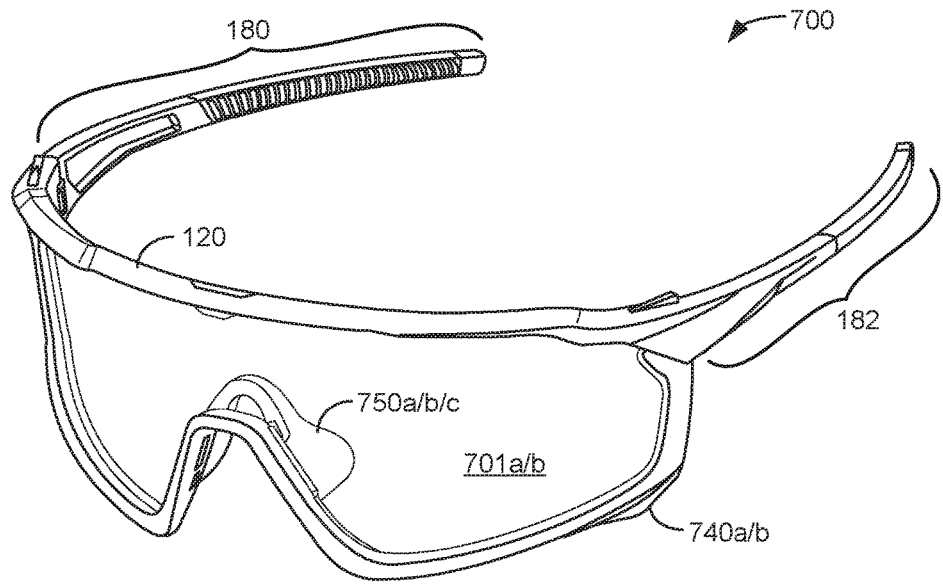
FIG. 28 is an illustrative front ISO view of one embodiment of a rimmed version of eyeglasses with an interchangeable single lens, and interchangeable inferior rocker frame.
Figure 29A:
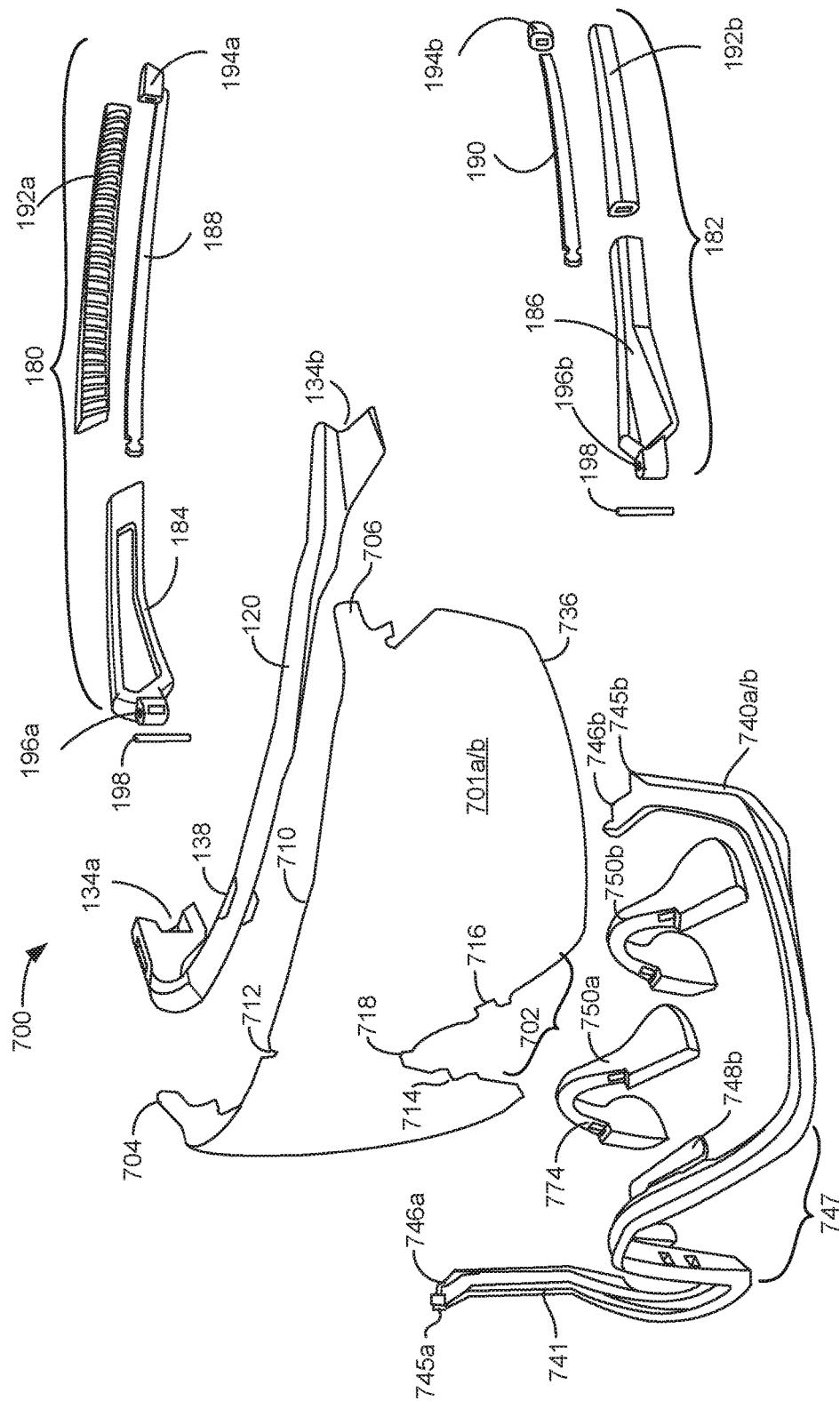
FIG. 29A is an illustrative exploded view of the rimmed version of eyeglasses with a bridge frame, an interchangeable single lens, and interchangeable inferior rocker frame.
Figure 29E:
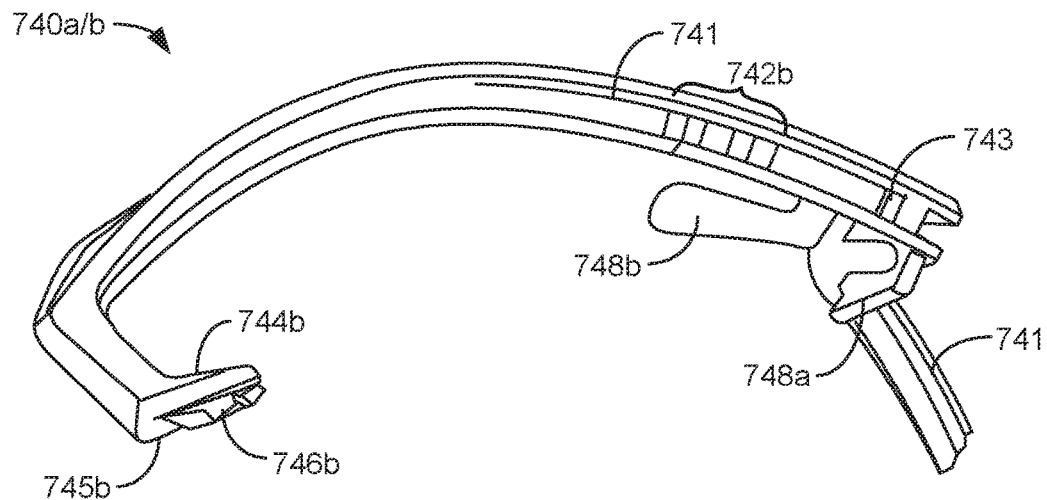
FIG. 29E is an illustrated detail view of some of the detail features of the inferior rocker frame of the eyeglasses of FIG. 29A.
Figure 29F:
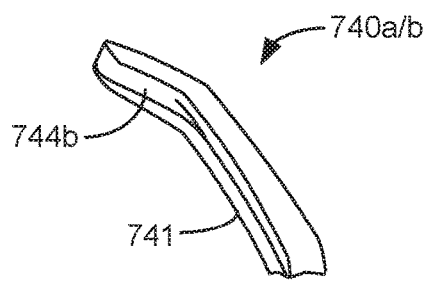
FIG. 29F is a detail view of the lens capture connection feature of the inferior rocker frame of FIG. 29E.
Figure 29G:
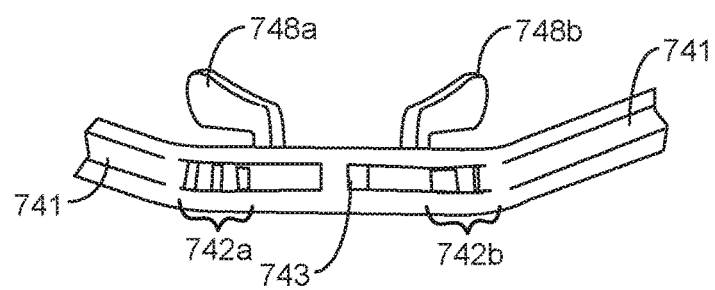
FIG. 29G is a detail view of the central notch lens capture connection features and nose paddles of the inferior rocker frame of FIG. 29E.

Provided herein is an eyeglass assembly 700, as illustrated in FIGS. 28-29G, comprising: a frame bridge 120, (similar to the (SR) Eyeglasses Assembly, 100, described previously) having a first end and a second end, the first end comprising a first lens tab thru-hole 122, a first lens retention step receiver 126, and the second end comprising a second lens tab thru-hole 124 and a second lens retention step receiver 128; a single lens configuration 701a/b having at least two sizes of lens, comprising; a central notched region 702 configured to generally accommodate the shape of a bridge of a nose of a wearer; a first lens tab 704, a first lens retention step 705a and a first rocker notch 703a; a second lens tab 706, a second lens retention step 705b and a second rocker notch 703b; and further comprising: at least two sizes of rocker frame 740a/b having a third end 745a and a fourth end 745b, the rocker frame comprising a generally rounded "w" shape 747 configured to support inferior edges 736, side edges and the central notched region 702 of the single lens 701a/b, a first rocker notch receiver 744a, near the third end 745a and a second rocker notch receiver 744b, near the fourth end 745b; wherein the first lens tab 704 and the first lens retention step 705a are configured to releasably insert into the first lens tab thru-hole 122 and the first lens retention step receiver 126, respectively, of the frame bridge such that the first lens tab 704 or a portion thereof protrudes through the first lens tab thru-hole 122, the second lens tab 706 and the second lens retention step 705b are configured to releasably insert into the second lens tab thru-hole 124 and the second lens retention step receiver 128 of the frame bridge, respectively, such that the second lens tab 706 or a portion thereof protrudes through the second lens tab thru-hole 124, the first rocker notch receiver 744a near the third end of the rocker frame 745a is affixed to the first rocker notch 703a of the single lens 701a/b, and the third end 745a of the rocker frame 740a/b is configured to blendedly align with the inferior edge of the frame bridge 120 near the first end and the first lens retention step 705a; whereas the second rocker notch receiver 744b near the fourth end 745b of the rocker frame 740a/b is affixed to the second rocker notch 703b of the single lens 701a/b, and the fourth end of the rocker frame 745b is configured to blendedly align with the inferior edge of the frame bridge near the second end and the second lens retention step 705b.

In some embodiments, the frame bridge 120 further comprises a groove 130 correspondingly sized and shaped to match and to receive a proximal edge 710 of the single lens 701a/b, or a portion thereof.

In some embodiments, the rocker frame 740a/b further comprises a groove 741, correspondingly sized and shaped to match and to receive the inferior edges 736, side edges and central notched region 702 of the single lens 701a/b, or a portion thereof. In some embodiments, the rocker frame 740a/b further comprises a pair of permanently affixed nose paddles 748a/b protruding posteriorly from a middle inverted "v" region 747 of the rounded "w" shape of the rocker frame, the middle inverted "v" region 747 configured to generally accommodate the shape of the bridge of the nose of the wearer and configured to releasably attach at or about the central notched region 702 of the single lens 701a/b.

In some embodiments, the frame bridge 120 further comprises a protrusion 132 in the groove 130 configured to align with a mating indention 712 along the proximal edge 710 in the lens 701a/b.

In some embodiments, the single lens 701a/b, further comprises an indent 712 along the proximal edge configured to align with the protrusion 132 in the groove 130 of the frame bridge 120 to centralize the lens 701a/b within the frame bridge 120.

In some embodiments, the middle inverted "v" region 747 of the frame bridge further comprises: at least one first lens attachment feature 742*a/b*, 743, wherein the at least one first lens attachment feature comprises; an indent, a groove, a slot, a bump, a protrusion or a combination thereof.

In some embodiments, the pair of permanently affixed nose paddles 748*a/b* is configurable to accept a set of nose pads 750*a/b/c* connected by a flexible pad linker arch 763 also configured to generally accommodate the shape of the bridge of the nose of the wearer, wherein each nose pad 758,764, in the set of nose pads 750*a/b/c* comprises a pocket 774*a/b* configured to receive one of the nose paddles.

In some embodiments, the central notched region 702 of the single lens 701*a/b* comprises a first lateral attachment feature 714 and a second lateral attachment feature 716 configured to releasably attach to at least a portion of a middle inverted "v" region 747 of the rounded "w" shape of the rocker frame in the at least one first lens attachment feature 742*a/b*. In some embodiments, the central notched region 702 of the single lens further comprises a proximal attachment feature 718 configured to releasably attach to a proximal portion, 743, of a middle inverted "v" region 747 of the rounded "w" shape of the rocker frame.

It is also noted that the central notched region 702 of the eyeglass assembly 700, as illustrated in FIGS. 28-29G, will also accept the coupler portion 154, 254 and the pad linker arch 156, 256 of the molded split nose bridge insert 150, 250, such as illustrated in FIG. 15C in lieu of the rocker frame 740*a/b*.

In some embodiments, the set of nose pads 750*a/b/c* connected by the flexible pad linker arch 763 comprises a plurality of sizes or shapes configured to conform to a plurality of nose shapes and sizes of the wearer. In some embodiments, the set of nose pads 750 *a/b/c* connected by the flexible pad linker arch 763 are releasably detachable from the pair of permanently affixed nose paddles 748*a/b*. In some embodiments, the set of nose pads 750*a/b/c*, connected by the flexible pad linker arch 763, comprises a plurality of sizes or shapes (sizes 1-3, at least), configured to conform to a plurality of nose shapes and sizes of the wearer. In some embodiments, the set of nose pads further comprise: a first nose pad 758 with a first lateral side 760 and a first medial side 762, and a second nose pad 764 with a second medial side 768 and second lateral side 766 extending therefrom; wherein the first medial side 762 of the first nose pad 758 and the second medial side 768 of the second nose pad 764 are configured to rest on lateral cartilages, lesser alar cartilages, supra alar creases, or dense connective tissue above the nostrils of the wearer, or a combination thereof.

In some embodiments, the set of nose pads 750*a/b/c* connected by the flexible pad linker arch 763 and nose paddles 748*a/b* are a single component. In some embodiments, the set of nose pads 750*a/b/c* connected by the flexible pad linker arch 763 and nose paddles 748*a/b* are an assembly comprising two or more components.

In some embodiments, the first medial side 762 of the first nose pad 758 and the second medial side 768 of the second nose pad 764 further comprise a textured gripping surface 770.

In some embodiments, the eyeglass assembly 700 further comprises: a first temple arm 180 having a first temple leaf and a first temple extension; a second temple arm 182, with a second temple leaf and a second temple extension (similar to the $1^{st}$ and $2^{nd}$ temple arms of the SR version eyeglasses, as described previously); wherein the first temple leaf 184 is configured for attachment to a first end of the frame bridge 120 at or about a frame bridge knuckle feature or hinge recess 134*a* through a first temple arm knuckle 196*a* with a first hinge pin 198, wherein the first temple extension 188 is configurable to generally conform to a lateral shape of a wearer's head, extending over the proximal portion of a wearer's first ear between a first auricle of the first ear and a wearer's skull, wherein the second temple leaf 186 is configured for attachment to a second end of the frame bridge at or about a frame bridge knuckle feature or hinge recess 134*b* through a second temple arm knuckle 196*b* with a second hinge pin 198, and wherein the second temple extension 190 is configurable to generally conform to a lateral shape of a wearer's head, extending over the proximal portion of a wearer's second ear between a second auricle of the second ear and the wearer's skull. In some embodiments, the first temple extension, and the second temple extension each further comprise a textured gripping surface 192. In some embodiments, the eyeglass assembly further comprises: a first temple extension textured gripping surface 192*a*, and a second temple extension textured gripping surface 192*b*; wherein the first temple extension textured gripping surface 192*a* is configured for insertion onto, over, or surrounding the first temple extension 188, and wherein the second temple extension textured gripping surface 192*b* is configured for insertion onto, over, or surrounding the second temple extension 190. In some embodiments, textured gripping surfaces comprise molded (TPE) thermoplastic elastomer.

Again, similar to the temple arms described for the SR version eyeglasses (100), in some embodiments, the eyeglass assembly 700 further comprises: a first temple extension end cap 194*a*; and a second temple extension end cap 194*b*. In some embodiments of the eyeglass assembly, the frame bridge 120, the first temple arm 180, and the second temple arm 182 are a multi-part assembly. In some embodiments, the multi-part assembly comprises: a first knuckle; and a second knuckle; wherein the first knuckle and the second knuckle are further assembled to the frame bridge with mating compressing joint assemblies, hinge pins, or a combination thereof. In some embodiments, the eyeglass assembly 700 further comprises: a first temple extension textured gripping surface, and a second temple extension textured gripping surface; wherein the first temple extension textured gripping surface is configured for insertion onto, over, or surrounding the first temple extension, and wherein the second temple extension textured gripping surface is configured for insertion onto, over, or surrounding the second temple extension. In some embodiments, textured gripping surfaces comprise molded (TPE) thermoplastic elastomer.

Again, similar to the temple arms described for the SR version eyeglasses (100), in some embodiments, the eyeglass assembly 700 further comprises: a first temple extension end cap; and a second temple extension end cap.

In some embodiments, the single lens, 701, is provided in more than one size 701*a*, 701*b*, at least. In some embodiments, the single lens is provided in two or more heights. In some embodiments, the single lens is configurable to extend approximately 2 mm to approximately 10 mm higher above the eyebrows of the wearer than a standard height lens, as described for the SR version eyeglasses (100). In some embodiments, the single lens is configurable to extend approximately 2 mm to approximately 10 mm lower below the eyes of the wearer than a standard height lens, as described for the SR version eyeglasses (100), to approximately the cheekbone. In some embodiments, the single lens is configured to extend both higher above the eyebrows of the wearer than a standard height lens and extend lower below the eyes of the wearer than a standard height lens within an overall range of approximately 2 mm to approximately 10 mm.

In some embodiments of the eyeglass assembly 700 comprising a rocker frame, the rocker frame 740 is configured in two or more sizes 740*a*, 740*b*, at least, to accommodate lenses being provided in two or more sizes 701, 701*b*, at least.

In some embodiments, the single lens 701*a/b* is configurable to accommodate a corrective lens prescription for a left eye only, a right eye only, or both left and right eye. In some embodiments, the single lens is configurable to accommodate: an anti-reflective treatment; a photochromic treatment; a polarized treatment; a tinting treatment; a scratch resistant treatment; a mirroring treatment; an anti-fogging treatment; a hydro-phobic treatment; an oleo-phobic treatment or a combination thereof.

As with each of the eyeglass versions previously described, in some embodiments of the eyeglass assembly 700, the first temple extension and the second temple extension comprise a core metal substrate. In some embodiments, the core metal substrate comprises titanium. In some embodiments, the first temple extension comprising the core metal substrate and the second temple extension comprising the core metal substrate are molded sub-assemblies. In some embodiments, the core metal substrate of the molded sub-assemblies further comprises a removably replaceable molded polymeric textured surface. In some embodiments, the molded polymeric textured surfaces comprise molded (TPE) thermoplastic elastomer.

Figure 31:
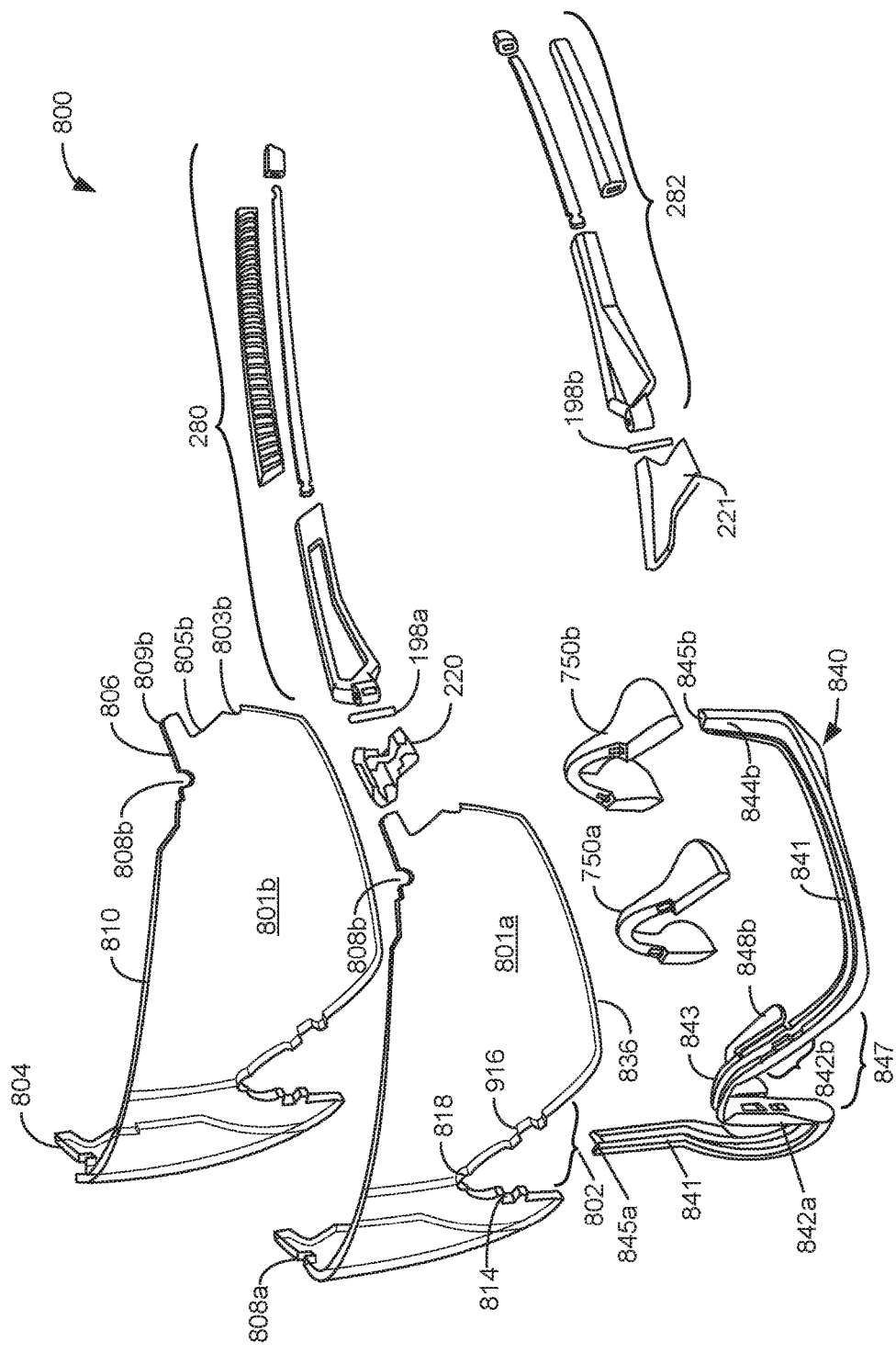
FIG. 31 is an illustrative exploded view of the version of eyeglasses with an interchangeable single lens, and interchangeable inferior rocker frame of FIG. 30A.
Figures 32, 33:
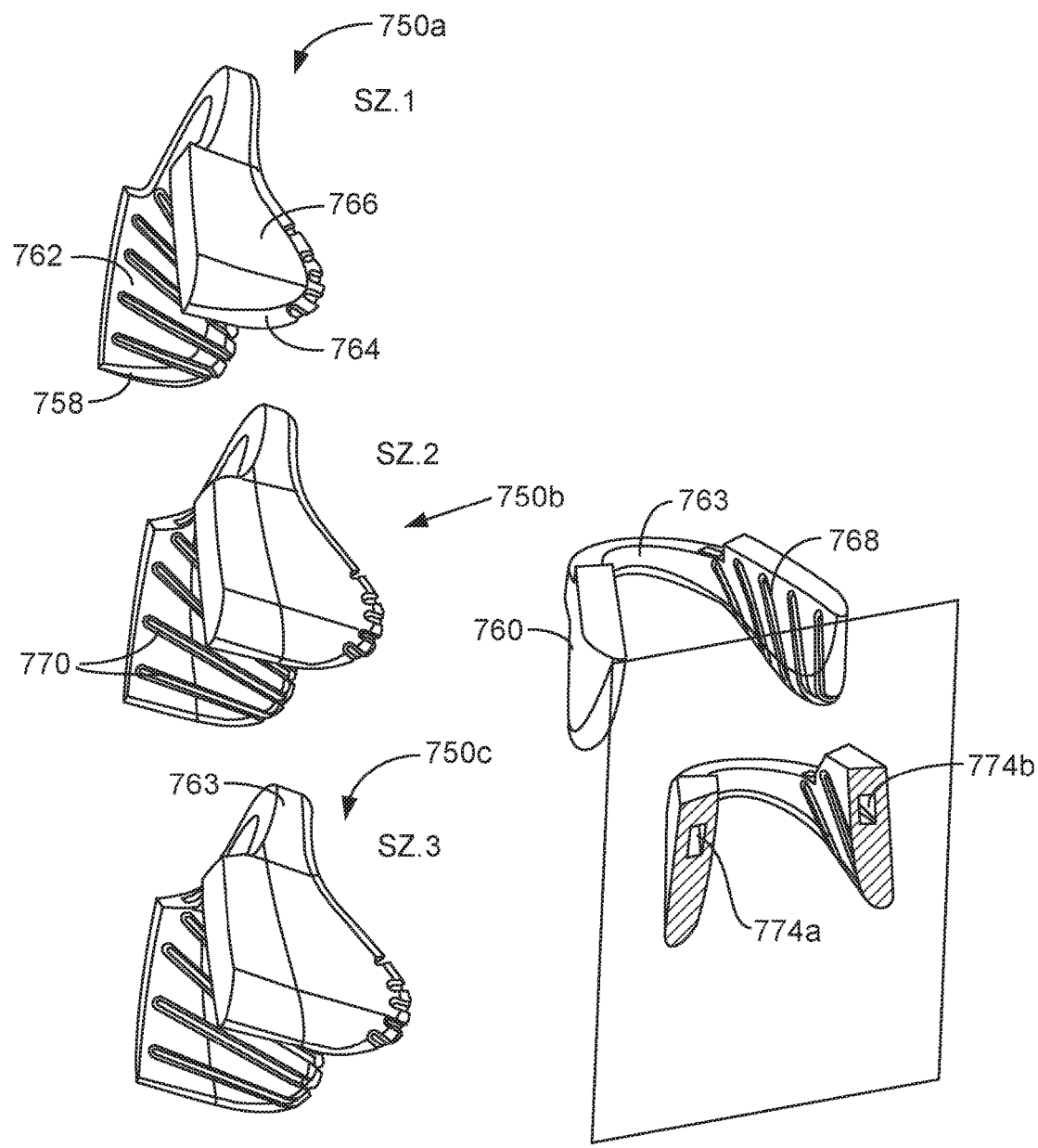
FIG. 32 is an illustrative and representative ISO view of the multiple sizes of nose pads with linking arch used in FIGS. 29 and 30A.
FIG. 33 is a cross-section view of a representative nose pads with linking arch illustrated in FIG. 32.
Figures 34, 35:
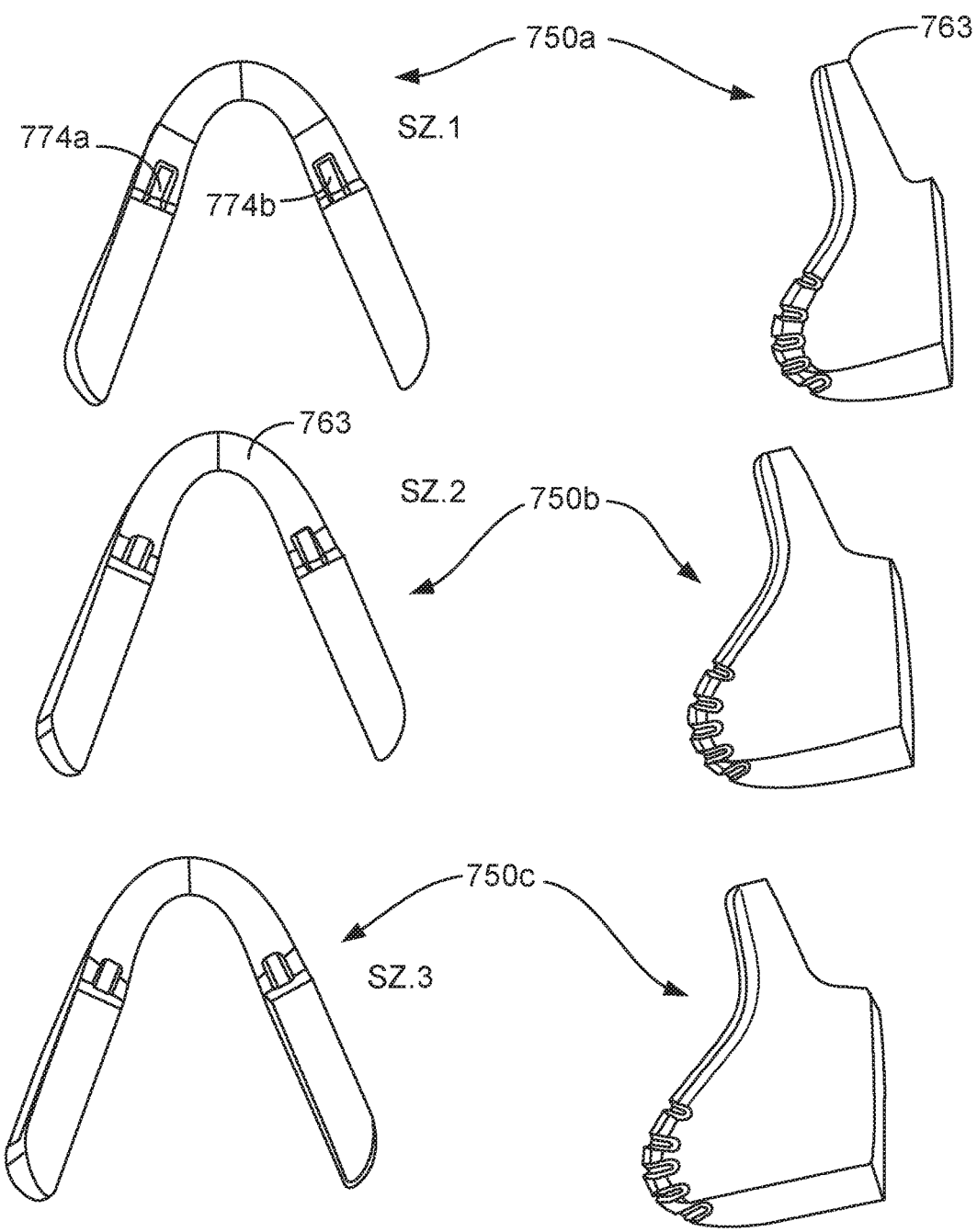
FIG. 34 is a representative anterior view of the multiple sizes of nose pads with linking arch illustrated in FIG. 32.
FIG. 35 is a representative side view of the multiple sizes of nose pads with linking arch illustrated in FIG. 32.
Figure 36:
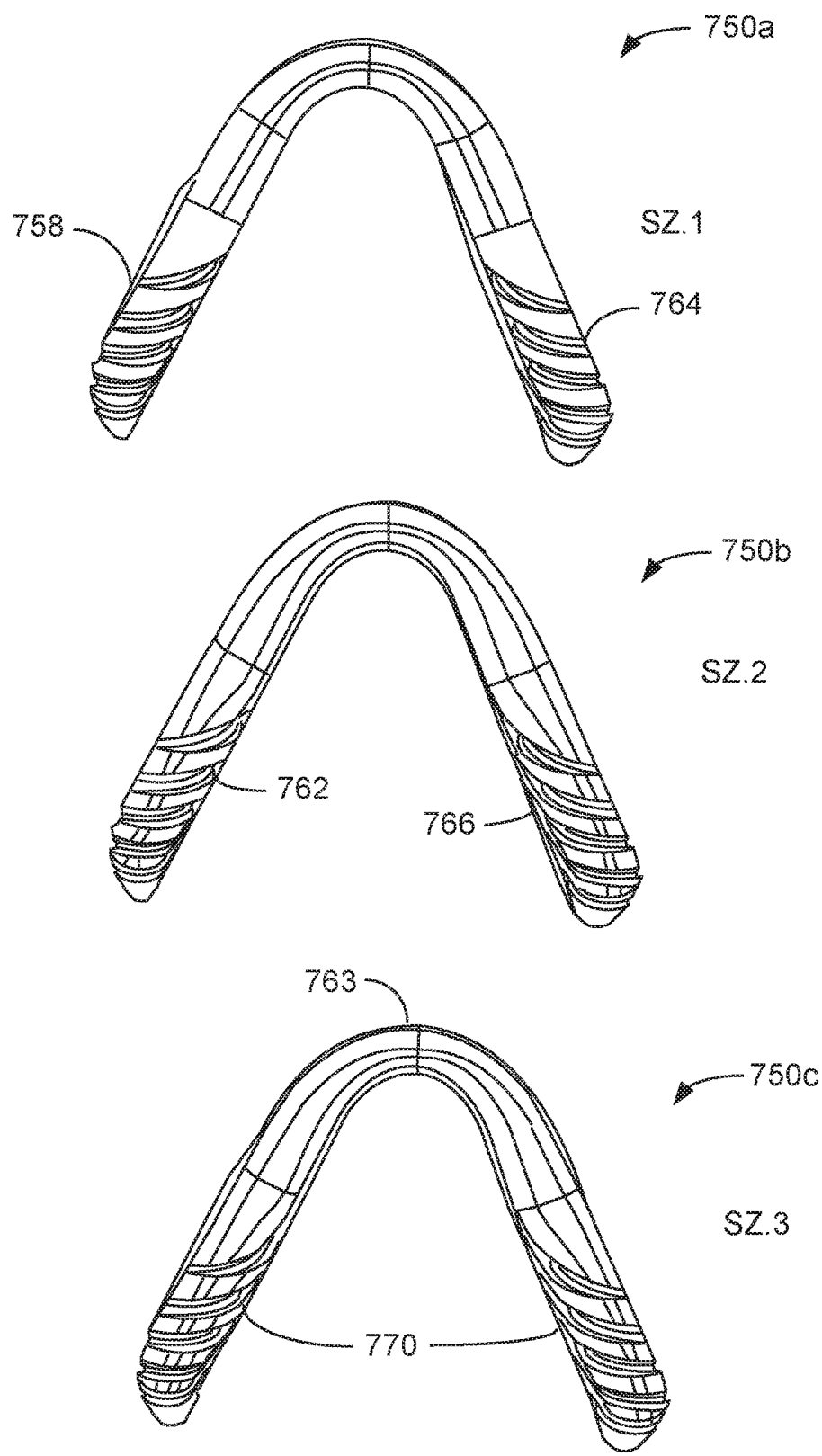
FIG. 36 is a representative posterior view of the multiple sizes of nose pads with linking arch illustrated in FIG. 32.

Provided herein is an eyeglass assembly 800, as illustrated in FIGS. 30A-31, comprising: a first temple lug 220 comprising a first temple tab thru-hole, a first temple lens retention step receiver, and a first lens locking feature; a second temple lug 221 comprising a second temple tab thru-hole, a second temple lens retention step receiver, and a second lens locking feature; (similar to the rimless version eyeglasses 200, previously described); a single lens configuration 801*a/b*, having at least two sizes of lens, comprising; a central notched region 802 configured to accommodate the shape of a nose of a wearer; a first lens tab 804, a first lens retention step 805*a*, a first lug locking notch 808*a* and a first rocker notch 808*a*; a second lens tab 806, a second lens retention step 805*b*, a second lug locking notch 808*b* and a second rocker notch 803*b*; a rocker frame 840 having a first end 845*a* and a second end 845*b*, the rocker frame comprising a generally rounded "w" shape configured to support inferior edges 136, side edges and the central notched region 802 of the single lens 801*a/b*; a first rocker notch receiver 844*a* near the first end 845*a* and a second rocker notch receiver 844*b* near the second end 845*b*; wherein the first lens tab 804 and the first lens retention step 805*a* are configured to releasably insert into the first temple tab thru-hole 222 and the first temple lens retention step receiver 226 of the first temple lug 220 respectively, such that the first lens tab 804 or a portion thereof, protrudes through the first temple tab thru-hole 822, the first lens locking feature is configured to insert into the first lug locking notch and releasably secure the temple lug to the first side of the lens; and wherein the second lens tab 806 and the second lens retention step 805*b* are configured to releasably insert into the second temple tab thru-hole 224 and the second temple lens retention step receiver 226 of the second temple lug 221 respectively, such that the second lens tab 206 or a portion thereof, protrudes through the second temple tab thru-hole 224, the second lens locking feature is configured to insert into the second lug locking notch and releasably secure the temple lug to the second side of the lens, the first rocker notch receiver 844*a* near the first end 845*a* of the rocker frame 840 is affixed to the first rocker notch 803*b* of the single lens 801*a/b* and the first end of the rocker frame 845*a* is configured to blendedly align with the inferior edge of the first temple lug 220 near the end and the first lens retention step 805*a*, and the second rocker notch receiver 844*b* near the second end 845*b* of the rocker frame 840 is affixed to the second rocker notch 803*b* of the single lens 801*a/b* and the second end 845*b* of the rocker frame 840 is configured to blendedly align with the inferior edge of the second temple lug 221 near the second end and the second lens retention step 805*b*.

In some embodiments, the rocker frame 840 further comprises a groove 841 correspondingly sized and shaped to match and to receive the inferior edges 836, side edges and central notched region 802 of the single lens 801*a/b*, or a portion thereof. In some embodiments, the rocker frame 840 further comprises a pair of permanently affixed nose paddles 848*a/b* protruding posteriorly from a middle inverted "v" region 847 of the rounded "w" shape, the middle inverted "v" region 847 configured to generally accommodate the shape of the bridge of the nose of the wearer and configured to releasably attach at or about the central notched region 802 of the single lens 801*a/b*.

In some embodiments, the middle inverted "v" region 847 further comprises: at least one first lens attachment feature 742*a/b*, 743, wherein the at least one first lens attachment feature comprises; an indent, a groove, a slot, a bump, a protrusion or a combination thereof.

In some embodiments, the pair of permanently affixed nose paddles 748*a/b* is configurable to accept a set of nose pads 750*a/b/c* connected by a flexible pad linker arch 763 also configured to generally accommodate the shape of the bridge of the nose of the wearer, wherein each nose pad 758,764, in the set of nose pads 750*a/b/c* comprises a pocket 774*a/b* configured to receive one of the nose paddles.

In some embodiments, the central notched region 702 of the single lens 701*a/b* comprises a first lateral attachment feature 714 and a second lateral attachment feature 716 configured to releasably attach to at least a portion of a middle inverted "v" region 747 of the rounded "w" shape of the rocker frame in the at least one first lens attachment feature 742*a/b*. In some embodiments, the central notched region 702 of the single lens further comprises a proximal attachment feature 718 configured to releasably attach to a proximal portion, 743, of a middle inverted "v" region 747 of the rounded "w" shape of the rocker frame.

It is also noted that the central notched region 747 of the eyeglass assembly 800, as illustrated in FIGS. 30A-31, will also accept the coupler portion 154, 254 and the pad linker arch 156, 256 of the molded split nose bridge insert 150, 250, such as illustrated in FIG. 15C, in lieu of the rocker frame 840.

In some embodiments, the set of nose pads 750*a/b/c* connected by the flexible pad linker arch 763 comprises a plurality of sizes or shapes configured to conform to a plurality of nose shapes and sizes of the wearer. In some embodiments, the set of nose pads 750 *a/b/c* connected by the flexible pad linker arch 763 are releasably detachable from the pair of permanently affixed nose paddles 748*a/b*. In some embodiments, the set of nose pads 750*a/b/c*, connected by the flexible pad linker arch 763, comprises a plurality of sizes or shapes (sizes 1-3, at least), configured to conform to a plurality of nose shapes and sizes of the wearer. In some embodiments, the set of nose pads further comprise: a first nose pad 758 with a first lateral side 760 and a first medial side 762, and a second nose pad 764 with a second medial side 768 and second lateral side 766 extending therefrom; wherein the first medial side 762 of the first nose pad 758 and the second medial side 768 of the second nose pad 764 are configured to rest on lateral cartilages, lesser alar cartilages, supra alar creases, or dense connective tissue above the nostrils of the wearer, or a combination thereof.

In some embodiments, the set of nose pads 750a/b/c connected by the flexible pad linker arch 763 and nose paddles 748a/b are a single component. In some embodiments, the set of nose pads 750a/b/c connected by the flexible pad linker arch 763 and nose paddles 748a/b are an assembly comprising two or more components.

In some embodiments, the first medial side 762 of the first nose pad 758 and the second medial side 768 of the second nose pad 764 further comprise a textured gripping surface 770.

In some embodiments, the eyeglass assembly 800 further comprises: a first temple arm 280 having a first temple leaf and a first temple extension; a second temple arm 282, with a second temple leaf and a second temple extension; (similar to the temple arms of the rimless eyeglass version 200 previously described); wherein the first temple leaf is configured for attachment to the first temple lug 220 at the knuckle feature through a first temple arm knuckle with a first hinge pin 198, wherein the first temple extension is configurable to generally conform to a lateral shape of a wearer's head, extending over the proximal portion of a wearer's first ear between a first auricle of the first ear and a wearer's skull, and wherein the second temple leaf is configured for attachment to a second temple lug 221 at the knuckle feature through a second temple arm knuckle with a second hinge pin 198, and wherein the second temple extension is configurable to generally conform to a lateral shape of a wearer's head, extending over the proximal portion of a wearer's second ear between a second auricle of the second ear and the wearer's skull.

In some embodiments, the first temple extension, and the second temple extension each further comprise a textured gripping surface. In some embodiments, the eyeglass assembly further comprises: a first temple extension textured gripping surface, and a second temple extension textured gripping surface; wherein the first temple extension textured gripping surface is configured for attachment to, or over the first temple extension, and wherein the second temple extension textured gripping surface is configured for attachment to, or over the second temple extension. In some embodiments, textured gripping surfaces comprise molded (TPE) thermoplastic elastomer. In some embodiments, the eyeglass assembly further comprises: a first temple extension end cap; and a second temple extension end cap.

Again, similar to the temple arms described for the rimless version eyeglasses (200), in some embodiments, the eyeglass assembly 800 further comprises: a first temple extension end cap; and a second temple extension end cap. In some embodiments, the first temple lug 220 and the first temple arm 280 are components of a multi-part assembly and the second temple lug 221 and the second temple arm 282 are components of a multi-part assembly. In some embodiments, the first temple lug 220 and the first temple arm 280 are a single component and the second temple lug 221 and the second temple arm 282 are a single component. In some embodiments, the first temple extension and the second temple extension further comprise a textured gripping surface. In some embodiments, the first temple extension and the second temple extension further comprise a textured gripping surface. In some embodiments, the molded polymeric textured surfaces comprise molded (TPE) thermoplastic elastomer.

In some embodiments, the single lens 801a/b is provided in more than one size. In some embodiments, the single lens 801a/b is provided in two or more heights. In some embodiments, the single lens is configurable to extend approximately 2 mm to approximately 10 mm higher above the eyebrows of the wearer than a standard height lens, as described for the rimless version eyeglasses (200). In some embodiments, the single lens is configurable to extend approximately 2 mm to approximately 10 mm lower below the eyes of the wearer than a standard height lens, as described for the rimless version eyeglasses (200), to approximately the cheekbone. In some embodiments, the single lens is configured to extend both higher above the eyebrows of the wearer than a standard height lens and extend lower below the eyes of the wearer than a standard height lens within an overall range of approximately 2 mm to approximately 10 mm.

In some embodiments of the eyeglass assembly 800 comprises a rocker frame 840, wherein the rocker frame is configured in two or more sizes 840a/b to accommodate lenses being provided in two or more sizes 801a/b.

In some embodiments, the single lens 801a/b is configurable to accommodate a corrective lens prescription for only a left eye, only a right eye, or both left and right eye. In some embodiments, the single lens is configurable to accommodate: an anti-reflective treatment; a photochromic treatment; a polarized treatment; a tinting treatment; a scratch resistant treatment; a mirror coating treatment; an anti-fog coating treatment; a hydro-phobic coating treatment; an oleo-phobic coating treatment or a combination thereof.

As with each of the eyeglass versions previously described, in some embodiments of the eyeglass assembly 800, the first temple extension and the second temple extension comprise a core metal substrate. In some embodiments, the core metal substrate comprises titanium. In some embodiments, the first temple extension comprising the core metal substrate and the second temple extension comprising the core metal substrate are molded sub-assemblies. In some embodiments, the core metal substrate sub-assemblies further comprise a removably replaceable molded polymeric textured surface. In some embodiments, the removably replaceable molded polymeric textured surface comprises a thermal plastic elastomer (TPE).

The above descriptions of illustrated embodiments of the assemblies, methods, or devices are not intended to be exhaustive or to be limited to the precise form disclosed. While specific embodiments of, and examples for, the assemblies, methods, or devices are described herein for illustrative purposes, various equivalent modifications are possible within the scope of the assemblies, methods, or devices, as those skilled in the relevant art will recognize. The teachings of the assemblies, methods, or devices provided herein can be applied to other systems, methods, or devices, not only for the assemblies, methods, or devices described.

The elements and acts of the various embodiments described can be combined to provide further embodiments. These and other changes can be made to the assemblies in light of the above detailed description.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An eyeglass assembly comprising:
   at least one lens comprising:
   a first lens tab; and
   a first lens retention step, each on one side of the one lens; and
   a first lens receiving portion comprising:
   a first lens tab thru-hole; and
   a first lens retention step receiver, each on one side of the lens receiving portion;
   wherein the first lens tab and the first lens retention step are configured to releasably insert into the first lens tab thru-hole and the first lens retention step receiver of the first lens receiving portion such that the first lens tab or a portion thereof protrudes through and extends beyond the first lens tab thru-hole.

2. The eyeglass assembly of claim 1, wherein the at least one lens further comprises:
   a second lens tab; and
   a second lens retention step, each on an opposite side of the one lens;
   wherein the first lens receiving portion further comprises:
   a second lens tab thru-hole; and
   a second lens retention step receiver, each on an opposite side of the lens receiving portion;
   wherein the second lens tab and the second lens retention step are configured to releasably insert into the second lens tab thru-hole and the second lens retention step receiver of the first lens receiving portion such that the second lens tab or a portion thereof protrudes through and extends beyond the second lens tab thru-hole.

3. The eyeglass assembly of claim 2, wherein the at least one lens further comprises:
   a first receiving portion locking feature; and
   a second receiving portion locking feature;
   wherein the first lens receiving portion further comprises:
   a first lens locking feature;
   wherein the second lens receiving portion further comprises:
   a second lens locking feature;
   wherein the first receiving portion locking feature is configured to insert into the first lens locking feature and releasably secure the first lens receiving portion to a first side of the at least one lens, and
   wherein the second receiving portion locking feature is configured to insert into the second lens locking feature and releasably secure the second lens receiving portion to a second side of the at least one lens.

4. The eyeglass assembly of claim 3, wherein the at least one lens further comprises a central notched configured to accommodate the general shape of a nose of a wearer.

5. The eyeglass assembly of claim 4, further comprising:
   a nose bridge insert configured to releasably attach to the central notched region of the single lens,
   wherein the nose bridge insert comprises at least one attachment feature configured to releasably attach to at least a portion of the central notched region of the single lens;
   wherein the at least one attachment feature comprises at least one of;
   an indent,
   a groove,
   a slot,
   a bump, or
   a protrusion.

6. The eyeglass assembly of claim 5, wherein the nose bridge insert comprises a split nose bridge configuration such that a coupler portion of the split nose bridge insert is configured to releasably attach to at least a portion of the central notched region of the single lens.

7. The eyeglass assembly of claim 6, wherein the split nose bridge configuration of the split nose bridge insert further comprises:
   a pad linker arch configured to be posteriorly offset from the coupler portion wherein the pad linker arch is configured to straddle the bridge of the nose of the wearer, and
   the pad linker arch further comprising a first nose pad with a first lateral side and a first medial side, and a second nose pad with a second medial side and second lateral side extending therefrom;
   wherein the first medial side of the first nose pad and the second medial side of the second nose pad comprise a textured gripping surface.

8. The eyeglass assembly of claim 5, wherein the temple arm or the temple extension comprises:
   titanium;
   stainless steel;
   aluminum;
   copper;
   nickel;
   Beta Ti;
   nitinol (NiTi); or
   alloys thereof.

9. The eyeglass assembly of claim 2, wherein the at least one lens further comprises a central notched configured to accommodate the general shape of a nose of a wearer.

10. The eyeglass assembly of claim 9, further comprising:
    a nose bridge insert configured to releasably attach to the central notched region of the single lens,
    wherein the nose bridge insert comprises at least one attachment feature configured to releasably attach to at least a portion of the central notched region of the single lens;
    wherein the at least one attachment feature comprises at least one of;
    an indent,
    a groove,
    a slot,
    a bump, or
    a protrusion.

11. The eyeglass assembly of claim 10, wherein the nose bridge insert comprises a split nose bridge configuration such that a coupler portion of the split nose bridge insert is configured to releasably attach to at least a portion of the central notched region of the single lens.

12. The eyeglass assembly of claim 11, wherein the split nose bridge configuration of the split nose bridge insert further comprises:
    a pad linker arch configured to be posteriorly offset from the coupler portion wherein the pad linker arch is configured to straddle the bridge of the nose of the wearer, and
    the pad linker arch further comprising a first nose pad with a first lateral side and a first medial side, and a second nose pad with a second medial side and second lateral side extending therefrom;

wherein the first medial side of the first nose pad and the second medial side of the second nose pad comprise a textured gripping surface.

13. The eyeglass assembly of claim 11, wherein the temple arm or the temple extension comprises:
   titanium;
   stainless steel;
   aluminum;
   copper;
   nickel;
   Beta Ti;
   nitinol (NiTi); or
   alloys thereof.

14. The eyeglass assembly of claim 2, further comprising:
   a first temple arm having a first temple leaf and a first temple extension;
   a second temple arm, with a second temple leaf and a second temple extension;
   wherein the first temple leaf is configured for attachment to a first end of the at least one lens receiving portion,
   wherein the first temple extension is configurable to generally conform to a lateral shape of a wearer's head, extending over the proximal portion of a wearer's first ear between the first ear and a wearer's skull,
   wherein the second temple leaf is configured for attachment to a second end of the at least one lens receiving portion, and
   wherein the second temple extension is configurable to generally conform to a lateral shape of a wearer's head, extending over the proximal portion of a wearer's second ear between the second ear and the wearer's skull.

15. The eyeglass assembly of claim 14, wherein the first temple extension, and the second temple extension each comprise a textured gripping surface.

16. The eyeglass assembly of claim 1, wherein the at least one lens further comprises:
   a second lens tab; and
   a second lens retention step;
   wherein the eyeglass assembly further comprises:
      a second lens receiving portion comprising:
         a second lens tab thru-hole; and
         a second lens retention step receiver;
      wherein the second lens tab and the second lens retention step are configured to releasably insert into the second lens tab thru-hole and the second lens retention step receiver of the second lens receiving portion such that the second lens tab or a portion thereof protrudes through and extends beyond the second lens tab thru-hole.

17. The eyeglass assembly of claim 16, wherein the at least one lens further comprises a central notched configured to accommodate the general shape of a nose of a wearer.

18. The eyeglass assembly of claim 17, further comprising:
   a nose bridge insert configured to releasably attach to the central notched region of the single lens,
   wherein the nose bridge insert comprises at least one attachment feature configured to releasably attach to at least a portion of the central notched region of the single lens;
   wherein the at least one attachment feature comprises at least one of:
      an indent,
      a groove,
      a slot,
      a bump, or
      a protrusion.

19. The eyeglass assembly of claim 18, wherein the nose bridge insert comprises a split nose bridge configuration such that a coupler portion of the split nose bridge insert is configured to releasably attach to at least a portion of the central notched region of the single lens.

20. The eyeglass assembly of claim 19, wherein the split nose bridge configuration of the split nose bridge insert further comprises:
   a pad linker arch configured to be posteriorly offset from the coupler portion wherein the pad linker arch is configured to straddle the bridge of the nose of the wearer, and
   the pad linker arch further comprising a first nose pad with a first lateral side and a first medial side, and a second nose pad with a second medial side and second lateral side extending therefrom;
   wherein the first medial side of the first nose pad and the second medial side of the second nose pad comprise a textured gripping surface.

21. The eyeglass assembly of claim 18, wherein the temple arm or the temple extension comprises:
   titanium;
   stainless steel;
   aluminum;
   copper;
   nickel;
   Beta Ti;
   nitinol (NiTi); or
   alloys thereof.

22. The eyeglass assembly of claim 16, further comprising:
   a first temple arm having a first temple leaf and a first temple extension;
   a second temple arm, with a second temple leaf and a second temple extension;
   wherein the first temple leaf is configured for attachment to a first end of the at least one lens receiving portion,
   wherein the first temple extension is configurable to generally conform to a lateral shape of a wearer's head, extending over the proximal portion of a wearer's first ear between the first ear and a wearer's skull,
   wherein the second temple leaf is configured for attachment to a second end of the at least one lens receiving portion, and
   wherein the second temple extension is configurable to generally conform to a lateral shape of a wearer's head, extending over the proximal portion of a wearer's second ear between the second ear and the wearer's skull.

23. The eyeglass assembly of claim 22, wherein the first temple extension, and the second temple extension each comprise a textured gripping surface.

24. The eyeglass assembly of claim 1, further comprising:
   a second lens, separated from the first lens comprising:
      a second lens tab; and
      a second lens retention step, each on one side of the second lens;
   wherein the first lens receiving portion further comprises:
      a second lens receiving portion comprising;
         a second lens tab thru-hole; and
         a second lens retention step receiver, each in the second lens receiving portion;
      wherein the second lens tab and the second lens retention step are configured to releasably insert into the second lens tab thru-hole and the second lens retention step receiver of the second lens receiving portion such that the second lens tab or a portion thereof protrudes through and extends beyond the second lens tab thru-hole.

25. The eyeglass assembly of claim 24, further comprising;
a first lens hook on the first lens, on or about a first proximal edge and in proximity to a first medial edge;
a second lens hook on the second lens, or about a second proximal edge and in proximity to a second medial edge; and
an integral nose bridge with a first lateral side and a second lateral side between the first and second lens receiving portions, and a first medial side and a second medial side, forming a frame bridge;
wherein the first medial side and the second medial side are configured to straddle a bridge of a wearer's nose,
wherein the integral nose bridge further comprises;
a first nose pad arm with a first lateral side and a first medial side; and
a second nose pad arm with a second medial side and a second lateral side;
wherein the first lateral side of the first nose pad arm comprises a first lens hook receptacle configured to receive the first lens hook on the first lens, and
wherein the second lateral side of the second nose pad arm comprises a second lens hook receptacle configured to receive the second lens hook on the second lens.

26. The eyeglass assembly of claim 24, further comprising:
a first temple arm having a first temple leaf and a first temple extension;
a second temple arm, with a second temple leaf and a second temple extension;
wherein the first temple leaf is configured for attachment to a first end of the first lens receiving portion,
wherein the first temple extension is configurable to generally conform to a lateral shape of a wearer's head, extending over the proximal portion of a wearer's first ear between the first ear and a wearer's skull,
wherein the second temple leaf is configured for attachment to a second end of the second lens receiving portion, and
wherein the second temple extension is configurable to generally conform to a lateral shape of a wearer's head, extending over the proximal portion of a wearer's second ear between the second ear and the wearer's skull.

27. The eyeglass assembly of claim 26, wherein the first temple extension, and the second temple extension each further comprise a textured gripping surface.

28. The eyeglass assembly of claim 1, wherein the at least one lens comprises:
variable shapes;
variable widths configured to fit between the ends of the frame bridge;
variable widths configured to fit below the frame bridge;
variable radii of curvature; or
variable lens heights.

29. The eyeglass assembly of claim 19, wherein the temple arm or the temple extension comprises:
titanium;
stainless steel;
aluminum;
copper;
nickel;
Beta Ti;
nitinol (NiTi); or
alloys thereof.

30. The eyeglass assembly of claim 28 wherein the at least first lens is configurable to accommodate at least one of:
an anti-reflective treatment;
a photochromic treatment;
a polarized treatment;
a tinting treatment;
a scratch resistant treatment;
a mirror coating treatment;
an anti-fog coating treatment;
a hydro-phobic coating treatment;
an oleo-phobic coating treatment; or
a combination thereof.

* * * * *